United States Patent
Satou

(10) Patent No.: US 12,401,856 B2
(45) Date of Patent: Aug. 26, 2025

(54) RECEPTION DEVICE AND TRANSMISSION SYSTEM

(71) Applicant: Sony Semiconductor Solutions Corporation, Kanagawa (JP)

(72) Inventor: Hirokazu Satou, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/802,735

(22) PCT Filed: Feb. 19, 2021

(86) PCT No.: PCT/JP2021/006374
§ 371 (c)(1),
(2) Date: Aug. 26, 2022

(87) PCT Pub. No.: WO2021/192764
PCT Pub. Date: Sep. 30, 2021

(65) Prior Publication Data
US 2023/0129052 A1 Apr. 27, 2023

(30) Foreign Application Priority Data
Mar. 25, 2020 (JP) ................................ 2020-054537

(51) Int. Cl.
*G06V 10/25* (2022.01)
*G06T 5/00* (2024.01)

(52) U.S. Cl.
CPC ............... *G06V 10/25* (2022.01); *G06T 5/00* (2013.01)

(58) Field of Classification Search
CPC ............................... G06V 10/25; G06T 5/001
See application file for complete search history.

(56) References Cited

U.S. PATENT DOCUMENTS

2008/0285789 A1* 11/2008 Kimura ............. H04N 1/32347
382/100
2015/0016504 A1* 1/2015 Auyeung ............... H04N 19/33
375/240.02

(Continued)

FOREIGN PATENT DOCUMENTS

JP 2012209831 A 10/2012
JP 2013164834 A 8/2013

(Continued)

OTHER PUBLICATIONS

International Search Report (PCT/ISA/210), International Application No. PCT/JP2021/006374, dated May 11, 2021.

*Primary Examiner* — Wednel Cadeau
(74) *Attorney, Agent, or Firm* — Michael Best & Friedrich LLP

(57) ABSTRACT

An object is to efficiently display pieces of image data of some regions of interest (ROI) cut from a captured image on a display device. A reception device includes: a reception unit that receives a transmission signal in which image data of a predetermined number of regions of interest (ROIs) cut from a predetermined captured image is included in payload data and ROI information corresponding to a predetermined number of the ROIs is included in embedded data; and a processing unit that is configured to perform restoration processing of restoring the image data of the ROI so as to be displayable on a predetermined display device on the basis of the ROI information extracted from the embedded data.

20 Claims, 16 Drawing Sheets

(56) References Cited

U.S. PATENT DOCUMENTS

2017/0372675 A1* 12/2017 Cho ................. G09G 5/005
2020/0186841 A1* 6/2020 Yoshimochi ......... H04N 23/665

FOREIGN PATENT DOCUMENTS

| | | | |
|---|---|---|---|
| JP | 2014039219 A | 2/2014 | |
| JP | 2016504890 A | 2/2016 | |
| JP | 2016506669 A | 3/2016 | |
| JP | 2016529789 A | 9/2016 | |
| JP | 2016201756 A | 12/2016 | |
| JP | 2019049705 A | 3/2019 | |
| JP | 2019091967 A | 6/2019 | |
| KR | 2017131806 A * | 11/2017 | ............... G09G 3/20 |
| WO | WO-2006008787 A | 1/2006 | |
| WO | WO-2018225449 A1 * | 12/2018 | ....... H04N 21/23418 |

* cited by examiner

FRAME HEADER REGION R1
- FRAME NUMBER  F1
- NUMBER OF ROIS  4
- ROI INFORMATION

| REGION NUMBER  1 | REGION NUMBER  2 |
|---|---|
| PHYSICAL REGION LENGTH (XLa1,YLa1) | PHYSICAL REGION LENGTH (XLa2,YLa2) |
| RECTANGULAR OUTPUT REGION SIZE (XLb1,YLb1) | RECTANGULAR OUTPUT REGION SIZE (XLb2,YLb2) |
| PRIORITY  1 | PRIORITY  2 |
| EXPOSURE INFORMATION  h1 | EXPOSURE INFORMATION  h2 |
| GAIN INFORMATION  g1 | GAIN INFORMATION  g2 |
| AD WORD LENGTH  L1 | AD WORD LENGTH  L2 |
| IMAGE FORMAT  FM1 | IMAGE FORMAT  FM1 |
| REGION NUMBER  3 | REGION NUMBER  4 |
| PHYSICAL REGION LENGTH (XLa3,YLa3) | PHYSICAL REGION LENGTH (XLa4,YLa4) |
| RECTANGULAR OUTPUT REGION SIZE (XLb3,YLb3) | RECTANGULAR OUTPUT REGION SIZE (XLb4,YLb4) |
| PRIORITY  3 | PRIORITY  4 |
| EXPOSURE INFORMATION  h3 | EXPOSURE INFORMATION  h4 |
| GAIN INFORMATION  g3 | GAIN INFORMATION  g4 |
| AD WORD LENGTH  L3 | AD WORD LENGTH  L4 |
| IMAGE FORMAT  FM1 | IMAGE FORMAT  FM1 |

PACKET REGION  R2

112b

| | POSITION | | | | SIZE | |
|---|---|---|---|---|---|---|
| | START POINT COORDINATES (UPPER-LEFT END COORDINATES) | | END POINT COORDINATES (LOWER-RIGHT END COORDINATES) | | LENGTH IN X-AXIS DIRECTION (pixel) | LENGTH IN Y-AXIS DIRECTION (pixel) |
| | X COORDINATE | Y COORDINATE | X COORDINATE | Y COORDINATE | | |
| ROI0 | i0:520 | j0:300 | k0:919 | l0:899 | 400 | 600 |
| ROI1 | i1:1040 | j1:140 | k1:1439 | l1:739 | 400 | 600 |
| ROI2 | i2:100 | j2:100 | k2:499 | l2:699 | 400 | 600 |

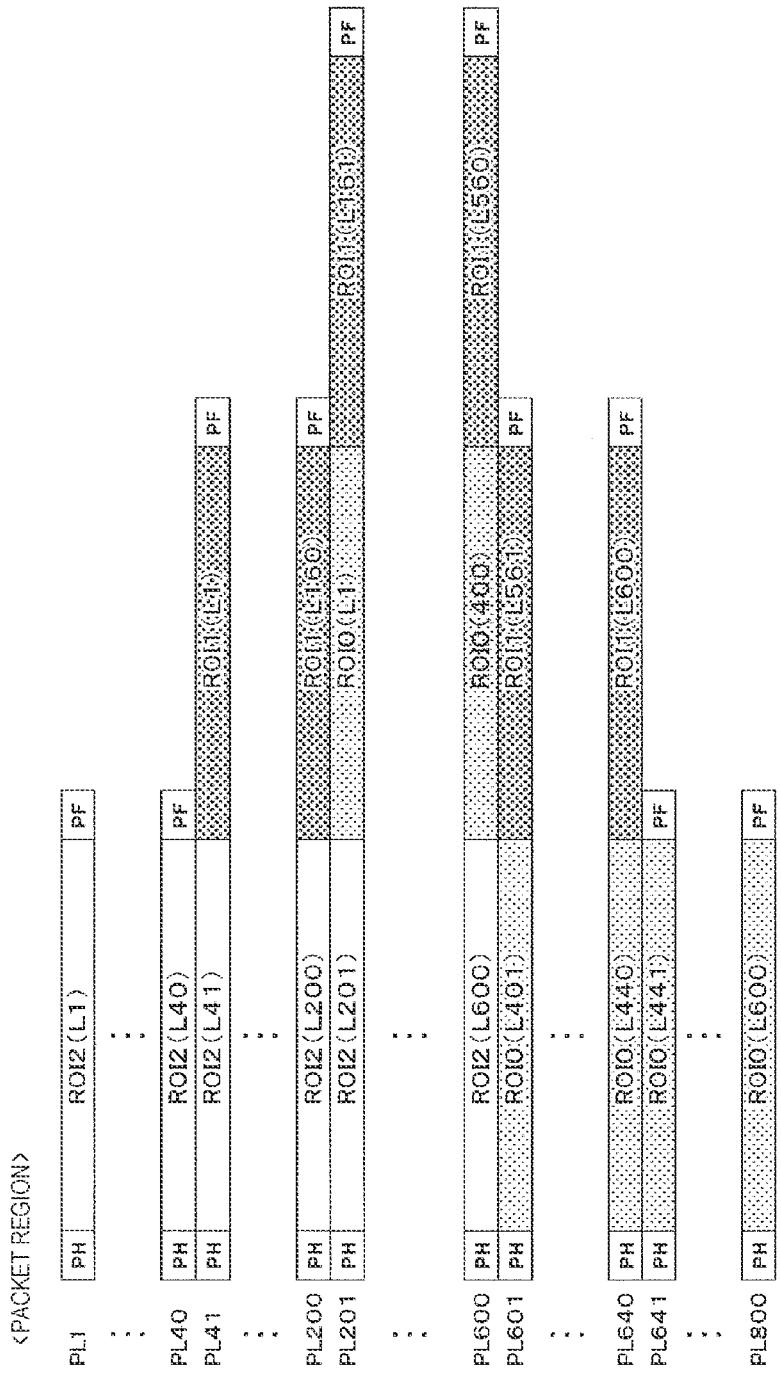

FIG. 16

| FIRST COORDINATE DATA | ROI IDENTIFICATION INFORMATION (START POINT X COORDINATE, START POINT Y COORDINATE, END POINT X COORDINATE AND END POINT Y COORDINATE) |
|---|---|
| SECOND COORDINATE DATA | ROI IDENTIFICATION INFORMATION (START POINT Y COORDINATE AND END POINT Y COORDINATE) |

(RELATIVE COORDINATE DATA)

FIG. 17

<ROI RESTORATION INFORMATION>

| | X-COORDINATE ORDER DATA | Y-COORDINATE ORDER DATA |
|---|---|---|
| 1 | ROI2 (100, 100, 499, 699) | ROI2 (100, 699) |
| 2 | ROI0 (520, 300, 919, 899) | ROI1 (140, 739) |
| 3 | ROI1 (1040, 140, 1439, 739) | ROI0 (300, 899) |

FIG. 18

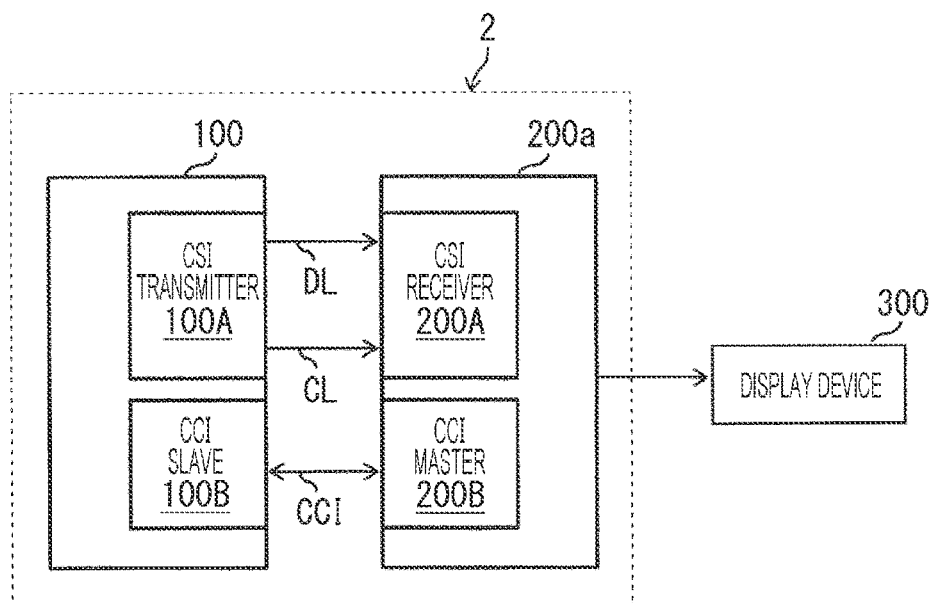

RECEPTION DEVICE AND TRANSMISSION SYSTEM

TECHNICAL FIELD

The present disclosure relates to a reception device and a transmission system.

BACKGROUND ART

In recent years, transmission of a large amount of massive data is increasing. A large load is likely to be applied to a transmission system, and in the worst case, there is a possibility that the transmission system is down and data transmission cannot be performed.

It is known that an object to be imaged is specified and only an image of a cut part of the specified object is transmitted instead of, for example, transmitting all captured images in order to prevent the transmission system from being down (for example, Patent Documents 1 to 4).

CITATION LIST

Patent Document

Patent Document 1: Japanese Patent Application Laid-Open No. 2016-201756
Patent Document 2: Japanese Patent Application Laid-Open No. 2014-39219
Patent Document 3: Japanese Patent Application Laid-Open No. 2013-164834
Patent Document 4: Japanese Patent Application Laid-Open No. 2012-209831

SUMMARY OF THE INVENTION

Problems to be Solved by the Invention

Processing for efficiently displaying some regions of interest (ROIs) cut from a captured image and transmitted on a display device has not been studied at all.

An object of the present disclosure is to provide a reception device and a transmission system that enable efficient display of some regions of interest (ROIs) cut from a captured image on a display device.

Solutions to Problems

A reception device according to one aspect of the present disclosure includes: a reception unit that receives a transmission signal in which image data of a predetermined number of regions of interest (ROIs) cut from a predetermined captured image is included in payload data and ROI information corresponding to a predetermined number of the ROIs is included in embedded data; and a processing unit that is configured to perform restoration processing of restoring the image data of the ROI so as to be displayable on a predetermined display device on the basis of the ROI information extracted from the embedded data.

A transmission system according to one aspect of the present disclosure includes: a transmission device that sends image data of a region of interest (ROI) as payload data and sends ROI information as embedded data; and a reception device that includes a reception unit that receives a transmission signal in which the image data of a predetermined number of the ROIs cut from a predetermined captured image is included in the payload data and the ROI information corresponding to a predetermined number of the ROIs is included in the embedded data, and a processing unit that is configured to perform restoration processing of restoring the image data of a predetermined number of the ROIs so as to be displayable on a predetermined display device on the basis of the ROI information extracted from the embedded data.

BRIEF DESCRIPTION OF DRAWINGS

FIG. 12 is a diagram illustrating a configuration example of transmission data in which position information of each ROI image is included in payload data of a long packet.
FIG. 15 is a diagram illustrating an example of payload data including image data of the regions of interest illustrated in FIG. 13.
FIG. 16 is a diagram for describing first coordinate data and second coordinate data included in ROI restoration information according to an embodiment of the present disclosure.
FIG. 17 is a diagram illustrating an example of X-coordinate order data and Y-coordinate order data according to an embodiment of the present disclosure.
FIG. 18 is a block diagram illustrating a schematic configuration of a video transmission system according to an embodiment of the present disclosure.

MODE FOR CARRYING OUT THE INVENTION

Hereinafter, modes for carrying out the present disclosure will be described in detail with reference to the drawings. The following description is a specific example of the present disclosure, and the present disclosure is not limited to the following aspects.

Hereinafter, a mode for carrying out the technology according to the present disclosure (hereinafter, referred to as "embodiment") will be described in the following order.
1. Underlying Technology 1 of Present Disclosure (Technology for Transmitting Some Regions of Interest (ROIs) (Having Rectangular Shape) Cut from Captured Image)
2. Underlying Technology 2 of Present Disclosure (Technology for Transmitting Some Regions of Interest (ROIs) (Having Non-Rectangular Shape) Cut from Captured Image)
3. Principle of Restoration Processing in Embodiment of Present Disclosure
4. Video Reception Device and Video Transmission System According to Embodiment of Present Disclosure
5. Processing for Displaying Image Data in Video Reception According to Embodiment of Present Disclosure
6. Modified Example of Restoration Processing in Embodiment of Present Disclosure

1. Underlying Technology 1 of Present Disclosure

[Configuration]

In recent years, in portable devices such as smartphones, camera devices, and the like, the capacity of handled image data has been increased, and there has been a demand for higher speed and lower power consumption for data transmission in the devices or between different devices. In order to meet such requirements, high-speed interface standards such as a C-PHY standard and a D-PHY standard set by the MIPI Alliance are being standardized as connection interfaces for portable devices and camera devices. The C-PHY standard and the D-PHY standard are interface standards of a physical layer (PHY) of a communication protocol. In addition, a display serial interface (DSI) for display of a portable device and a camera serial interface (CSI) for a camera device exist as higher protocol layers of the C-PHY standard and the D-PHY standard.

Figure 1:
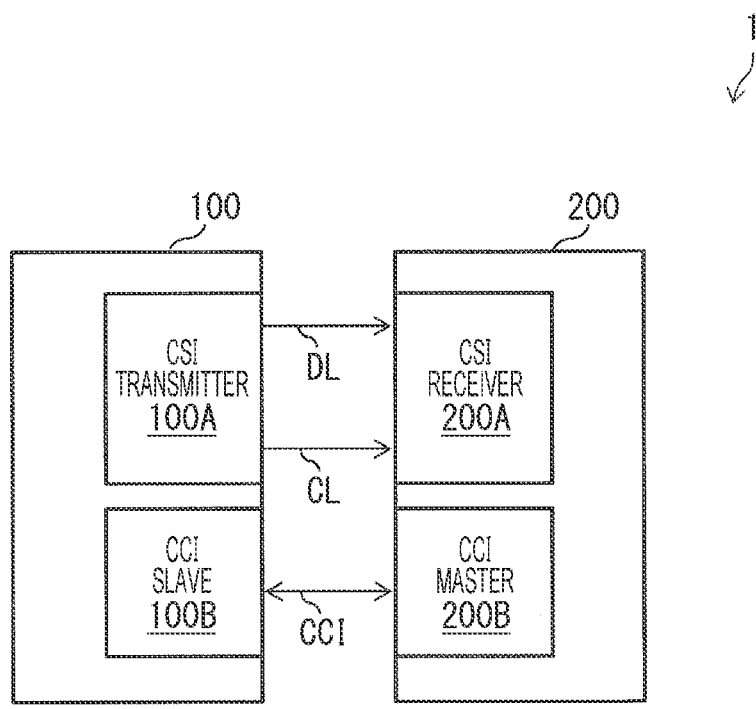
FIG. 1 is a diagram illustrating a schematic configuration example of a video transmission system.

A video transmission system 1 according to the underlying technology of the present disclosure is a system that can transmit and receive a signal according to various standards, and can transmit and receive a signal according to, for example, an MIPI CSI-2 standard, an MIPI CSI-3 standard, or an MIPI DSI standard. FIG. 1 illustrates an outline of the video transmission system 1 according to the underlying technology of the present disclosure. The video transmission system 1 is applied to transmission of a data signal, a clock signal, and a control signal, and includes a video transmission device 100 and a video reception device 200. The video transmission system 1 includes a data lane DL for transmitting a data signal such as image data, a clock lane CL for transmitting a clock signal, and a camera control interface CCI for transmitting a control signal across the video transmission device 100 and the video reception device 200. Although FIG. 1 illustrates an example in which one data lane DL is provided, a plurality of data lanes DL may be provided. The camera control interface CCI is a bidirectional control interface compatible with an inter-integrated circuit (I2C) standard.

The video transmission device 100 is a device that sends a signal according to the MIPI CSI-2 standard, the MIPI CSI-3 standard, or the MIPI DSI standard. A CSI transmitter 100A and a CCI slave 100B are provided. The video reception device 200 includes a CSI receiver 200A and a CCI master 200B. In the clock lane CL, a clock signal line connects between the CSI transmitter 100A and the CSI receiver 200A. In the data lane DL, a clock signal line connects between the CSI transmitter 100A and the CSI receiver 200A. In the camera control interface CCI, a control signal line connects between the CCI slave 100B and the CCI master 200B.

The CSI transmitter 100A is, for example, a differential signal transmission circuit that generates a differential clock signal as a clock signal and outputs the differential clock signal to the clock signal line. The CSI transmitter 100A can be configured to be able to transmit not only the differential clock signal but also a single-ended signal or a three-phase signal. The CSI transmitter 100A is also a differential signal transmission circuit that generates a differential data signal as a data signal and outputs the differential data signal to a data signal line. The CSI receiver 200A is a differential signal reception circuit that receives a differential clock signal as a clock signal via the clock signal line and performs predetermined processing on the received differential clock signal. The CSI receiver 200A is also a differential signal reception circuit that receives a differential data signal as a data signal via the data signal line and performs predetermined processing on the received differential data signal.

(Video Transmission Device 100)

Figure 2:
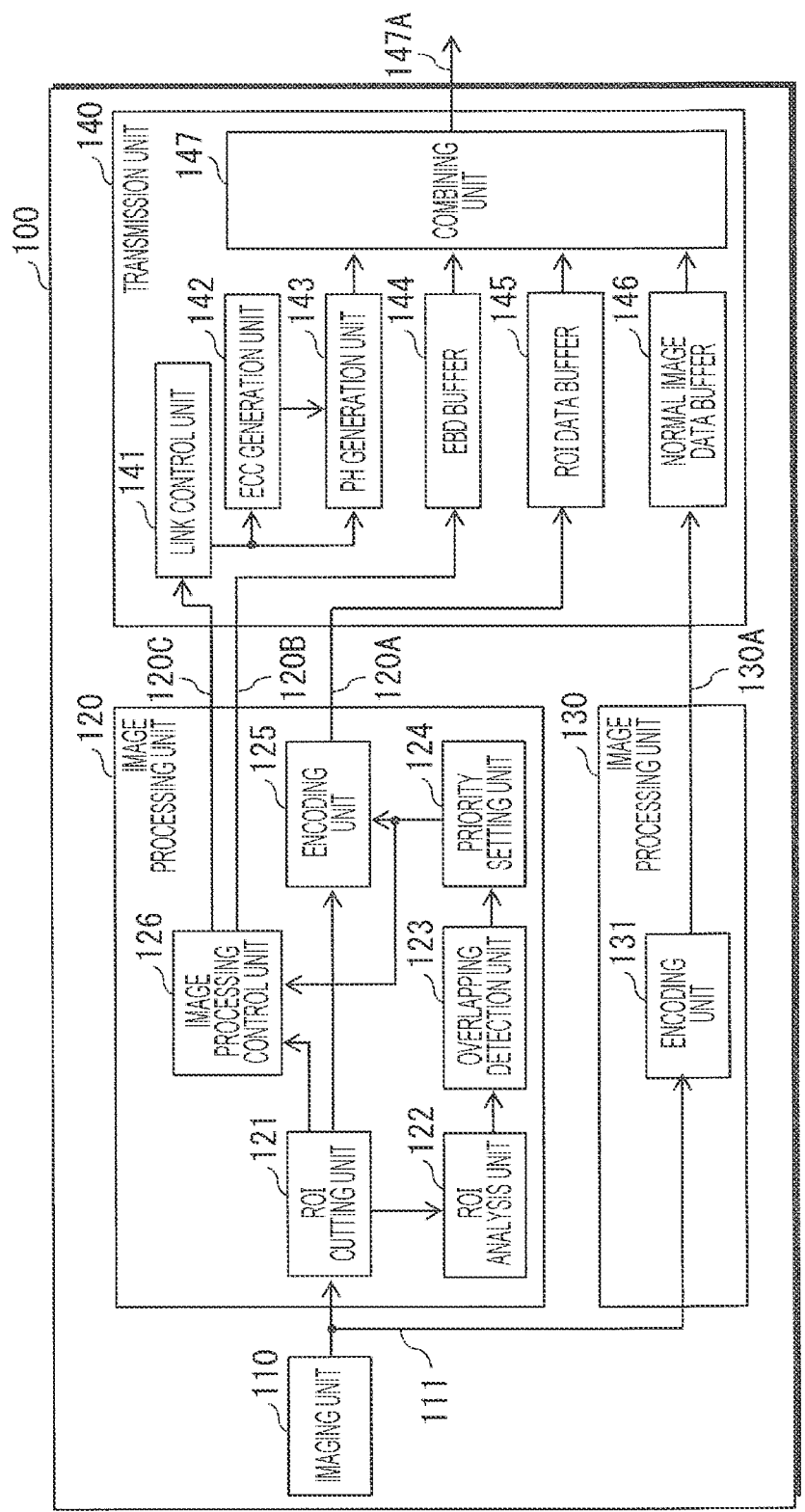
FIG. 2 is a diagram illustrating a schematic configuration example of a video transmission device of FIG. 1.
Figure 3:
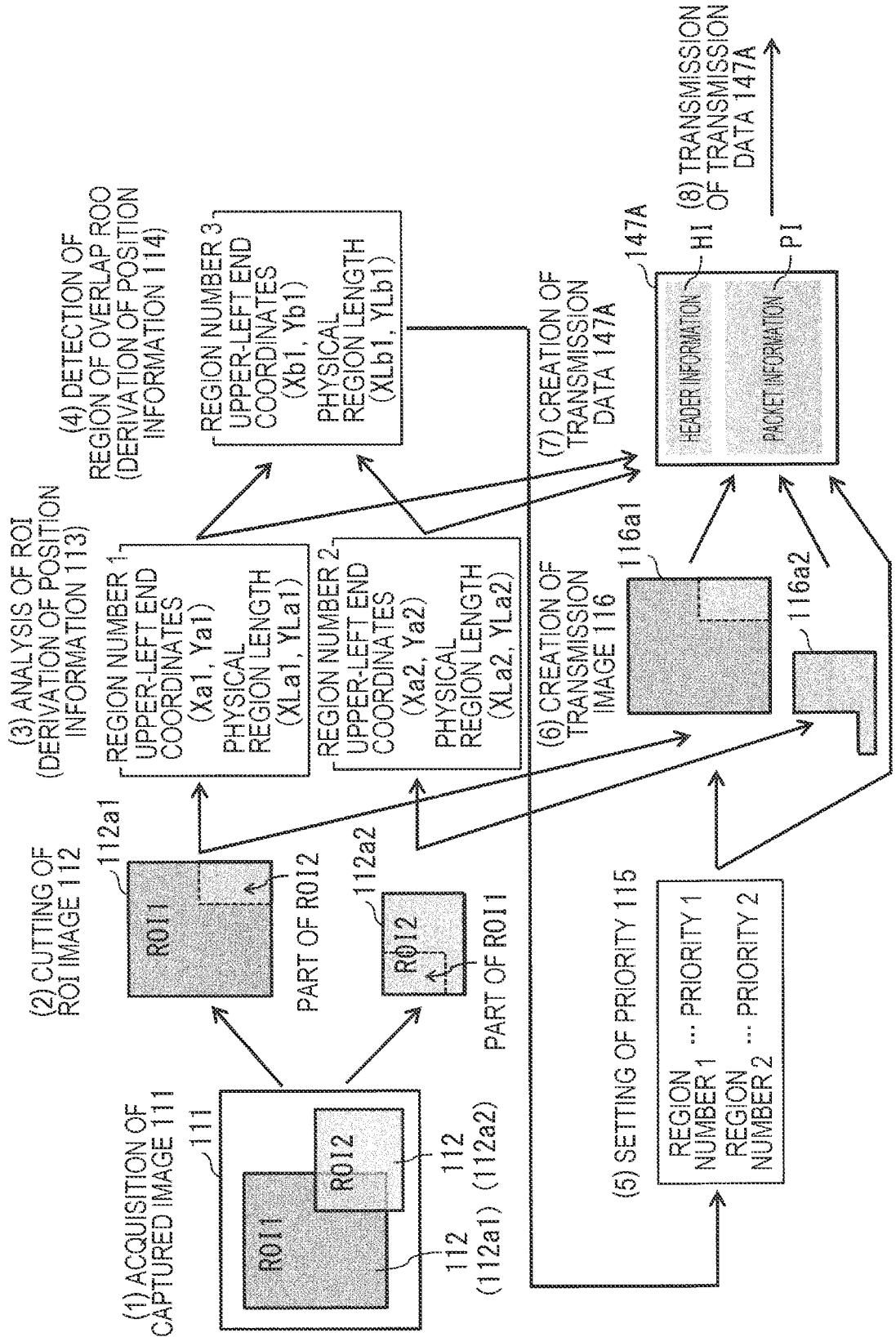
FIG. 3 is a diagram illustrating an example of a transmission data generation procedure in a case where two regions of interest (ROIs) are included in a captured image.

FIG. 2 illustrates an example of a configuration of the video transmission device 100. The video transmission device 100 corresponds to a specific example of the CSI transmitter 100A. The video transmission device 100 includes, for example, an imaging unit 110, image processing units 120 and 130, and a transmission unit 140. The video transmission device 100 transmits transmission data 147A generated by performing predetermined processing on a captured image 111 obtained by the imaging unit 110 to the video reception device 200 via the data lane DL. FIG. 3 illustrates an example of a procedure of generating the transmission data 147A.

The imaging unit 110 converts, for example, an optical image signal obtained through an optical lens or the like into image data. The imaging unit 110 includes, for example, an image sensor such as a charge coupled device (CCD) image sensor, a complementary metal oxide semiconductor (CMOS) image sensor, or the like. The imaging unit 110 includes an analog-digital conversion circuit, and converts analog image data into digital image data. A data format after the conversion may be a YCbCr format in which the color of each pixel is expressed by a luminance component Y and chrominance components Cb and Cr, an RGB format, or the like. The imaging unit 110 outputs the captured image 111 (digital image data) obtained by imaging to the image processing unit 120.

The image processing unit 120 is a circuit that performs predetermined processing on the captured image 111 input from the imaging unit 110. In Underlying Technology 1, a case where the image processing unit 120 performs predetermined processing on the captured image 111 input from the imaging unit 110 in a case where a control signal for instructing cutting of an ROI is input from the video reception device 200 via the camera control interface CCI will be described. However, Underlying Technology 1 can also be applied to a case where the video transmission device 100, that is, a transmission side, specifies the coordinates of an ROI to be cut. In this case, for example, the transmission side is configured to receive information such as a "person" or an "object" to be acquired in the ROI sent from a reception side, and determine and specify the coordinates of the cutting. As a result, the image processing unit 120 generates various pieces of data (120A, 120B, and 120C) and outputs the various pieces of data to the transmission unit 140. The image processing unit 130 is a circuit that performs predetermined processing on the captured image 111 input from the imaging unit 110. The image processing unit 130 performs predetermined processing on the captured image 111 input from the imaging unit 110 in a case where a control signal for instructing outputting of a normal image is input from the video reception device 200 via the camera control interface CCI. As a result, the image processing unit 130 generates image data 130A and outputs the image data 130A to the transmission unit 140.

The image processing unit 130 includes, for example, an encoding unit 131. The encoding unit 131 encodes the captured image 111 to generate compressed image data 130A. For example, the image processing unit 130 compresses the captured image 111 in a compression format conforming to the joint photographic experts group (JPEG) standard or the like as the format of the compressed image data 130A.

The image processing unit 120 includes, for example, an ROI cutting unit 121, an ROI analysis unit 122, an overlapping detection unit 123, a priority setting unit 124, an encoding unit 125, and an image processing control unit 126.

The ROI cutting unit 121 specifies one or more objects to be imaged included in the captured image 111 input from the imaging unit 110, and sets a region of interest ROI for each specified object. The region of interest ROI is, for example, a square-shaped region including the specified object. The ROI cutting unit 121 cuts an image of each region of interest ROI (for example, an ROI image 112 in FIG. 3) from the captured image 111. The ROI cutting unit 121 further assigns a region number as an identifier to each set region of interest ROI. For example, in a case where two regions of interest ROI are set in the captured image 111, the ROI cutting unit 121 assigns a region number 1 to one region of interest ROI (for example, a region of interest ROI1 in FIG. 3), and assigns a region number 2 to the other region of interest ROI (for example, a region of interest ROI2 in FIG. 3). For example, the ROI cutting unit 121 stores the assigned identifier (region number) in a storage unit. For example, the ROI cutting unit 121 stores each ROI image 112 cut from the captured image 111 in the storage unit. The ROI cutting unit 121 further stores, for example, the identifier (region number) assigned to each region of interest ROI in the storage unit in association with the ROI image 112.

The ROI analysis unit 122 derives position information 113 of a region of interest ROI in the captured image 111 for each region of interest ROI. The position information 113 includes, for example, the upper-left end coordinates (Xa, Ya) of a region of interest ROI, the length of a region of interest ROI in an X-axis direction, and the length of a region of interest ROI in a Y-axis direction. The length of a region of interest ROI in the X-axis direction is, for example, a physical region length XLa of a region of interest ROI in the X-axis direction. The length of a region of interest ROI in the Y-axis direction is, for example, a physical region length YLa of a region of interest ROI in the Y-axis direction. The physical region length indicates a physical length (data length) of a region of interest ROI. The position information 113 may include coordinates of a position different from the upper-left end of a region of interest ROI. The ROI analysis unit 122 stores, for example, the derived position information 113 in the storage unit. For example, the ROI analysis unit 122 stores, in the storage unit, the position information 113 in association with the identifier (region number) assigned to the region of interest ROI.

The ROI analysis unit 122 may further derive, for example, an output region length XLc of a region of interest ROI in the X-axis direction and an output region length YLc of a region of interest ROI in the Y-axis direction as the position information 113 for each region of interest ROI. The output region length is, for example, a physical length (data length) of a region of interest ROI after resolution of a region of interest ROI is changed by thinning processing, pixel addition, or the like. For example, the ROI analysis unit 122 may derive, in addition to the position information 113, for example, sensing information, exposure information, gain information, an analog-digital (AD) word length, an image format, and the like for each region of interest ROI, and store the derived information in the storage unit.

The sensing information refers to a computation content for an object included in a region of interest ROI, supplementary information for post-stage signal processing for the ROI image 112, and the like. The exposure information refers to an exposure time of a region of interest ROI. The gain information refers to gain information of a region of interest ROI. The AD word length refers to a word length of data per pixel subjected to AD conversion in a region of interest ROI. The image format refers to the format of an image of a region of interest ROI. For example, the ROI analysis unit 122 may derive the number of regions of interest ROI (the number of ROIs) included in the captured image 111 and store the number in the storage unit.

In a case where a plurality of objects to be imaged is specified in the captured image 111, the overlapping detection unit 123 detects a region of overlap (ROO) in which two or more regions of interest ROI overlap each other on the basis of the position information 113 of the plurality of regions of interest ROI in the captured image 111. That is, the overlapping detection unit 123 derives position information 114 of a region of overlap ROO in the captured image 111 for each region of overlap ROO. For example, the overlapping detection unit 123 stores the derived position information 114 in the storage unit. For example, the overlapping detection unit 123 stores the derived position information 114 in the storage unit in association with the region of overlap ROO. The region of overlap ROO is, for example, a square-shaped region having the same size as or smaller than the smallest region of interest ROI among two or more regions of interest ROI overlapping each other. The position information 114 includes, for example, the upper-left end coordinates (Xb,Yb) of a region of overlap ROO, the length of a region of overlap ROO in the X-axis direction, and the length of a region of overlap ROO in the Y-axis direction. The length of a region of overlap ROO in the X-axis direction is, for example, a physical region length XLb. The length of a region of overlap ROO in the Y-axis direction is, for example, a physical region length YLb. The position information 114 may include coordinates of a position different from the upper-left end of a region of interest ROI.

The priority setting unit 124 assigns a priority 115 to each region of interest ROI in the captured image 111. The priority setting unit 124 stores, for example, the assigned priority 115 in the storage unit. For example, the priority setting unit 124 stores the assigned priority 115 in the storage unit in association with the region of interest ROI. The priority setting unit 124 may assign the priority 115 to each region of interest ROI separately from the region number assigned to each region of interest ROI, or may substitute the region number assigned to each region of interest ROI for the priority 115. For example, the priority setting unit 124 may store the priority 115 in the storage unit in association with the region of interest ROI, or may store the region number assigned to each region of interest ROI in the storage unit in association with the region of interest ROI.

The priority 115 is an identifier of each region of interest ROI, and is determination information that enables determination of from which one of a plurality of regions of interest ROI in the captured image 111 a region of overlap ROO has been omitted. For example, for two regions of interest ROI each including a region of overlap ROO, the priority setting unit 124 assigns 1 as the priority 115 to one region of interest ROI, and assigns 2 as the priority 115 to the other region of interest ROI. In this case, at the time of creating a transmission image 116 to be described later, the region of overlap ROO is omitted from the region of interest ROI whose priority 115 has a larger value. Note that the priority setting unit 124 may assign, to a region of interest ROI, the same number as a region number assigned to each region of interest ROI as the priority 115. For example, the priority setting unit 124 stores the priority 115 assigned to each region of interest ROI in the storage unit in association with the ROI image 112.

The encoding unit 125 encodes each transmission image 116 to generate compressed image data 120A. For example, the encoding unit 125 compresses each transmission image 116 in a compression format conforming to the JPEG standard or the like as the format of the compressed image data 120A. The encoding unit 125 generates each transmission image 116 before performing the above-described compression processing. The encoding unit 125 generates a plurality of transmission images 116 obtained by omitting an image 118 of the region of overlap ROO from a plurality of ROI images 112 obtained from the captured image 111 in such a manner that the image 118 is not included redundantly in the plurality of ROI images 112 obtained from the captured image 111.

For example, the encoding unit 125 determines from which of the plurality of ROI images 112 the image 118 is to be omitted on the basis of the priority 115 assigned to each region of interest ROI. Note that the encoding unit 125 may determine from which of the plurality of ROI images 112 the image 118 is to be omitted by using, for example, the region number assigned to each region of interest ROI as the priority 115. The encoding unit 125 uses an image obtained by omitting the image 118 from the ROI image 112 specified as described above as the transmission image 116 (for example, a transmission image 116a2 in FIG. 3). In a case of an ROI image 112 that does not include a region of overlap ROO or an ROI image 112 from which the image 118 is not omitted according to the above-described determination, the encoding unit 125 uses the ROI image 112 itself as the transmission image 116 (for example, a transmission image 116a1 in FIG. 3).

The image processing control unit 126 generates ROI information 120B and frame information 120C, and transmits the ROI information 120B and the frame information 120C to the transmission unit 140. The ROI information 120B includes, for example, each piece of position information 113. The ROI information 120B further includes, for example, at least one of the data type of each region of interest ROI, the number of regions of interest ROI included in the captured image 111, the region number (or the priority 115) of each region of interest ROI, the data length of each region of interest ROI, or the image format of each region of interest ROI. The frame information 120C includes, for example, a virtual channel number assigned to each frame, the data type of each region of interest ROI, the payload length of each line, and the like. The data type includes, for example, YUV data, RGB data, RAW data, or the like. The data type further includes, for example, ROI format data or normal format data. The payload length is, for example, the number of pixels included in a payload of a long packet, and is, for example, the number of pixels for each region of interest ROI. Here, the payload refers to main data (application data) transmitted between the video transmission device 100 and the video reception device 200. The long packet refers to a packet arranged between a packet header PH and a packet footer PF.

The transmission unit 140 is a circuit that generates and sends the transmission data 147A on the basis of various pieces of data (120A, 120B, 120C, and 130A) input from the image processing units 120 and 130. The transmission unit 140 sends the ROI information 120B regarding each region of interest ROI in the captured image 111 as embedded data (Embedded Data). Further, in a case where a control signal for instructing cutting of an ROI is input from the video reception device 200 via the camera control interface CCI, the transmission unit 140 sends image data (compressed image data 120A) of each region of interest ROI as payload data (Payload Data) of the long packet. At this time, the transmission unit 140 sends the image data (compressed image data 120A) of each region of interest ROI through a common virtual channel. In addition, the transmission unit 140 sends the image data (compressed image data 120A) of each region of interest ROI by an image data frame, and sends the ROI information 120B regarding each region of interest ROI by a header of the image data frame. Further, in a case where a control signal for instructing outputting of a normal image is input from the video reception device 200 via the camera control interface CCI, the transmission unit 140 sends normal image data (compressed image data 130A) as the payload data of the long packet.

The transmission unit 140 includes, for example, a LINK control unit 141, an ECC generation unit 142, a PH generation unit 143, an EBD buffer 144, an ROI data buffer 145, a normal image data buffer 146, and a combining unit 147. The LINK control unit 141, the ECC generation unit 142, the PH generation unit 143, the EBD buffer 144, and the ROI data buffer 145 perform outputting to the combining unit 147 in a case where a control signal for instructing cutting of an ROI is input from the video reception device 200 via the camera control interface CCI. In a case where a control signal for instructing outputting of a normal image is input from the video reception device 200 via the camera control interface CCI, the normal image data buffer 146 outputs a normal image to the combining unit 147.

Note that the ROI data buffer 145 may also serve as the normal image data buffer 146. In this case, the transmission unit 140 may include a selector that selects an output of any one of the ROI data buffer 145 and the ROI data buffer 145 between an output terminal of each of the ROI data buffer 145 and the ROI data buffer 145 and an input terminal of the combining unit 147.

Figure 4:
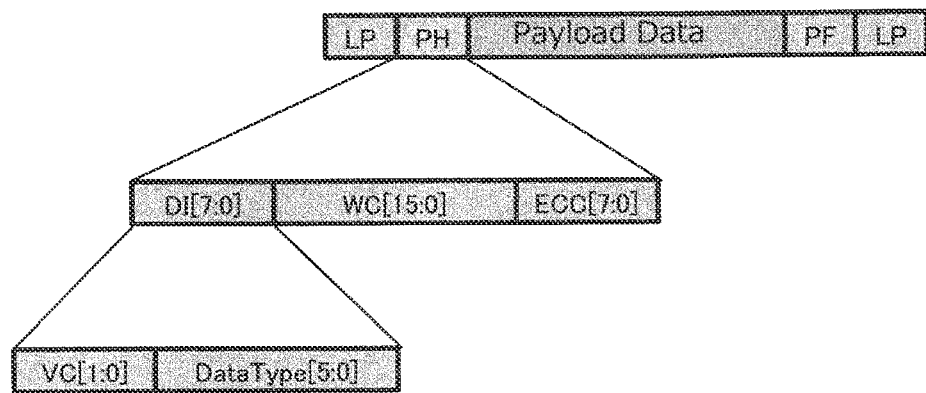
FIG. 4 is a diagram illustrating a configuration example of a packet header.

For example, the LINK control unit 141 outputs the frame information 120C to the ECC generation unit 142 and the PH generation unit 143 for each line. The ECC generation unit 142 generates an error correction code of one line on the basis of data (for example, a virtual channel number, the data type of each region of interest ROI, the payload length of each line, and the like) of the line in the frame information 120C, for example. The ECC generation unit 142 outputs the generated error correction code to the PH generation unit 143, for example. The PH generation unit 143 generates the packet header PH for each line by using, for example, the frame information 120C and the error correction code generated by the ECC generation unit 142. At this time, for example, as illustrated in FIG. 4, the packet header PH is a packet header of payload data of a long packet. The packet header PH includes, for example, DI, WC, and ECC. The WC is a region for indicating an end of a packet by the number of words for the video reception device 200. The WC includes, for example, the payload length, and includes, for example, the number of pixels of each region of interest ROI. The ECC is a region for storing a value for correcting a bit error. The ECC includes an error correction code. The DI is a region for storing a data identifier. The DI includes a virtual channel (VC) number and DataType (the data type of each region of interest ROI). The virtual channel (VC) is a concept introduced for packet flow control, and is a mechanism for supporting a plurality of independent data streams sharing the same link. The PH generation unit 143 outputs the generated packet header PH to the combining unit 147.

The EBD buffer 144 primarily stores the ROI information 120B and outputs the ROI information 120B to the combining unit 147 as the embedded data at a predetermined timing. The embedded data refers to additional information that can be embedded in a header or footer of an image data frame (see FIG. 5 as described later). The embedded data includes, for example, the ROI information 120B.

The ROI data buffer 145 primarily stores the compressed image data 120A and outputs the compressed image data 120A to the combining unit 147 as the payload data of the long packet at a predetermined timing. In a case where a control signal for instructing cutting of an ROI is input from the video reception device 200 via the camera control interface CCI, the ROI data buffer 145 outputs the compressed image data 120A to the combining unit 147 as the payload data of the long packet. The normal image data buffer 146 primarily stores the compressed image data 130A and outputs the compressed image data 130A to the combining unit 147 as the payload data of the long packet at a predetermined timing. In a case where a control signal for instructing outputting of a normal image is input from the video reception device 200 via the camera control interface CCI, the normal image data buffer 146 outputs the compressed image data 130A to combining unit 147 as the payload data of the long packet.

In a case where a control signal for instructing outputting of a normal image is input from the video reception device 200 via the camera control interface CCI, the combining unit 147 generates the transmission data 147A on the basis of input data (compressed image data 130A). The combining unit 147 outputs the generated transmission data 147A to the video reception device 200 via the data lane DL. Meanwhile, in a case where a control signal for instructing cutting of an ROI is input from the video reception device 200 via the camera control interface CCI, the combining unit 147 generates the transmission data 147A on the basis of various pieces of input data (the packet header PH, the ROI information 120B, and the compressed image data 120A). The combining unit 147 outputs the generated transmission data 147A to the video reception device 200 via the data lane DL. That is, the combining unit 147 includes, in the packet header PH of the payload data of the long packet, DataType (the data type of each region of interest ROI) and sends the packet. In addition, the combining unit 147 sends the image data (compressed image data 120A) of each region of interest ROI through a common virtual channel.

Figure 5:
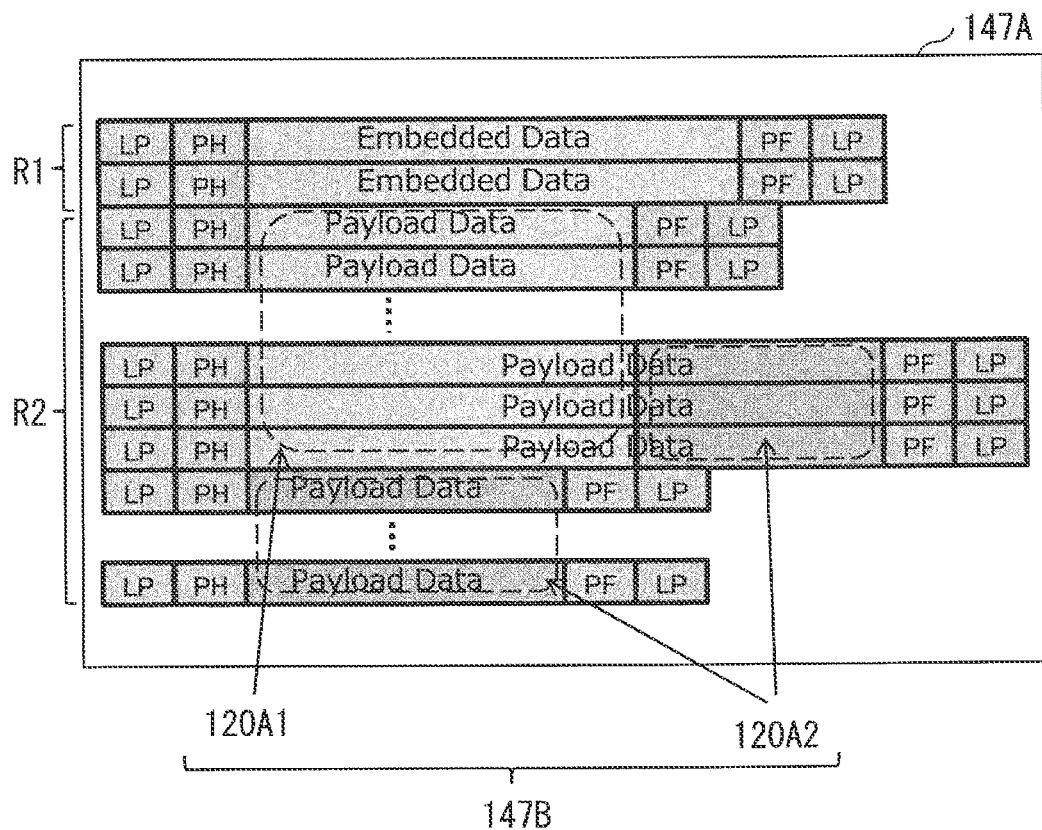
FIG. 5 is a diagram illustrating a configuration example of transmission data.

The transmission data 147A includes, for example, the image data frame as illustrated in FIG. 5. The image data frame usually includes a header region, a packet region, and a footer region. The footer region is omitted in FIG. 5 for convenience. A frame header region R1 of the transmission data 147A includes the embedded data. At this time, the embedded data includes the ROI information 120B. In FIG. 5, a packet region R2 of the transmission data 147A includes the payload data of the long packet for each line, and further includes the packet header PH and the packet footer PF at positions sandwiching the payload data of the long packet therebetween. Moreover, low power modes LP are included at positions sandwiching the packet header PH and the packet footer PF therebetween.

At this time, the packet header PH includes, for example, the DI, the WC, and the ECC. The WC includes, for example, the payload length, and includes, for example, the number of pixels of each region of interest ROI. The ECC includes an error correction code. The DI includes a virtual channel number (VC) and DataType (the data type of each region of interest ROI). In the present embodiment, the VC of each line is assigned with a common virtual channel number. Furthermore, in FIG. 5, compressed image data 147B is included in the packet region R2 of the transmission data 147A. The compressed image data 147B includes one piece of compressed image data 120A or a plurality of pieces of compressed image data 120A. Here, in FIG. 5, a packet group closer to the packet header PH includes, for example, the compressed image data 120A (120A1) of the transmission image 116a1 in FIG. 3, and a packet group away from the packet header PH includes, for example, the compressed image data 120A (120A2) of the transmission image 116a2 in FIG. 3. The two pieces of compressed image data 120A1 and 120A2 constitute the compressed image data 147B. The payload data of the long packet of each line includes pixel data for one line in the compressed image data 147B.

Figure 6:
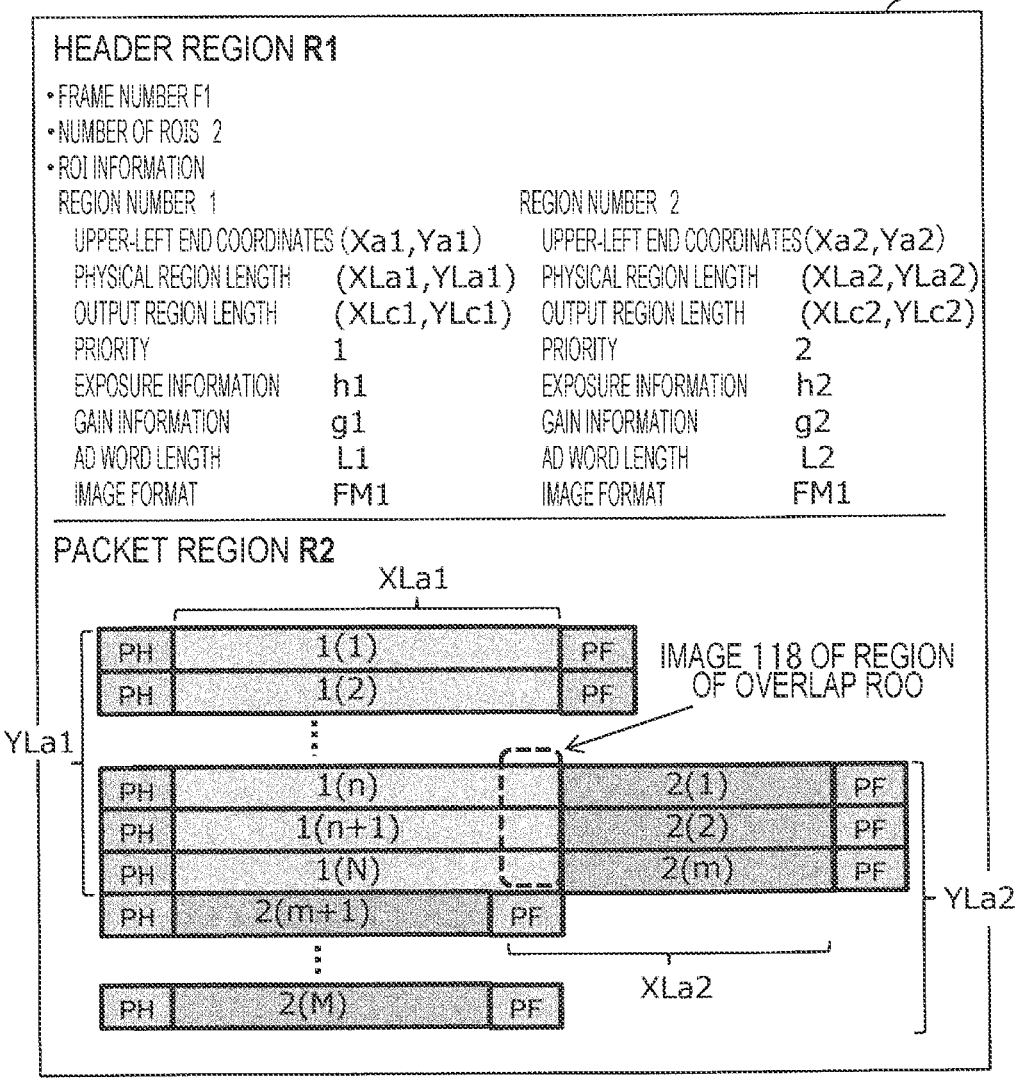
FIG. 6 is a diagram illustrating a configuration example of the transmission data.

FIG. 6 illustrates a configuration example of the transmission data 147A. The transmission data 147A includes, for example, the frame header region R1 and the packet region R2. Note that FIG. 6 illustrates contents of the frame header region R1 in detail. Furthermore, in FIG. 6, the low power modes LP are omitted.

The frame header region R1 includes, for example, a frame number F1 as the identifier of the transmission data 147A. The frame header region R1 includes information regarding the compressed image data 147B included in the packet region R2. The frame header region R1 includes, for example, the number of pieces of compressed image data 120A (the number of ROIs) included in the compressed image data 147B and information regarding the ROI image 112 corresponding to each piece of compressed image data 120A included in the compressed image data 147B (the ROI information 120B).

For example, the combining unit 147 arranges the compressed image data 147B separately for each pixel row of the compressed image data 120A in the packet region R2 of the transmission data 147A. Therefore, the compressed image data corresponding to the image 118 of the region of overlap ROO is not redundantly included in the packet region R2 of the transmission data 147A. Further, for example, the combining unit 147 omits a pixel row of the captured image 111 that does not correspond to each transmission image 116 in the packet region R2 of the transmission data 147A. Therefore, the packet region R2 of the transmission data 147A does not include a pixel row of the captured image 111 that does not correspond to each transmission image 116. Note that a portion surrounded by a broken line in the packet region R2 in FIG. 6 corresponds to the compressed image data of the image 118 of the region of overlap ROO.

A boundary between a packet group (for example, 1(n) in FIG. 6) closer to the packet header PH and a packet group (for example, 2(1) in FIG. 6) away from the packet header PH is specified by a physical region length XLa1 of the ROI image 112 corresponding to the compressed image data of the packet group (for example, 1(n) in FIG. 6) closer to the packet header PH. In the compressed image data corresponding to the image 118 of the region of overlap ROO included in the packet group (for example, 1(n) in FIG. 6) closer to the packet header PH, a start position of the packet is specified by a physical region length XLa2 of the ROI image 112 corresponding to the packet group (for example, 2(1) in FIG. 6) away from the packet header PH.

Figure 7:
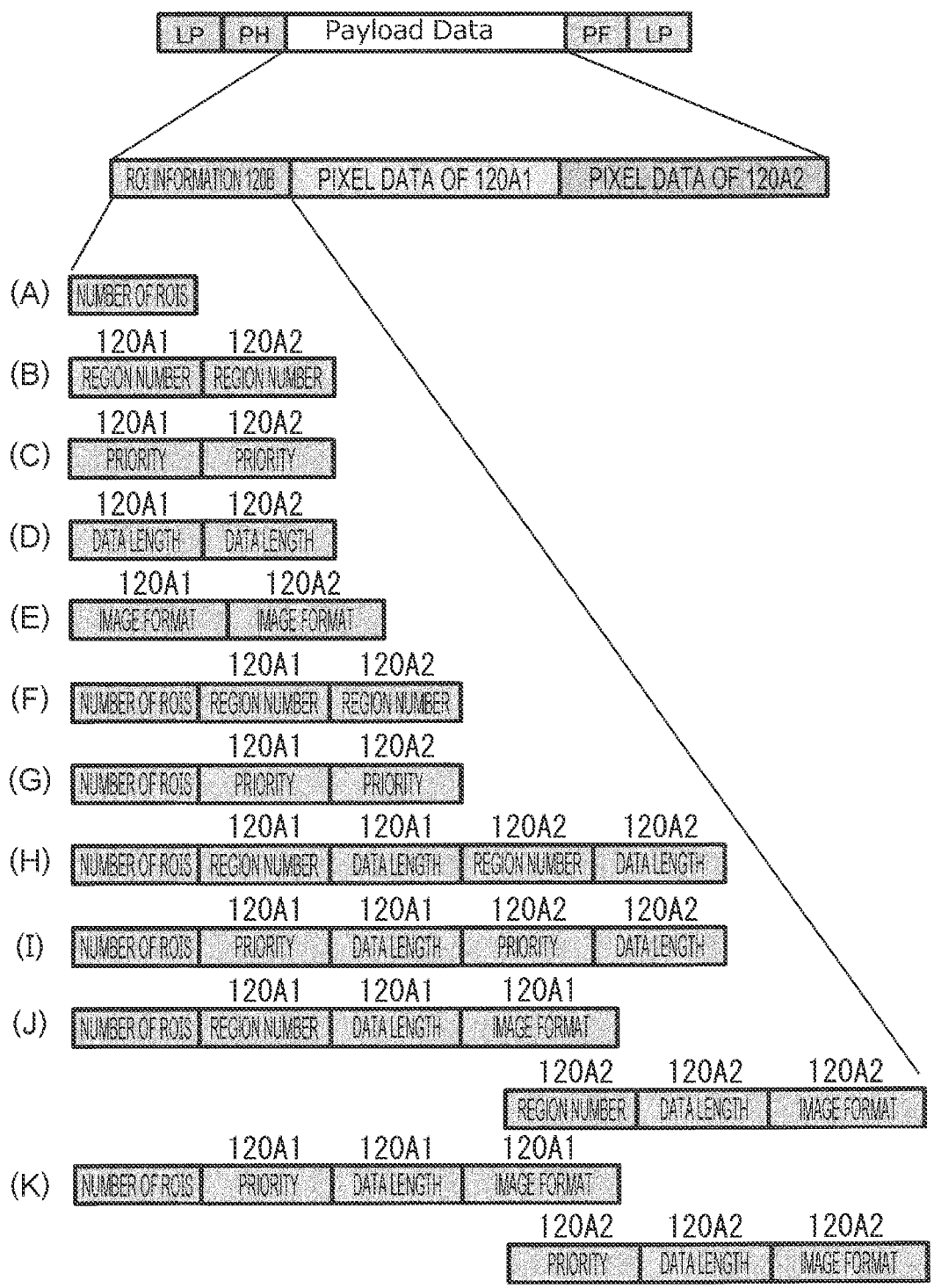
FIG. 7 is a diagram illustrating a configuration example of payload data of a long packet.

For example, the combining unit 147 may include, in the payload data of the long packet, the ROI information 120B in addition to, for example, the pixel data of one line in the compressed image data 147B as illustrated in FIG. 7 at the time of generating the payload data of the long packet for each line, in the packet region R2 of the transmission data 147A. That is, the combining unit 147 may include the ROI information 120B in the payload data of the long packet and send the payload data. At this time, for example, as illustrated in FIG. 7(A) to 7(K), the ROI information 120B includes, for example, at least one of the data type of each region of interest ROI, the number of regions of interest ROI (the number of ROIs) included in the captured image 111, the region number (or the priority 115) of each region of interest ROI, the data length of each region of interest ROI, or the image format of each region of interest ROI. The ROI information 120B is preferably arranged at an end portion (that is, the head of the payload data of the long packet) on the packet header PH side in the payload data of the long packet.

(Video Reception Device 200)

Figure 8:
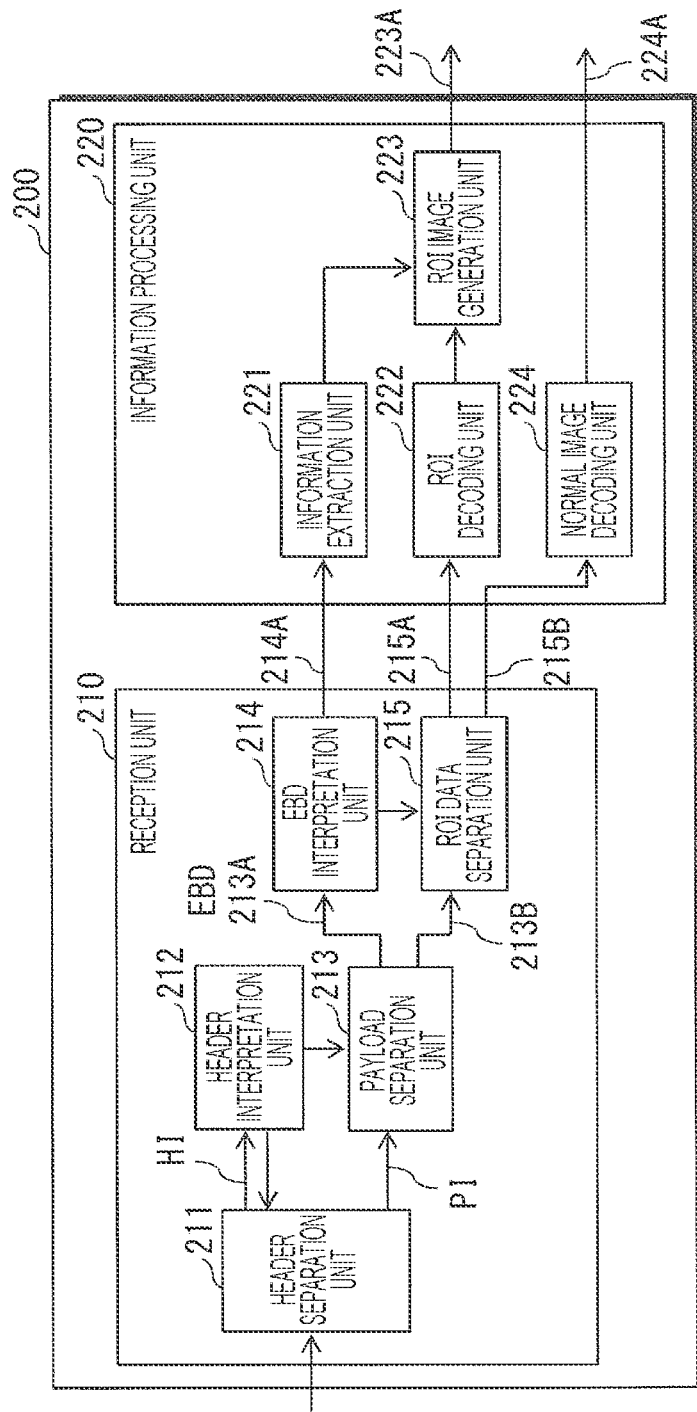
FIG. 8 is a diagram illustrating a schematic configuration example of a video reception device of FIG. 1.
Figure 9:
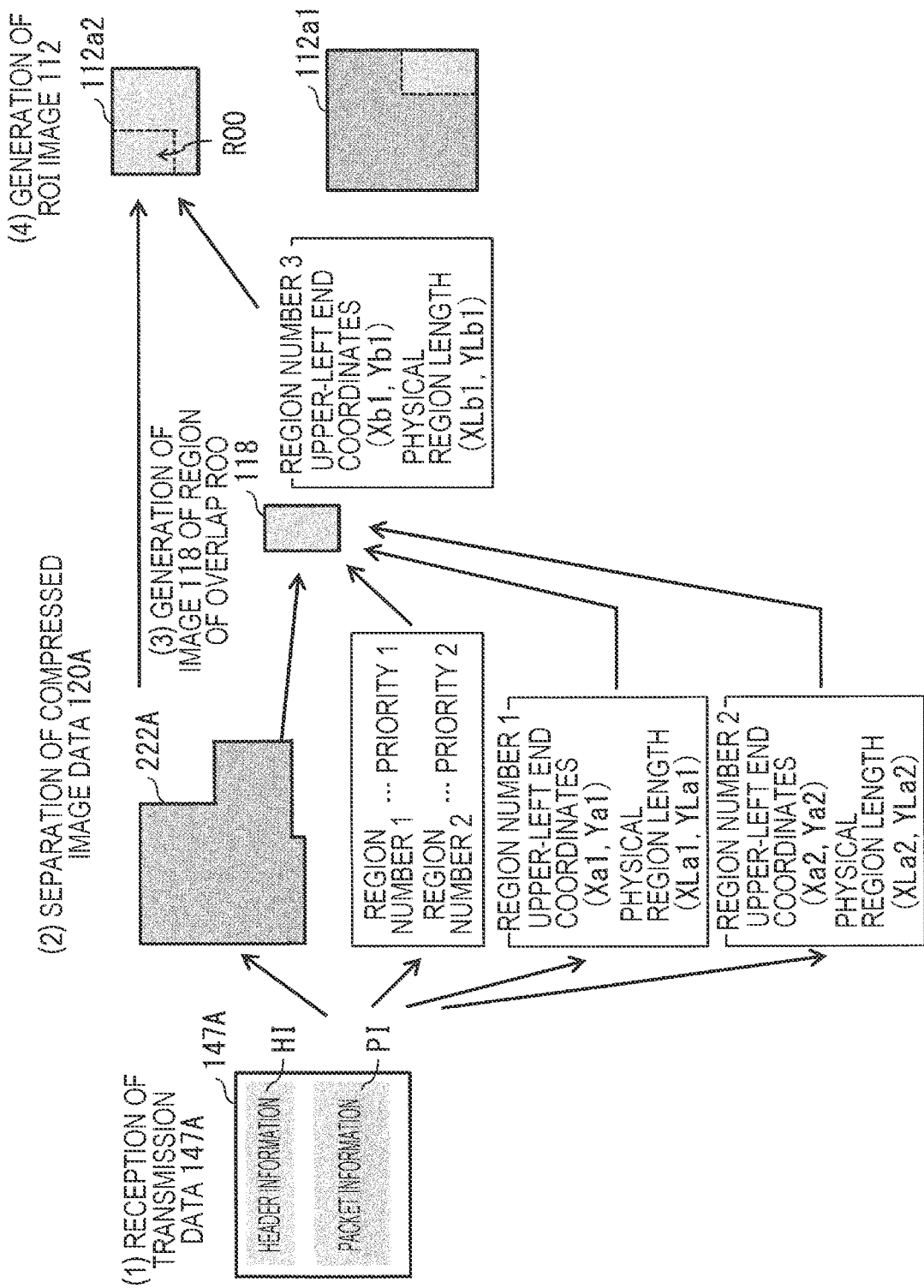
FIG. 9 is a diagram illustrating an example of a procedure of generating two ROI images included in a captured image in a case where two images are included in transmission data.

Next, the video reception device 200 will be described. FIG. 8 illustrates an example of a configuration of the video reception device 200. FIG. 9 illustrates an example of a procedure for generating an ROI image 223A in the video reception device 200. The video reception device 200 is a device that receives a signal according to a common standard (for example, the MIPI CSI-2 standard, the MIPI CSI-3 standard, or the MIPI DSI standard) with the video transmission device 100. The video reception device 200 includes, for example, the reception unit 210 and an information processing unit 220. The reception unit 210 is a circuit that receives the transmission data 147A output from the video transmission device 100 via the data lane DL, generates various pieces of data (214A, 215A, and 215B) by performing predetermined processing on the received transmission data 147A, and outputs the various pieces of data to the information processing unit 220. The information processing unit 220 is a circuit that generates the ROI image 223A on the basis of the various pieces of data (214A and 215A) received from the reception unit 210 and generates a normal image 224A on the basis of the data (215B) received from the reception unit 210.

The reception unit 210 includes, for example, a header separation unit 211, a header interpretation unit 212, a payload separation unit 213, an EBD interpretation unit 214, and an ROI data separation unit 215.

The header separation unit 211 receives the transmission data 147A from the video transmission device 100 via the data lane DL. That is, the header separation unit 211 receives the transmission data 147A in which the ROI information 120B regarding each region of interest ROI in the captured image 111 is included in the embedded data and the image data (compressed image data 120A) of each region of interest ROI is included in the payload data of the long packet. The header separation unit 211 separates the received transmission data 147A into the frame header region R1 and the packet region R2. The header interpretation unit 212 specifies the position of the payload data of the long packet included in the packet region R2 on the basis of the data (specifically, the embedded data) included in the frame header region R1. The payload separation unit 213 separates the payload data of the long packet included in the packet region R2 from the packet region R2 on the basis of the position of the payload data of the long packet specified by the header interpretation unit 212.

The EBD interpretation unit 214 outputs the embedded data as EBD data 214A to the information processing unit 220. The EBD interpretation unit 214 further determines whether the image data included in the payload data of the long packet is compressed image data 120A of image data 116 of an ROI or compressed image data 130A of normal image data on the basis of the data type included in the embedded data. The EBD interpretation unit 214 outputs the determination result to the ROI data separation unit 215.

In a case where the image data included in the payload data of the long packet is the compressed image data 120A of the image data 116 of the ROI, the ROI data separation unit 215 outputs the payload data of the long packet as payload data 215A to the information processing unit 220 (specifically, an ROI decoding unit 222). In a case where the image data included in the payload data is the compressed image data 130A of the normal image data, the ROI data separation unit 215 outputs the payload data of the long packet as payload data 215B to the information processing unit 220 (specifically, a normal image decoding unit 224). In a case where the ROI information 120B is included in the payload data of the long packet, the payload data 215A includes the ROI information 120B and pixel data of one line of the compressed image data 147B.

The information processing unit 220 extracts the ROI information 120B from the embedded data included in the EBD data 214A. The information processing unit 220 extracts, on the basis of the ROI information 120B extracted by the information extraction unit 221, an image of each region of interest ROI (ROI image 112) in the captured image 111 from the payload data of the long packet included in the transmission data 147A received by the reception unit 210. The information processing unit 220 includes, for example, an information extraction unit 221, the ROI decoding unit 222, an ROI image generation unit 223, and the normal image decoding unit 224.

The normal image decoding unit 224 decodes the payload data 215B to generate the normal image 224A. The ROI decoding unit 222 decodes the compressed image data 147B included in the payload data 215A to generate image data 222A. The image data 222A includes one or more transmission images 116.

The information extraction unit 221 extracts the ROI information 120B from the embedded data included in the EBD data 214A. For example, the information extraction unit 221 extracts the number of regions of interest ROI included in the captured image 111, the region number (or the priority 115) of each region of interest ROI, the data length of each region of interest ROI, and the image format of each region of interest ROI from the embedded data included in the EBD data 214A. That is, the transmission data 147A includes the region number (or the priority 115) of the region of interest ROI corresponding to each transmission image 116 as determination information that enables determination of from which one of the plurality of transmission images 116 obtained from the transmission data 147A the image 118 of the region of overlap ROO has been omitted.

The ROI image generation unit 223 detects a region of overlap ROO in which two or more regions of interest ROI overlap each other on the basis of the ROI information 120B obtained by the information extraction unit 221.

For example, the information extraction unit 221 extracts the coordinates (for example, the upper-left end coordinates (Xa1,Ya1)), the lengths (for example, the physical region lengths XLa1 and YLa1), and the region number 1 (or the priority 115 (=1)) of the region of interest ROI corresponding to an ROI image 112a1 from the embedded data included in the EBD data 214A. The information extraction unit 221 further extracts the coordinates (for example, the upper-left end coordinates (Xa2,Ya2)), the lengths (for example, the physical region lengths XLa2 and YLa2), and the region number 2 (or the priority 115 (=2)) of the region of interest ROI corresponding to an ROI image 112a2 from the embedded data included in the EBD data 214A.

At this time, the ROI image generation unit 223 derives the position information 114 of the region of overlap ROO on the basis of these pieces of extracted information (hereinafter, referred to as "extracted information 221A"). The ROI image generation unit 223 derives, for example, the coordinates (for example, the upper-left end coordinates (Xb1,Yb1)) and the lengths (for example, the physical region lengths XLb1 and YLb1) of the region of overlap ROO as the position information 114 of the region of overlap ROO described above.

Note that the ROI image generation unit 223 may acquire the ROI information 120B from the payload data 215A instead of acquiring the ROI information 120B from the embedded data included in the EBD data 214A. In this case, the ROI image generation unit 223 may detect a region of overlap ROO in which two or more regions of interest ROI overlap each other on the basis of the ROI information 120B included in the payload data 215A. Furthermore, the ROI image generation unit 223 may extract the extracted information 221A from the ROI information 120B included in the payload data 215A, and may derive the position information 114 of the region of overlap ROO on the basis of the extracted information 221A extracted in this manner.

The ROI image generation unit 223 further generates images (ROI images 112a1 and 112a2) of respective regions of interest ROI in the captured image 111 on the basis of image data 222A, the extracted information 221A, and the position information 114 of the region of overlap ROO. The ROI image generation unit 223 outputs the generated image as the ROI image 223A.

[Procedure]

Next, an example of a procedure for data transmission in the video transmission system 1 will be described with reference to FIGS. 3 and 9.

First, the imaging unit 110 outputs the captured image 111 (digital image data) obtained by imaging to the image processing unit 120. The ROI cutting unit 121 specifies two regions of interest ROI1 and ROI2 included in the captured image 111 input from the imaging unit 110. The ROI cutting unit 121 cuts images (ROI images 112a1 and 112a2) of the respective regions of interest ROI1 and ROI2 from the captured image 111. The ROI cutting unit 121 assigns the region number 1 as the identifier to the region of interest ROI1, and assigns the region number 2 as the identifier to the region of interest ROI2.

The ROI analysis unit 122 derives position information 113 of a region of interest ROI in the captured image 111 for each region of interest ROI. The ROI analysis unit 122 derives the upper-left end coordinates (Xa1,Ya1) of the region of interest ROI1, the length (XLa1) of the region of interest ROI1 in the X-axis direction, and the length (YLa1) of the region of interest ROI1 in the Y-axis direction on the basis of the region of interest ROI1. The ROI analysis unit 122 derives the upper-left end coordinates (Xa2,Ya2) of the region of interest ROI2, the length (XLa2) of the region of interest ROI2 in the X-axis direction, and the length (YLa2) of the region of interest ROI2 in the Y-axis direction on the basis of the region of interest ROI2.

The overlapping detection unit 123 detects a region of overlap ROO in which the two regions of interest ROI1 and ROI2 overlap each other on the basis of the position information 113 of the two regions of interest ROI1 and ROI2 in the captured image 111. That is, the overlapping detection unit 123 derives the position information 114 of the region of overlap ROO in the captured image 111. The overlapping detection unit 123 derives the upper-left end coordinates (Xb1,Yb1) of the region of overlap ROO, the length (XLb1) of the region of overlap ROO in the X-axis direction, and the length (YLb1) of the region of overlap ROO in the Y-axis direction as the position information 114 of the region of overlap ROO in the captured image 111.

For two regions of interest ROI1 and ROI2, the priority setting unit 124 assigns 1 as the priority 115 to one region of interest ROI1, and assigns 2 as the priority 115 to the other region of interest ROI2.

The encoding unit 125 generates two transmission images 116a1 and 116a2 obtained by omitting an image 118 of a region of overlap ROO from the two ROI images 112a1 and 112a2 obtained from the captured image 111 in such a manner that the image 118 is not included redundantly in the two regions of interest ROI1 and ROI2.

The encoding unit 125 determines from which of the two ROI images 112a1 and 112a2 the image 118 is to be omitted on the basis of the region numbers (or the priorities 115) of the two regions of interest ROI1 and ROI2. The encoding unit 125 omits the image 118 from the ROI image 112a2 corresponding to the region of interest ROI2 having the larger region number (or higher priority 115) among the two regions of interest ROI1 and ROI2, thereby generating the transmission image 116a2. In a case of the ROI image 112a1 corresponding to the region of interest ROI1 having the smaller region number (or lower priority 115) among the two regions of interest ROI1 and ROI2, the encoding unit 125 uses the ROI image 112a1 itself as the transmission image 116a1.

The image processing control unit 126 generates ROI information 120B and frame information 120C, and transmits the ROI information 120B and the frame information 120C to the transmission unit 140. The transmission unit 140 generates and sends the transmission data 147A on the basis of various pieces of data (120A, 120B, 120C, and 130A) input from the image processing units 120 and 130. The transmission unit 140 sends the generated transmission data 147A to the video reception device 200 via the data lane DL.

The reception unit 210 receives the transmission data 147A output from the video transmission device 100 via the data lane DL. The reception unit 210 performs predetermined processing on the received transmission data 147A to generate the EBD data 214A and the payload data 215A, and outputs the generated data to the information processing unit 220.

The information extraction unit 221 extracts the ROI information 120B from the embedded data included in the EBD data 214A. The information extraction unit 221 extracts the coordinates (for example, the upper-left end coordinates (Xa1,Ya1)), the lengths (for example, the physical region lengths XLa1 and YLa1), and the region number 1 (or the priority 115 (=1)) of the region of interest ROI corresponding to an ROI image 112a1 from the embedded data included in the EBD data 214A. The information extraction unit 221 further extracts the coordinates (for example, the upper-left end coordinates (Xa2,Ya2)), the lengths (for example, the physical region lengths XLa2 and YLa2), and the region number 2 (or the priority 115 (=2)) of the region of interest ROI corresponding to the ROI image 112a2. The ROI decoding unit 222 decodes the compressed image data 147B included in the payload data 215A to generate image data 222A.

The ROI image generation unit 223 derives the position information 114 of the region of overlap ROO on the basis of these pieces of extracted information (extracted information 221A). The ROI image generation unit 223 derives, for example, the coordinates (for example, the upper-left end coordinates (Xb1,Yb1)) and the lengths (for example, the physical region lengths XLb1 and YLb1) of the region of overlap ROO as the position information 114 of the region of overlap ROO described above. The ROI image generation unit 223 further generates images (ROI images 112a1 and 112a2) of respective regions of interest ROI in the captured image 111 on the basis of image data 222A, the extracted information 221A, and the position information 114 of the region of overlap ROO.

[Effects]

Next, effects of the video transmission system 1 according to the present embodiment will be described.

In recent years, transmission of a large amount of massive data is increasing. A large load is likely to be applied to a transmission system, and in the worst case, there is a possibility that the transmission system is down and data transmission cannot be performed.

Conventionally, an object to be imaged is specified and only an image of a cut part of the specified object is transmitted instead of, for example, transmitting all captured images in order to prevent the transmission system from being down.

Meanwhile, the MIPI CSI-2 may be used as a method used for transmission from an image sensor to an application processor. In a case where an attempt is made to transmit an ROI using this method, the transmission of the ROI is not easy due to various restrictions in some cases.

On the other hand, in the present embodiment, the ROI information 120B regarding each region of interest ROI in the captured image 111 is sent as the embedded data, and the image data of each region of interest ROI is sent as the payload data of the long packet. As a result, the device (video reception device 200) that has received the transmission data 147A transmitted from the video transmission device 100 can easily extract the image data (ROI image 112) of each region of interest ROI from the transmission data 147A. As a result, the region of interest ROI can be sent even under various constraints.

Furthermore, in the present embodiment, the image data (compressed image data 120A) of each region of interest ROI is sent through a common virtual channel. As a result, a plurality of ROI images 112 can be sent in the same packet, and it is thus not necessary to enter the LP mode while sending the plurality of ROI images 112, as a result of which high transmission efficiency can be obtained.

Furthermore, in the present embodiment, the data type of each region of interest ROI is included in the packet header PH of the payload data of the long packet and sent. As a result, the data type of each region of interest ROI can be obtained only by accessing the packet header PH of the payload data of the long packet without accessing the embedded data. Therefore, a processing speed in the video reception device 200 can be increased, as a result of which high transmission efficiency can be obtained.

Furthermore, in the present embodiment, in a case where the ROI information 120B is included in the payload data of the long packet and sent, the ROI information 120B can be obtained only by accessing the payload data of the long packet without accessing the embedded data. Therefore, a processing speed in the video reception device 200 can be increased, as a result of which high transmission efficiency can be obtained.

Furthermore, in the present embodiment, the ROI information 120B regarding each region of interest ROI is extracted from the embedded data included in the transmission data 147A, and the image (ROI image 112) of each region of interest ROI is extracted from the payload data of the long packet included in the transmission data 147A on the basis of the extracted ROI information 120B. As a result, the image (ROI image 112) of each region of interest ROI can be easily extracted from the transmission data 147A. As a result, the region of interest ROI can be sent even under various constraints.

2. Underlying Technology 2 of Present Disclosure

Figure 10:
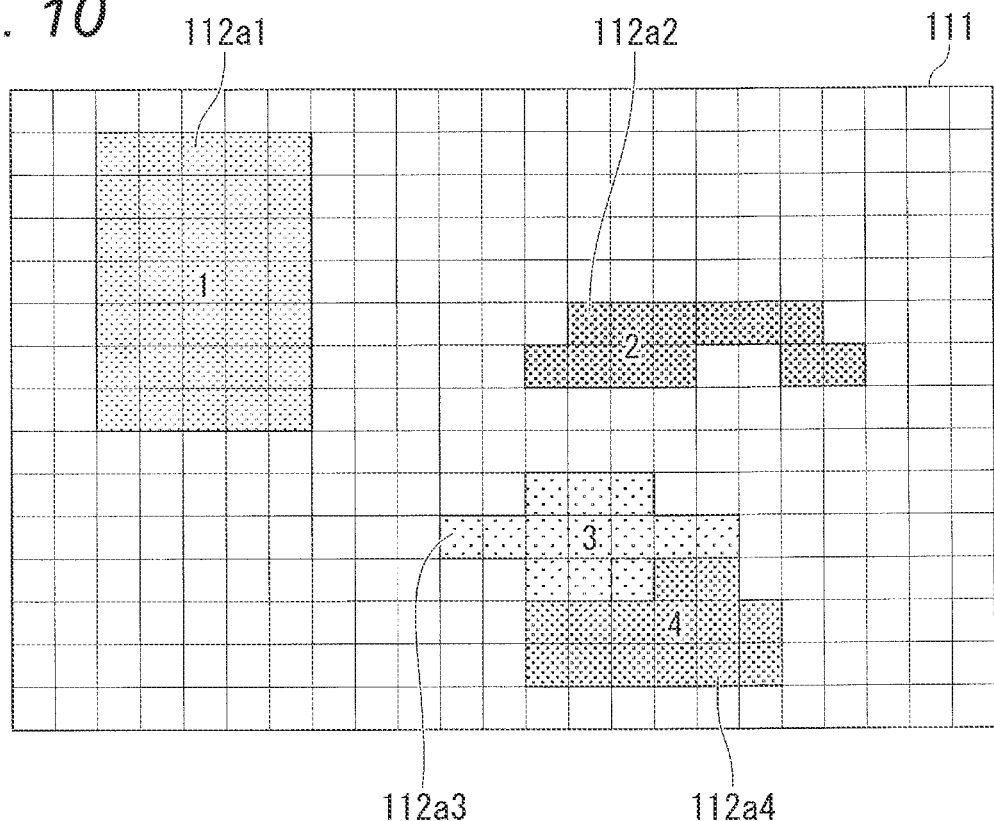
FIG. 10 is a diagram schematically illustrating a region in which a specified object is arranged in a captured image.
Figure 11:
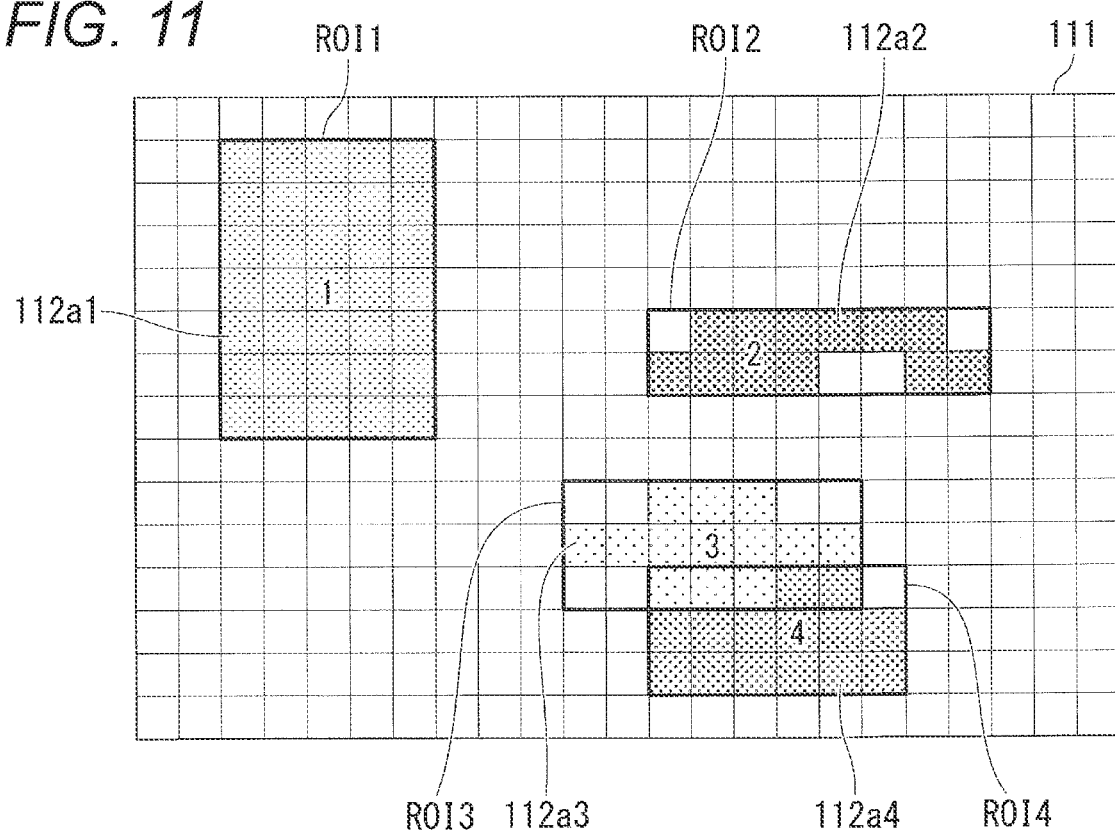
FIG. 11 is a diagram illustrating an example of an ROI set for a specified object.

A technology for transmitting some (non-rectangular) regions of interest (ROIs) cut from a captured image will be described with reference to FIGS. 1 to 9 and FIGS. 10 to 12. That is, a technology for transmitting and receiving an image of an object to be captured having a shape other than a square shape (rectangular shape) will be described. FIG. 10 is a diagram schematically illustrating a region in which a specified object is arranged in the captured image 111. Note that FIG. 10 schematically illustrates the captured image 111 captured in an imaging region including 15 rows×23 columns of imaging elements in order to facilitate understanding. FIG. 11 is a diagram illustrating an example of an ROI set for a specified object.

In Underlying Technology 2, similarly to Underlying Technology 1, a case where predetermined processing is performed on the captured image 111 input from the imaging unit 110 in a case where a control signal for instructing cutting of an ROI is input from the video reception device 200 to the video transmission device 100 via the camera control interface CCI will be described. However, Underlying Technology 2 can also be applied to a case where the video transmission device 100, that is, a transmission side, specifies the coordinates of an ROI to be cut. In this case, for example, the transmission side is configured to receive information such as a "person" or an "object" to be acquired in the ROI sent from a reception side, and determine and specify the coordinates of the cutting.

The control signal for instructing cutting of an ROI is input from the video reception device 200 via the camera control interface CCI. As a result, as illustrated in FIG. 10, the ROI cutting unit 121 specifies four objects 1 to 4 to be captured included in the captured image 111. The object 1 has, for example, a rectangular shape that occupies a part of the upper-left region in the captured image 111. The object 2 occupies, for example, a partial region on the right side of the object 1 in the captured image 111, and has a shape in which opposite upper side corners of a rectangle and a part of the lower edge of the rectangle are missing. The object 3 occupies, for example, a partial region below the object 2 in the captured image 111, and has a shape in which four corners of a rectangle are missing. The object 4 occupies, for example, a partial region under the object 3 in the captured image 111, and has a shape in which opposite upper side corners of a rectangle are missing. The object 3 and the object 4 partially overlap each other.

As illustrated in FIG. 11, the ROI cutting unit 121 (see FIG. 2) sets the smallest rectangles including the specified objects 1 to 4 as regions of interest ROI1 to ROI4, respectively. The ROI cutting unit 121 sets the region of interest ROI1 for the object 1 and cuts an ROI image 112a1. In addition, the ROI cutting unit 121 sets the region of interest ROI2 for the object 2 and cuts an ROI image 112a2. In addition, the ROI cutting unit 121 sets the region of interest ROI3 for the object 3 and cuts an ROI image 112a3. Moreover, the ROI cutting unit 121 sets the region of interest ROI4 for the object 4 and cuts an ROI image 112a4.

The ROI cutting unit 121 stores the region of interest ROI1 and the region number "1" assigned to the region of interest ROI1 in the storage unit in association with each other. The ROI cutting unit 121 stores the region of interest ROI2 and the region number "2" assigned to the region of interest ROI2 in the storage unit in association with each other. The ROI cutting unit 121 stores the region of interest ROI3 and the region number "3" assigned to the region of interest ROI3 in the storage unit in association with each other. The ROI cutting unit 121 stores the region of interest ROI4 and the region number "4" assigned to the region of interest ROI4 in the storage unit in association with each other.

The ROI analysis unit 122 (see FIG. 2) derives the position information of each of the regions of interest ROI1 to ROI4. The ROI analysis unit 122 derives, for example, a physical region length XLa1 in the X-axis direction and a physical region length YLa1 in the Y-axis direction as the position information of the region of interest ROI1. The ROI analysis unit 122 derives, for example, a physical region length XLa2 in the X-axis direction and a physical region length YLa2 in the Y-axis direction as the position information of the region of interest ROI2. The ROI analysis unit 122 derives, for example, a physical region length XLa3 in the X-axis direction and a physical region length YLa3 in the Y-axis direction as the position information of the region of interest ROI3. The ROI analysis unit 122 derives, for example, a physical region length XLa4 in the X-axis direction and a physical region length YLa4 in the Y-axis direction as the position information of the region of interest ROI4. The ROI analysis unit 122 may further derive, for example, an output region length XLc of a region of interest ROI in the X-axis direction and an output region length YLc of a region of interest ROI in the Y-axis direction as the position information 113 for each region of interest ROI.

The ROI analysis unit 122 derives the lengths of each region of interest ROI in the X-axis direction and the Y-axis direction, thereby deriving the size and the total data amount of each of the regions of interest ROI1 to ROI4 as information for the subsequent stage. As a result, the video reception device 200 corresponding to the subsequent stage can secure a memory region.

The ROI analysis unit 122 is configured to derive the position information of the ROI images 112al to 112a4 instead of the position information of the regions of interest ROI in a case where the shapes of the object to be captured and the region of interest do not match. The ROI analysis unit 122 derives the left end coordinates (xn,yn) of each row and a physical region length XLn in the X-axis direction as the position information of the ROI images 112al to 112a4. In addition, in a case where the ROI images are separated as in the second row of the ROI image 112a2, the ROI analysis unit 122 derives the position information of each of the separated portions. The ROI analysis unit 122 stores the region numbers of the regions of interest ROI1 to ROI4 and the position information of the ROI images 112a1 to 112a4 in the storage unit in association with each other.

Furthermore, the ROI analysis unit 122 may derive, in addition to the position information, for example, sensing information, exposure information, gain information, an AD word length, an image format, and the like for each of the regions of interest ROI1 to ROI4, and store the derived information in the storage unit in association with the region number.

In a case where the object to be captured has a rectangular shape, the overlapping detection unit 123 (see FIG. 2) derives a region where the ROI images overlap each other as a region of overlap, instead of a region where the regions of interest overlap each other. As illustrated in FIG. 11, the overlapping detection unit 123 derives a region of overlap ROO as a region where the ROI image 112a3 and the ROI image 123a4 overlap each other. The overlapping detection unit 123 stores the derived region of overlap ROO in the storage unit in association with the position information of each of the regions of interest ROI3 and ROI4.

The priority setting unit 124 (see FIG. 2) assigns the priority "1" to the region of interest ROI1, and stores the priority (1) in the storage unit in association with the region of interest ROI1. The priority setting unit 124 assigns the priority "2" lower than the priority "1" to the region of interest ROI2, and stores the priority (2) in the storage unit in association with the region of interest ROI2. The priority setting unit 124 assigns the priority "3" lower than the priority "2" to the region of interest ROI3, and stores the priority (3) in the storage unit in association with the region of interest ROI3. The priority setting unit 124 assigns the priority "4" lower than the priority "3" to the region of interest ROI4, and stores the priority (4) in the storage unit in association with the region of interest ROI4.

The encoding unit 125 (see FIG. 2) generates a transmission image for each of the ROI images 112al to 112a4. Since the region of interest ROI4 is lower in priority than the region of interest ROI3, the encoding unit 125 generates the transmission image by omitting the region of overlap ROO from the ROI image 112a4.

The image processing control unit 126 (see FIG. 2) generates ROI information and frame information, and transmits the ROI information and the frame information to the transmission unit 140 (see FIG. 2). The ROI information includes, for example, the position information of each of the ROI images 112al to 112a4. The ROI information further includes information similar to that in the case where the object to be captured has a rectangular shape (for example, the data type of each of the regions of interest ROI1 to ROI4, the number of the regions of interest ROI1 to ROI4 included in the captured image 111, the region numbers and priorities of the regions of interest ROI1 to ROI4, and the like). The frame information includes, for example, information similar to that in the case where the object to be imaged has a rectangular shape, such as the data types of the regions of interest ROI1 to ROI4.

The LINK control unit 141 provided in the transmission unit 140 (see FIG. 2) outputs the frame information and the ROI information input from the image processing control unit 126 to the ECC generation unit 142 and the PH generation unit 143 (see FIG. 2) for each line. The ECC generation unit 142 generates an error correction code of one line on the basis of data (for example, a virtual channel number, the data type of each of the regions of interest ROI1 to ROI4, the payload length of each line, and the like) of the line in the frame information, for example. The ECC generation unit 142 outputs the generated error correction code to the PH generation unit 143, for example. The PH generation unit 143 generates the packet header PH (see FIG. 4) for each line by using, for example, the frame information and the error correction code generated by the ECC generation unit 142.

The EBD buffer 144 (see FIG. 2) primarily stores the ROI information and outputs the ROI information to the combining unit 147 (see FIG. 2) as embedded data at a predetermined timing.

The ROI data buffer 145 (see FIG. 2) primarily stores compressed image data input from the encoding unit 125, and outputs, in a case where a control signal for instructing cutting of an ROI is input from the video reception device 200 via the camera control interface CCI, outputs the compressed image data 120A to the combining unit 147 as payload data of a long packet, for example.

In a case where a control signal for instructing cutting of an ROI is input from the video reception device 200 via the camera control interface CCI, the combining unit 147 generates transmission data 147A on the basis of various pieces of input data (the packet header PH, the ROI information, and the compressed image data that is input from the encoding unit 125 via the ROI data buffer 145). The combining unit 147 outputs the generated transmission data 147A to the video reception device 200 via the data lane DL. That is, the combining unit 147 includes, in the packet header PH of the payload data of the long packet, the data type of each of the regions of interest ROI1 to ROI4 and sends the packet. In addition, the combining unit 147 sends the image data (compressed image data) of each of the regions of interest ROI1 to ROI4 through a common virtual channel.

In a case where the object to be captured does not have rectangular shape, the position information of each of the ROI images 112a1 to 112a4 is included in the packet header PH or the payload data of the long packet. The position information of each of the ROI images 112a1 to 112a4 is included in the packet header PH by the PH generation unit 143. Meanwhile, the position information of each of the ROI images 112a1 to 112a4 is included in the payload data of the long packet by the combining unit 147.

FIG. 12 is a diagram illustrating a configuration example of the transmission data 147A in which the position information of each of the ROI images 112a1 to 112a4 is included in the payload data of the long packet. As illustrated in FIG. 12, the transmission data 147A includes, for example, a frame header region R1 and a packet region R2. Note that FIG. 12 illustrates contents of the frame header region R1 in detail. Furthermore, in FIG. 12, the low power modes LP are omitted.

The frame header region R1 includes, for example, a frame number F1 as the identifier of the transmission data 147A. The frame header region R1 includes information regarding compressed image data included in the packet region R2. The frame header region R1 includes, for example, the number of pieces of compressed image data (the number of ROIs) and information regarding each of the ROI images 112a1 to 112a4 corresponding to the respective compressed image data (ROI information). The ROI information includes a region number, a physical region length, a rectangular output region size, a priority, exposure information, gain information, an AD word length, and an image format. The physical region length is the maximum length of an ROI image, and the rectangular output region size is the size of a region of interest ROI.

"Info" illustrated in FIG. 12 indicates region information stored in the payload of the long packet. The position information of each of the ROI images 112a1 to 112a4 is stored in "Info", for example. The position information of each of the ROI images 112a1 to 112a4 is stored in the head portion of the payload of the long packet. In a case where the physical region lengths of the respective consecutive pixel rows included in the ROI image in the X-axis direction are the same and the ROI images having different region numbers are not included in the respective pixel rows, the region information "info" does not have to be stored in the payload of the long packet including the image data of the second and subsequent pixel rows among the respective pixel rows. In this example, in the ROI image 112a1, the physical region lengths of the first to fourth consecutive pixel rows among all the pixel rows in the X-axis direction are the same, and the ROI images having different region numbers are not included in the first to fourth pixel rows. Therefore, the region information "info" is not stored in the payload of each long packet including the image data of the second to fourth pixel rows corresponding to the second and subsequent pixel rows among the first to fourth consecutive pixel rows included in the ROI image 112a1. Furthermore, in this example, in the ROI image 112a4, the physical region lengths of the second and third consecutive pixel rows among all the pixel rows in the X-axis direction are the same, and the ROI images having different region numbers are not included in the second and third pixel rows. Therefore, the region information "info" is not stored in the payload of the long packet including the image data of the third pixel row corresponding to the second and subsequent pixel rows among the second and third consecutive pixel rows included in the ROI image 112a4. Note that even in a case where the physical region lengths in the X-axis direction are the same and the ROI images having different region numbers are not included in each pixel row, the region information "info" may be stored in the payload of each row.

For example, the combining unit 147 divides and arranges compressed image data generated by compressing each of the ROI images 112a1 to 112a4 for each pixel row in the packet region R2 of the transmission data 147A. "1" illustrated in FIG. 12 indicates the compressed image data of the ROI image 112a1 stored in the payload of the long packet. "2" illustrated in FIG. 12 indicates the compressed image data of the ROI image 112a2 stored in the payload of the long packet. "3" illustrated in FIG. 12 indicates the compressed image data of the ROI image 112a3. "4" illustrated in FIG. 12 indicates the compressed image data of the ROI image 112a4 stored in the payload of the long packet. Note that, in FIG. 12, each piece of compressed image data is illustrated in a divided manner for easy understanding, but there is no division in data stored in a payload of a long packet. Compressed image data 112b corresponding to the image of the region of overlap ROO is not redundantly included in the packet region R2 of the transmission data 147A. Further, for example, the combining unit 147 omits a pixel row of the captured image 111 that does not correspond to each transmission image in the packet region R2 of the transmission data 147A. Therefore, the packet region R2 of the transmission data 147A does not include a pixel row of the captured image 111 that does not correspond to each transmission image.

Next, an operation of the video reception device 200 in a case where the transmission data 147A is received will be described.

The header separation unit 211 (see FIG. 8) provided in the reception unit 210 receives the transmission data 147A from the video transmission device 100 via the data lane DL. That is, the header separation unit 211 receives the transmission data 147A in which the ROI information regarding each of the regions of interest ROI1 to ROI4 in the captured image 111 is included in the embedded data and the image data (compressed image data) of each of the regions of interest ROI1 to ROI4 is included in the payload data of the long packet. The header separation unit 211 separates the received transmission data 147A into the frame header region R1 and the packet region R2.

The header interpretation unit 212 (see FIG. 8) specifies the position of the payload data of the long packet included in the packet region R2 on the basis of the data (specifically, the embedded data) included in the frame header region R1.

The payload separation unit 213 (see FIG. 8) separates the payload data of the long packet included in the packet region R2 from the packet region R2 on the basis of the position of the payload data of the long packet specified by the header interpretation unit 212.

The EBD interpretation unit 214 outputs the embedded data as EBD data to the information processing unit 220 (see FIG. 8). The EBD interpretation unit 214 further determines whether the image data included in the payload data of the long packet is compressed image data of image data 116 of an ROI or compressed image data of normal image data on the basis of the data type included in the embedded data. The EBD interpretation unit 214 outputs the determination result to the ROI data separation unit 215 (see FIG. 8).

In a case where image data of an ROI as the image data included in the payload data of the long packet is input, the ROI data separation unit 215 outputs the payload data of the long packet as the payload data to the information processing unit 220 (specifically, the ROI decoding unit 222 (see FIG. 8)). The payload data of the long packet including the ROI information includes pixel data of one line of the ROI information and the compressed image data.

The information extraction unit 221 (see FIG. 8) provided in the information processing unit 220 extracts the number of regions of interest ROI1 to ROI4 included in the captured image 111 (four in this example), the region numbers 1 to 4 and the priorities 1 to 4 of the regions of interest ROI1 to ROI4, the data length of each of the regions of interest ROI1 to ROI4, and the image format of each of the regions of interest ROI1 to ROI4 from the embedded data included in the EBD data input from the EBD interpretation unit 214. Moreover, the information extraction unit 221 extracts the position information of each of the ROI images 112a*l* to 112a4 from the embedded data.

The ROI decoding unit 222 decodes the compressed image data 147B included in the payload data, extracts the position information of each of the ROI images 112a*l* to 112a4, and generates the image data (generated from the transmission image). For example, in a case where the payload data corresponding to the sixth pixel row is input, the ROI decoding unit 222 extracts one piece of position information of the ROI image 112a*l* and two pieces of position information of the ROI image 112a2 from the payload data, and generates the image data (transmission image) of each of the ROI images 112a*l* and 112b1 corresponding to the sixth pixel row.

For example, in a case where the payload data corresponding to the tenth pixel row is input, the ROI decoding unit 222 extracts one piece of position information of the ROI image 112a3 and one piece of position information of the ROI image 112a4 from the payload data, and generates the image data (transmission image) of each of the ROI images 112a3 and 112b4.

The ROI image generation unit 223 (see FIG. 8) generates the ROI images 112a1 to 112a4 of the regions of interest ROI1 to ROI4 in the captured image 111 on the basis of the ROI information obtained by the information extraction unit 221, the position information of each of the ROI images 112a1 to 112a4 extracted by the ROI decoding unit 222, and the transmission image generated by the ROI decoding unit 222. For example, in a case where one piece of position information of the ROI image 112a*l* and two pieces of position information of the ROI image 112a2 extracted from the payload data corresponding to the sixth pixel row, and the transmission images thereof are input, the ROI image generation unit 223 generates the ROI image 112a*l* corresponding to five pixels and extending in the X-axis direction, the ROI image 112a2 corresponding to four pixels and extending in the X-axis direction at a position separated from the ROI image 112a*l* by five pixels, and the ROI image 112a2 corresponding to two pixels and extending in the X-axis direction at a position separated from the ROI image 112a2 by two pixels (see FIG. 10).

In addition, the ROI image generation unit 223 detects the region of overlap ROO in which the region of interest ROI3 and the region of interest ROI4 overlap each other on the basis of the ROI information obtained by the information extraction unit 221. The ROI image generation unit 223 generates, on the basis of the detected region of overlap ROO, the position information of each of the ROI images 112a3 and 112a4 extracted from the payload data corresponding to the tenth pixel row, and the transmission image, the ROI image 112a3 corresponding to four pixels and extending in the X-axis direction and the ROI image 112a4 corresponding to three pixels and extending in the X-axis direction in a state where one pixel overlaps with the ROI image 112a3 (see FIG. 10).

The ROI image generation unit 223 outputs the generated image as an ROI image to a device in the subsequent stage (not illustrated).

In this manner, the video transmission device 100 and the video reception device 200 can transmit and receive an ROI image even in a case where an object to be captured has a shape other than a rectangular shape.

3. Principle of Restoration Processing in Embodiment of Present Disclosure

Next, the principle of restoration processing in an embodiment of the present disclosure will be described with reference to FIGS. 13 to 17. The restoration processing in the embodiment of the present disclosure (hereinafter, referred to as the present embodiment) is processing of restoring image data of a region of interest (ROI) input from a video transmission device to a video reception device so as to be displayable on a predetermined display device. For example, various types of processing (for example, writing in a frame memory, outputting image data of a region of interest to a predetermined display device, and the like) related to display of the image data of the region of interest can be efficiently performed by executing the restoration processing in the video reception device and restoring the image data of the region of interest.

3-1. Sending of Image Data of Region of Interest in Video Transmission Device

Figures 13, 14:
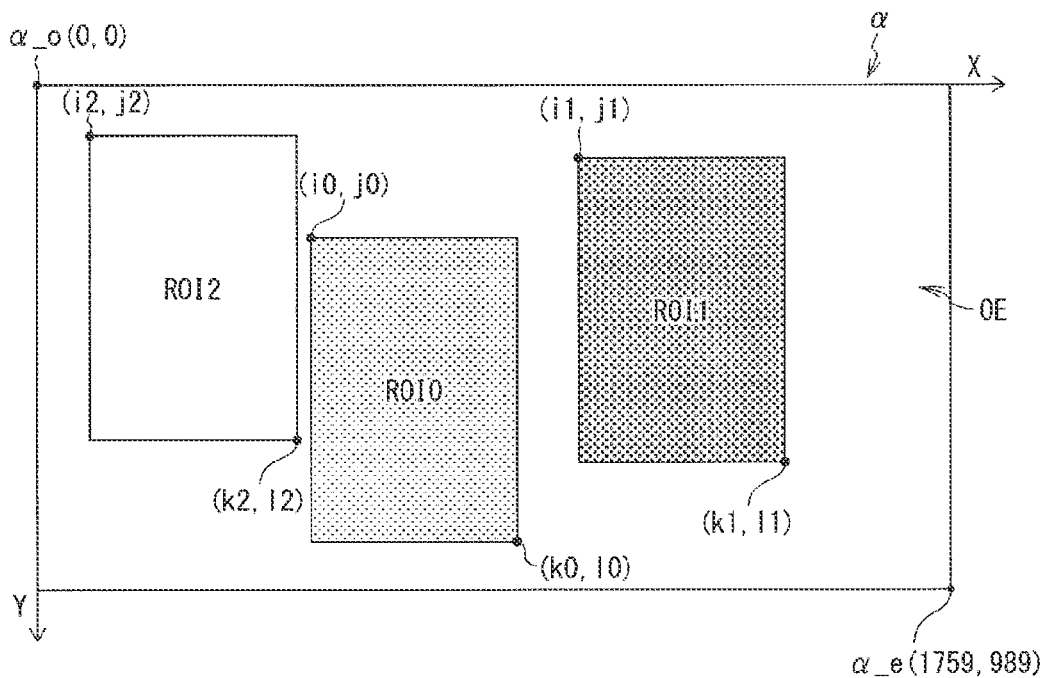
FIG. 13 is a diagram schematically illustrating an example of a captured image according to an embodiment of the present disclosure.
FIG. 14 is a diagram illustrating coordinates and image sizes of regions of interest illustrated in FIG. 13.

First, as a pre-stage of the restoration processing, processing until the image data of the region of interest is input to the video reception device will be described. As described above, image data of a region of interest cut from a captured image is sent as payload data from the video transmission device. FIG. 13 is a view schematically illustrating an example of a captured image obtained by the imaging unit of the video transmission device. In FIG. 13, a captured image α is illustrated in association with pixel coordinates. In this example, a plurality of (three in this example) regions of interest (ROI0, ROI1, and ROI2) is set in the captured image α. Hereinafter, the restoration processing will be described using the regions of interest ROI0 to ROI2 illustrated in FIG. 13 as a specific example.

In this example, a coordinate system of the captured image α is an XY orthogonal coordinate system formed in the X-axis direction (horizontal direction) and the Y-axis direction (vertical direction) of the captured image α with a pixel at an upper-left end portion as an origin α_o. Furthermore, as illustrated in FIG. 13, the coordinates of a lower-right end portion (end point) α_e of the captured image α are (1759,989). That is, the captured image α of this example is a rectangular image having a width (a length in the X-axis direction) of 1760 pixels and a height (a length in the Y-axis direction) of 990 pixels. In this example, for example, it is assumed that three regions of interest (ROI0, ROI1, and ROI2) set on the basis of an instruction by a control signal from the video reception device are cut from the captured image α. Each of the regions of interest ROI0 to ROI2 is a rectangular region. In addition, each of the regions of interest ROI0 to ROI2 is arranged at a predetermined interval without overlapping each other. Further, in the captured image α, a region where the region of interest ROI is not arranged is set as a non-region of interest OE.

FIG. 14 is a diagram illustrating coordinates and an image size of each of three regions of interest (ROI1, ROI2, and ROI3) included in the captured image α, in the captured image α. As for the coordinates of the regions of interest, coordinates closest to the origin α_o of the captured image α are upper-left end coordinates (start point coordinates), and coordinates farthest from the origin α_o are lower-right end coordinates (end point coordinates). Furthermore, the size of the region of interest includes the length in the X-axis direction indicating the width of the region of interest and the length in the Y-axis direction indicating the height of the region of interest. The arrangement state in the captured image, that is, the position in the captured image and the image size, can be obtained by using at least the start point coordinates, the X-axis direction length, and the Y-axis direction length of the rectangular region of interest.

As illustrated in FIG. 14, in this example, the region of interest ROI0 is arranged at a position where the start point coordinates are the start point X coordinate i0=520 and the start point Y coordinate j0=300, and the end point coordinates are the end point X coordinate k0=919 and the end point Y coordinate l0=899 in the captured image α. In addition, the region of interest ROI1 is arranged at a coordinate position where the start point coordinates are the start point X coordinate i1=1040 and the start point Y coordinate j1=140, and the end point coordinates are the end point X coordinate k1=1439 and the end point Y coordinate l1=739. In addition, the region of interest ROI2 is arranged at a coordinate position where the start point coordinates are the start point X coordinate i2=100 and the start point Y coordinate j2=100, and the end point coordinates are the end point X coordinate k2=499 and the end point Y coordinate l2=699. Furthermore, in this example, each of the regions of interest ROI0 to ROI2 has the length of 400 pixels in the X-axis direction and the length of 600 pixels in the Y-axis direction.

As illustrated in FIGS. 13 and 14, in this example, among the start point coordinates of the regions of interest ROI0 to ROI2, the X coordinate i2 (100) of the region of interest ROI2 is closest to the origin α_o, followed by the start point X coordinate i0 (520) of the region of interest ROI0 and the start point X coordinate i1 (1040) of ROI1. Therefore, the relative positions of the regions of interest ROI0 to ROI2 in the X-axis direction in the captured image α are arranged in the order of the region of interest ROI2, the region of interest ROI0, and the region of interest ROI1. Furthermore, in this example, among the Y coordinates of the start point coordinates of the regions of interest ROI0 to ROI2, the Y coordinate of the region of interest ROI2 is closest to the origin α_o, followed by the Y coordinate of the region of interest ROI1 and the Y coordinate of the region of interest ROI0. Therefore, as illustrated in FIG. 13, the relative positions of the regions of interest ROI0 to ROI2 in the Y-axis direction in the captured image α are arranged in the order of the region of interest ROI2, the region of interest ROI1, and the region of interest ROI0.

In the video transmission device, for example, in a case where a control signal for instructing cutting of ROI0 to ROI2 illustrated in FIG. 13 is input from the video reception device, a cutting position at which an image is cut from an imaging region of the imaging unit 31, that is, the start point coordinates and the image size (the lengths in the X-axis direction and the Y-axis direction) of each of the regions of interest ROI0 to ROI2 are determined. The determined start point coordinates and image size are included in the ROI information as position information and size information, respectively. That is, the ROI information includes the position information and the size information corresponding to a predetermined number of regions of interest (ROIs) cut from the captured image. The ROI information is set as the embedded data in the frame header region of the transmission data and sent from the video transmission device.

The ROI information set in the embedded data may be limited by a transmission standard specification or the like. In the present embodiment, the ROI information is generated by using the start point coordinates and the image size as the position information and the size information, respectively, as the minimum data that enables determination of the position and the size of the region of interest in the captured image in the video reception device. In the present embodiment, the end point coordinates indicating the lower-right end of the region of interest are not included in the ROI information, but in FIG. 14, the end point coordinates are displayed together with the start point coordinates for easy understanding. Note that the present disclosure may be configured to include the end point coordinates of the region of interest as the position information in the ROT information. The position information in the present disclosure may be coordinates indicating any one of four corners in a case where the region of interest has a rectangular shape.

FIG. 15 is a diagram illustrating an example of the payload data including the image data of each of the regions of interest ROI0 to ROI2. The payload data is set in a packet region of the transmission data and sent from the video transmission device. In the present embodiment, in each line of the payload data, the image data of the region of interest is stored in units of pixel rows, that is, in units of Y-axis coordinates in the captured image.

In the present embodiment, the payload data that stores the region of interest includes only the image data of the region of interest in the captured image, and does not store the image data of the non-region of interest OE. Therefore, a pixel row including only the image data of the non-region of interest OE in the captured image is not included in the payload data. Furthermore, the image data of the region of interest in the payload data is stored in the payload data in a state of being left aligned adjacent to a payload header PH (corresponding to the "packet header PH" in Underlying Technologies 1 and 2 described above). As illustrated in FIG. 15, the image data of the region of interest in the captured image is stored in the payload data in a state of being aligned in the upper-left direction, that is, a direction toward the origin (the origin α_o in this example) of the captured image. In this example, the respective pieces of image data of the regions of interest ROI0 to ROI2 correspond to pixel rows corresponding to 800 Y-axis coordinates in the captured image α. Therefore, in this example, the payload data that stores the respective pieces of image data of the regions of interest ROI0 to ROI2 includes total 800 lines including lines PL1 to PL800 in order from the top and forms a data group that stores pixel rows corresponding to 800 Y-axis coordinates in the captured image α.

In this example, among the three regions of interest (ROIs) in the captured image α, a region having the smallest Y coordinate of the start point coordinates is the region of interest ROI2. Therefore, as illustrated in FIG. 15, the image data (image data ROI2(L1) in this example) of the first row among the pixel rows of the region of interest ROI2 is stored in the left-aligned manner in the line PL1 which is the top row of the payload data. Furthermore, in this example, a region having the largest Y coordinate of the start point coordinates among the three regions of interest in the captured image α is the region of interest ROI0. Therefore, as illustrated in FIG. 15, the image data (image data ROI0 (L600) in this example) of the last row among the pixel rows of the region of interest ROI0 is stored in the left-aligned manner in the line PL800 which is the last row of the payload data.

As described above, the pieces of image data of the regions of interest ROI0 to ROI2 in the captured image α of this example are left-aligned in order from the image data of the region having the smaller Y coordinate (Y coordinates j0 to j2) of the start point coordinates, and are stored in each line of the payload data. For example, pieces of image data ROI2(L1) to ROI2(L40) corresponding to the Y coordinate j2 of the start point coordinates of the region of interest ROI2 from the first pixel row (Y coordinate=100) to the 140-th pixel row (Y coordinate=139) are stored in the left-aligned manner in the lines PL1 to PL40 of the payload data illustrated in FIG. 15.

Furthermore, as described above, the image data of the region of interest is stored in each line of the payload data in units of Y-axis coordinates (in units of pixel rows) in the captured image. The image data of the region of interest in units of pixel rows stored in the payload data is referred to as ROI pixel row data. The ROI pixel row data includes a packet group including compressed image data of the region of interest. In a case where a plurality of regions of interest is arranged at the same Y coordinate in the captured image, a plurality of packet groups each including image data of each of the plurality of regions of interest I is continuously stored in the left-aligned manner in the ROI pixel row data.

Furthermore, for example, as illustrated in FIG. 13, the region of interest ROI2 also exists at the same Y coordinate as the Y coordinate i1(140) of the start point coordinates of the region of interest ROI1 in the captured image α. Therefore, as illustrated in FIG. 15, as the image data of the pixel row corresponding to the Y coordinate 140 in the captured image α, image data ROI2(L41) of the 41-th pixel row of the region of interest ROI2 and image data ROI1(L1) of the first image row of the region of interest ROI1 are stored in the left-aligned manner in this order in the line PL41 of the payload data in this example. Similarly, the pieces of image data of the two regions of interest ROI2 and ROI1 are stored in the left-aligned manner in this order also from the line PL42 (not illustrated) to the line PL200 after the line PL41 of the payload data.

Furthermore, for example, as illustrated in FIG. 13, the regions of interest ROI2 and ROI1 also exist at the same Y coordinate as the Y coordinate i1(300) of the start point coordinates of the region of interest ROI0 in the captured image α. Therefore, as illustrated in FIG. 15, as the image data of the pixel row corresponding to the Y coordinate 300 in the captured image α, image data ROI2(L201) of the 201-th pixel row of the region of interest ROI2, image data ROI0(L1) of the first pixel row of the region of interest ROI0, and image data ROI1(L161) of the 161-th image row of the region of interest ROI1 are stored in the left-aligned manner in this order in the line PL201 of the payload data in this example. Similarly, the pieces of image data of the three regions of interest ROI2, ROI0, and ROI1 are stored in the left-aligned manner in this order also from the line PL202 (not illustrated) to the line PL600 after the line PL201 of the payload data.

In addition, the payload data line PL600 includes image data ROI2(L600) of the 600-th pixel row, which is the last row of the region of interest ROI2, as the image data of the Y coordinate l2 (Y coordinate=699 in the captured image α) of the end point coordinates of the region of interest ROI2. Then, the pieces of image data of the two regions of interest ROI0 and ROI1 are stored in the left-aligned manner in this order in the lines PL601 to PL640 of the payload data. In addition, the payload data line PL640 includes image data ROI1(L600) of the 600-th pixel row, which is the last row of the region of interest ROI1, as the image data of the Y coordinate l1 (Y coordinate=739 in the captured image α) of the end point coordinates of the region of interest ROI1. Then, the image data of one region of interest ROI0 is stored in the left-aligned manner in this order in the lines PL641 to PL800 of the payload data. The payload data line PL800 includes image data ROI0(L600) of the 600-th pixel row, which is the last row of the region of interest ROI0, as the image data of the Y coordinate l0 (Y coordinate=899 in the captured image α) of the end point coordinates of the region of interest ROI0. In this way, the pieces of payload data corresponding to 800 lines including the pieces of image data of the regions of interest ROI0 to ROI2 of this example are generated.

In this way, payload data in which pieces of image data of a predetermined number of (three in this example) regions of interest (ROIs) cut from a predetermined captured image (the captured image α in this example) are stored is sent from the video transmission device to the video reception device together with embedded data including ROI information corresponding to the predetermined number of cut ROIs.

3-2. Restoration Processing in Video Reception Device

In the present embodiment, once transmission data including image data of a region of interest is received, the video reception device performs the restoration processing on the image data of the region of interest included in the received transmission data. The transmission data including the image data is communicated between the video transmission device and the video reception device in units of image data frames. For example, data in each of the header region and the packet region of the image data frame is transmitted to the video reception device in units of transactions. The video reception device receives a packet (start of frame (SOF)) indicating a start of the image data frame to perform various types of processing related to the image data included in the transmission data, and the restoration processing is also an example thereof.

In the restoration processing in the present embodiment, ROI information corresponding to the region of interest is extracted from the received transmission data, and ROI restoration information used for the restoration processing is generated on the basis of the extracted ROI information. The image data of the region of interest is decoded from the compressed state in the video transmission device, restored so as to be displayable on the basis of the ROI restoration information, and written in the frame memory.

The image data of the region of interest is restored so as to be displayable (displayable state) on a predetermined display device on the basis of the ROI information corresponding to a predetermined number of regions of interest extracted from the embedded data by performing the restoration processing. As a result, the image data of the region of interest cut at an arbitrary position and image size in the captured image can be efficiently displayed on the display device. Hereinafter, for easy understanding, the restoration processing will be described separately for an information extraction process and a writing process. The information extraction process is a process of generating the ROI restoration information used for the restoration processing from the extracted ROI information, and the writing process is a process of writing the image data of the region of interest in the frame memory on the basis of the ROI restoration information.

[Information Extraction Process]

In the information extraction process, first, the embedded data in the transmission data is analyzed, and the ROI information corresponding to the predetermined number of regions of interest (ROIs) cut from the captured image is extracted from the embedded data. In the information extraction process, the position information and size information of the region of interest are extracted as the ROI information from the embedded data.

In the present embodiment, the position information is information indicating the position of the region of interest in the captured image, and corresponds to, for example, start point coordinates (X coordinate and Y coordinate) indicating the upper-left end portion of the region of interest. Furthermore, in the present embodiment, the size information is information indicating the size (the number of pixels) of the region of interest in the captured image, and corresponds to, for example, the length of the region of interest in the X-axis direction and the length of the region of interest in the Y-axis direction. Therefore, in the information extraction process in the present embodiment, the start point coordinates of the region of interest are extracted as the position information in the ROI information. In addition, the length of the region of interest in the X-axis direction and the length of the region of interest in the Y-axis direction are extracted as the size information in the ROI information.

In this example, as illustrated in FIG. 13, three regions of interest ROI0 to ROI2 are cut from the captured image α.

Therefore, in this example, in the information extraction process, the start point coordinates of each of the regions of interest ROI0 to ROI2, and the lengths of each of the regions of interest ROI0 to ROI2 in the X-axis direction and the Y-axis direction (see FIG. 14) are extracted as the ROI information from the embedded data.

(ROI Restoration Information)

In the information extraction process, once the ROI information (the position information and the size information) is extracted, the ROI restoration information used to restore the image data of the region of interest is generated on the basis of the extracted ROI information. Here, the ROI restoration information will be described in detail with reference to FIG. 16. FIG. 16 is a diagram for describing first coordinate data and second coordinate data included in the ROI restoration information. In the information extraction process, in generating the ROI restoration information, the first coordinate data and the second coordinate data illustrated in FIG. 16 are generated for each region of interest on the basis of the extracted ROI information (the position information and the size information). For example, in this example, three regions of interest ROI0 to ROI2 are restoration processing targets. Therefore, in generating the ROI restoration information in this example, the first coordinate data and the second coordinate data corresponding to each of the three regions of interest ROI0 to ROI2 are generated.

The first coordinate data includes ROI identification data for identifying the region of interest and relative coordinate data indicating a relative position of the region of interest in the captured image. The first coordinate data is data in which the ROI identification data and the relative coordinate data are associated with each other. The ROI identification information is information that enables identification of each of a plurality of regions of interest in the transmission data that is a restoration processing target, and is, for example, an arbitrary numerical value or character string.

Further, as illustrated in FIG. 16, the relative coordinate data includes start point coordinates indicating the upper-left end of the region of interest in the captured image and end point coordinates indicating the lower-right end of the region of interest. Specifically, the relative coordinate data included in the first coordinate data includes four numerical values indicating an X coordinate of the start point coordinates (start point X coordinate), a Y coordinate of the start point coordinates (start point Y coordinate), an X coordinate of the end point coordinates (end point X coordinate), and a Y coordinate of the end point coordinates (end point Y coordinate). The relative coordinate data in the first coordinate data is, for example, a numerical array in which numerical values indicating the start point coordinates (X,Y) and the end point coordinates (X,Y) are arranged in the order illustrated in the upper part of FIG. 16 in a comma-delimited manner.

As described above, in the present embodiment, the ROI information sent from the video transmission device includes the information of the start point coordinates as the position information, but does not include the information of the end point coordinates. Therefore, in the information extraction process, at the time of generating the first coordinate data, the end point coordinates are calculated from the start point coordinates included in the position information and the lengths in the X-axis direction and the Y-axis direction included in the size information.

Similarly to the first coordinate data, the second coordinate data includes ROI identification data and relative coordinate data. However, as illustrated in FIG. 16, the relative coordinate data of the second coordinate data is different from that of the first coordinate data in that the relative coordinate data of the second coordinate data includes the start point Y coordinate and the end point Y coordinate and does not include the start point X coordinate and the end point X coordinate. The relative coordinate data of the second coordinate data is, for example, a numerical array in which numerical values indicating the start point Y coordinate and the end point Y coordinate are arranged in the order illustrated in the lower part of FIG. 16 in a comma-delimited manner.

In the information extraction process according to the present embodiment, once the first coordinate data and the second coordinate data corresponding to the region of interest (ROI) that is the restoration processing target are generated, X-coordinate order data in which the first coordinate data of each region of interest is rearranged in ascending order of the start point X coordinates is generated. In addition, Y-coordinate order data in which the pieces of second coordinate data are rearranged in ascending order of the start point Y coordinates is generated. In the present embodiment, the X-coordinate order data and the Y-coordinate order data correspond to the ROI restoration information.

As described above, the ROI restoration information is information generated by rearranging the position information and the size information in the ROI information. More specifically, the ROI restoration information is information generated by rearranging data (the first coordinate data and the second coordinate data) generated from the position information and the size information. In the information extraction process in the present embodiment, the X-coordinate order data and the Y-coordinate order data are generated as the ROI restoration information as described above. The generated X-coordinate order data and Y-coordinate order data are temporarily stored in a predetermined storage region (for example, a register or the like) of the video reception device, and are used in a subsequent process (for example, the writing process) of the restoration processing.

Here, specific examples of the X-coordinate order data and the Y-coordinate order data will be described with reference to FIG. 17. FIG. 17 is a diagram illustrating an example of the X-coordinate order data and the Y-coordinate order data corresponding to the regions of interest ROI0 to ROI2 that are the restoration processing targets in this example.

In the information extraction process in this example, the end point coordinates of the regions of interest ROI0 to ROI2 are calculated in generating the first coordinate data and the second coordinate data constituting the X-coordinate order data and the Y-coordinate order data. The end point X coordinate of the region of interest is obtained by "start point X coordinate+X-axis direction length−1". As illustrated in FIG. 14, the value of the start point X coordinate i0 of the region of interest ROI0 is "520", and the length in the X-axis direction is "400". Therefore, the value of the end point X coordinate k0 is calculated as "919"="start point X coordinate i0 (520)+X-axis direction length (400)−1". Similarly, the value "1439" of the end point X coordinate k1 of the region of interest ROI1 and the value "499" of the end point X coordinate k2 of the region of interest ROI2 are calculated.

Further, the end point Y coordinate of the region of interest is obtained by "start point Y coordinate+Y-axis direction length−1". As illustrated in FIG. 14, the value of the start point Y coordinate j0 of the region of interest ROI0 is "300", and the length in the X-axis direction is "600". Therefore, the value of the end point Y coordinate l0 is calculated as "899"="start point Y coordinate j0 (300)+Y-axis direction length (600)−1". Similarly, the value "739" of the end point Y coordinate l1 of the region of interest ROI1 and the value "699" of the end point Y coordinate l2 of the region of interest ROI2 are calculated. In this manner, the end point coordinates of each region of interest are calculated.

In the information extraction process in this example, once the end point coordinates are calculated, the first coordinate data and the second coordinate data of the regions of interest ROI0 to ROI2 are generated using the start point coordinate information included in the ROI information and the calculated end point coordinates.

In this example, the first coordinate data of the region of interest ROI0 is represented by "R0(520,300,919,899)". Here, "R0" is the ROI identification information indicating the region of interest ROI0. Similarly, the first coordinate data of the region of interest ROI1 is represented by "R1 (1040,140,1439,739)", and the first coordinate data of the region of interest ROI2 is represented by "R2 (100,100,499, 699)". In a case where the start point X coordinates of the regions of interest ROI0 to ROI2 are arranged in ascending order, a value "100" indicating the start point X coordinate i2 of the region of interest ROI2, a value "520" indicating the start point X coordinate i0 of the region of interest ROI0, and a value "1040" indicating the start point X coordinate i1 of the region of interest ROI1 are arranged in this order. Therefore, the X-coordinate order data corresponding to the regions of interest ROI0 to ROI2 illustrated on the left side of FIG. 17 is generated by rearranging the pieces of first coordinate data of the regions of interest ROI0 to ROI2 in ascending order of the start point X coordinates (in the order of the regions of interest ROI2, ROI0, and ROI1).

Further, in this example, the second coordinate data of the region of interest ROI0 is represented by "R0(300,899)". Similarly, the second coordinate data of the region of interest ROI1 is represented by "R1(140,739)", and the second coordinate data of the region of interest ROI2 is represented by "R2(100,699)". In a case where the start point Y coordinates of the regions of interest ROI0 to ROI2 are arranged in ascending order, a value "100" indicating the start point Y coordinate l2 of the region of interest ROI2, a value "140" indicating the start point Y coordinate l1 of the region of interest ROI1, and a value "899" indicating the start point Y coordinate l0 of the region of interest ROI1 are arranged in this order. Therefore, the Y-coordinate order data corresponding to the regions of interest ROI0 to ROI2 illustrated on the right side of FIG. 17 is generated by rearranging the pieces of second coordinate data of the regions of interest ROI0 to ROI2 in ascending order of the start point Y coordinates (in the order of the regions of interest ROI2, ROI1, and ROI0). In this example, the generated X-coordinate order data and Y-coordinate order data corresponding to the regions of interest ROI0 to ROI2 are stored in the register while maintaining the order illustrated in FIG. 17.

Note that, in FIG. 17, the arrangement order in the X-coordinate order data and the Y-coordinate order data is indicated by a numerical value of 1 to 3 at the left end for easy understanding. Further, in FIG. 17, the X-coordinate order data is displayed in a table format in which the pieces of first coordinate data of the regions of interest ROI0 to ROI2 are stored in ascending order of the start point X coordinates in units of rows, and the Y-coordinate order data is displayed in a table format in which the pieces of second coordinate data of the regions of interest ROI0 to ROI2 are stored in ascending order of the start point Y coordinates in units of rows for easy understanding. However, the storage manner of the X-coordinate order data and the Y-coordinate order data is not limited thereto. In the present embodiment, the X-coordinate order data and the Y-coordinate order data may be stored in such a way that the order of a predetermined number of regions of interest is maintained.

For example, the X-coordinate order data may store the first coordinate data of each region of interest together with a numerical value indicating an order in a case of rearrangement in ascending order of the start point X coordinates. Further, similarly, the Y-coordinate order data may store the second coordinate data of each region of interest together with a numerical value indicating an order in a case of rearrangement in ascending order of the start point Y coordinates. Furthermore, the X-coordinate order data may be stored as an array obtained by dividing the first coordinate data of each of the regions of interest by a predetermined delimiter (for example, comma). Similarly, the Y-coordinate order data may be stored as an array obtained by dividing the second coordinate data of each of the regions of interest by a predetermined delimiter (for example, comma).

In the information extraction process of this example, it is possible to determine the relative positions of the regions of interest ROI0 to ROI2 that are the restoration processing targets in the captured image α (see FIG. 13) by generating the X-coordinate order data and the Y-coordinate order data corresponding to the regions of interest ROI0 to ROI2. As a result, in the process (writing process) of the restoration processing after the information extraction process, processing using the relative positions of the regions of interest ROI0 to ROI2 can be performed.

As described above, the X-coordinate order data is data obtained by rearranging the position information and the size information of a predetermined number of regions of interest (ROIs) cut from the captured image in ascending order of the values of the X coordinates (start point X coordinates) of the start point coordinates corresponding to the position information. More specifically, the X-coordinate order data is data obtained by rearranging the pieces of relative coordinate information generated from the position information and the size information of the regions of interest in ascending order of the start point X coordinates. Furthermore, the Y-coordinate order data is data obtained by rearranging the position information and the size information of a predetermined number of regions of interest cut from the captured image in ascending order of the values of the Y coordinates of the start point coordinates corresponding to the position information. More specifically, the Y-coordinate order data is data obtained by rearranging the Y coordinates in the relative coordinate information generated from the position information and the size information of the regions of interest in ascending order of the start point Y coordinates.

The relative positions of the regions of interest in the captured image can be determined by generating the ROI restoration information in the information extraction process in the restoration processing. As a result, the subsequent processes (for example, the writing process) of the restoration processing can be smoothly performed using the relative positions. As will be described in detail later, the stored X-coordinate order data and Y-coordinate order data are updated each time the video reception device receives the transmission data and a new information extraction process is started.

[Writing Process]

Next, the writing process in the restoration processing will be described. The writing process is a process of writing the image data of the region of interest to a memory device in the video reception device on the basis of the ROI restoration information generated in the information extraction process. In the present embodiment, for example, the frame memory is assumed as the memory device for writing image data of an ROI. The frame memory is a memory IC capable of holding image data to be displayed on a display device (for example, a display or the like) in units of screens.

In the present embodiment, once a frame for communicating transmission data is started by the reception of the SOF as described above and the transmission data is received in the video transmission device, the embedded data is first input, and then the respective lines of the payload data are sequentially input from the top. The above-described information extraction process is on the basis of the input of the embedded data, but the writing process in the restoration processing is performed on the basis of the input of each line of the payload data. In the writing process in the present embodiment, the image data of the region of interest is written in the frame memory in units of payload data on the basis of the ROI restoration information. In the writing process, the ROI pixel row data of each line of the payload data is written in the frame memory.

In the present embodiment, in the writing process of the restoration processing, the image data of the region of interest in the payload data, that is, the ROI pixel row data, is divided for each region of interest on the basis of the ROI restoration information. That is, the ROI pixel row data is divided as a packet group for each region of interest, that is, image data of the region of interest (ROI) on the basis of the ROI restoration information. Furthermore, in the writing process, an address indicating a write destination of the image data of the region of interest (ROI) in the frame memory is generated on the basis of the ROI restoration information. The image data of each region of interest divided from the ROI pixel row data is written to the address in the frame memory.

As will be described in detail later, in the present embodiment, a restoration position in the frame memory corresponding to the relative position of each region of interest in the captured image is specified as the write destination of the image data of the region of interest on the basis of the ROI restoration information, and an address indicating the restoration position is generated. As a result, the relative position of the region of interest in the captured image is restored in the frame memory. Therefore, the image data of the region of interest can be displayed at the display position corresponding to the relative position in the captured image on the screen of the display.

(Analysis of ROI Restoration Information)

In the writing process in the present embodiment, the ROI restoration information (the X-coordinate order data and the Y-coordinate order data) is analyzed, information corresponding to the ROI pixel row data in each line of the payload data is extracted on the basis of the ROI restoration information, and information (writing information) used for writing is generated. The division of the ROI pixel row data and generation of the address indicating the write destination in the frame memory for the divided ROI pixel row data are performed on the basis of the writing information generated from the ROI restoration information. In the present embodiment, for example, a writing Y coordinate, a writing start X coordinate, and a writing size are generated as the writing information. In the writing process of the restoration processing, the X-coordinate order data and the Y-coordinate order data are extracted for each input of each line of the payload data to generate the writing information. The writing information (the writing Y coordinate, the writing start X coordinate, and the writing size) will be specifically described below.

(Writing Y Coordinate)

The writing Y coordinate is a Y coordinate of the ROI pixel row data in the captured image. The writing Y coordinate is used to determine the position in the Y-axis direction in the frame memory at the time of writing the ROI pixel row data. The ROI pixel row data stored in each line of the payload data includes the image data of the region of interest having the same Y coordinate in the captured image. Therefore, the writing Y coordinate has a common value in units of lines of the payload data. The writing Y coordinate is generated from the Y-coordinate order data in the ROI restoration information. For example, once each line of the payload data is input, the second coordinate data is extracted from the Y-coordinate order data in the storage order (in ascending order of the start point X coordinates). The writing Y coordinate corresponding to each line of the input payload data is generated using the extracted second coordinate data.

In this example, in a case where the line PL1 (see FIG. 15) of the payload data is input, the second coordinate data related to the first region of interest ROI2 of the Y-coordinate order data (see the right side of FIG. 17) is extracted, and the writing Y coordinate indicating the start point Y coordinate (100) of the region of interest ROI2 is generated. That is, in a case where the top line (first line) of the payload data is input, it is sufficient if the first second coordinate data of the Y-coordinate order data is extracted, and the start point Y coordinate in the second coordinate data, that is, the start point Y coordinate having the smallest value in the Y-coordinate order data is determined as the writing Y coordinate.

After the inputting of the top line, the value of the writing Y coordinate is updated by being incremented by 1 every time a new line of the payload data is input. Furthermore, in a case where the updated value of the writing Y coordinate exceeds the value of the end point Y coordinate, the next second coordinate data is extracted from the Y-coordinate order data. In this example, in a case where the line PL601 of the 601-th row of the payload data is input, the updated value of the writing Y coordinate becomes "700", and exceeds the value "699" of the end point Y coordinate of the region of interest ROI2. Therefore, the second coordinate data related to the second region of interest ROI1 is extracted from the Y-coordinate order data (see the right side of FIG. 17).

Once new second coordinate data is extracted, it is determined whether or not the updated value of the writing Y coordinate is included within a range from the start point Y coordinate to the end point Y coordinate of the newly extracted second coordinate data. If the updated value of the writing Y coordinate is within the range, the updated value of the writing Y coordinate is used as the writing Y coordinate corresponding to the input line. In this example, it is determined that the updated value "700" of the writing Y coordinate is within the range from the value "140" of the start point Y coordinate to the value "739" of the end point Y coordinate of the region of interest ROI1. Therefore, the updated value "700" of the writing Y coordinate is used as the writing Y coordinate of the ROI pixel row data of the line PL601 of the payload data.

On the other hand, in a case where the updated value of the writing Y coordinate is not within the range, the updated value of the writing Y coordinate does not correspond to the Y coordinate of the ROI pixel row data in the input line. Therefore, the writing Y coordinate is generated on the basis of the newly extracted second coordinate data. For example, in a case where the updated value of the writing Y coordinate is smaller than the value of the start point Y coordinate of the newly extracted second coordinate data, it is sufficient if the writing Y coordinate is generated with the value of the start point Y coordinate of the second coordinate data. Furthermore, in a case where the updated value of the writing Y coordinate is larger than the value of the end point Y coordinate of the newly extracted second coordinate data, it is sufficient if the next second coordinate data is extracted from the Y-coordinate order data to generate the writing Y coordinate. As a result, the Y-coordinate position of each region of interest in the captured image can be reflected on the writing Y coordinate.

(Writing Start X Coordinate and Writing Size)

Next, the generation of the writing start X coordinate and the writing size will be described. The writing start X coordinate and the writing size are generated for each region of interest with respect to the writing Y coordinate generated in units of ROI pixel rows. The writing start X coordinate indicates the X coordinate of each packet group included in the ROI pixel row data, that is, the image data of each region of interest, in the captured image. Furthermore, the writing size indicates the image size (here, the length in the X-axis direction) of the image data of each region of interest. The ROI pixel row data is divided for each region of interest on the basis of the writing start X coordinate and the writing size at the time of writing in the frame memory. Therefore, the writing size is also referred to as a "division size".

Furthermore, the writing start X coordinate is used to calculate a writing start position (head address) corresponding to each region of interest in the X-axis direction in the frame memory at the time of writing the image data of each region of interest. Further, the writing size is used to calculate consecutive addresses in the frame memory for storing the image data of the region of interest divided from the ROI pixel row data.

The writing start X coordinate and the writing size are generated from the X-coordinate order data in the ROI restoration information. For example, once each line of the payload data is input, the second coordinate data is extracted from the X-coordinate order data in the storage order (in ascending order of the start point X coordinates). For the extracted first coordinate data, it is determined whether or not the value of the current writing Y coordinate is included within a range from the start point Y coordinate to the end point Y coordinate of the extracted first coordinate data. As a result, it is determined whether or not the image data of each region of interest is included in the ROI pixel row data of each line. Here, the region of interest associated with the image data included in the ROI pixel row data is referred to as a writing target ROI. Note that, in the present embodiment, in a case where a predetermined line of the payload data is input, first, the value of the writing Y coordinate is generated (updated), and then, the writing start X coordinate and the writing size are generated.

In this example, in a case where the line PL1 (see FIG. 15) of the first row of the payload data is input, the first coordinate data related to the first region of interest ROI2 of the X-coordinate order data (see the right side of FIG. 17) is first extracted. At this time, as described above, the value of the writing Y coordinate is "100", and is included within a range from the value "100" of the start point Y coordinate to the value "699" of the end point Y coordinate of the region of interest ROI2. Therefore, the ROI pixel row data of the line PL1 includes the image data of the region of interest ROI2, and the region of interest ROI2 is determined to be the writing target ROI. On the other hand, the value "100" of the writing Y coordinate is not included in the range from the value "140" of the start point Y coordinate to the value "739" of the end point Y coordinate of the first coordinate data related to the second region of interest ROI1 of the X-coordinate order data. Similarly, the value "100" of the writing Y coordinate is not included in the range from the value "300" of the start point Y coordinate to the value "899" of the end point Y coordinate of the first coordinate data related to the third region of interest ROI0 of the X-coordinate order data. Therefore, it is determined that the regions of interest ROI0 and ROI1 are not the writing target ROIs.

In the present embodiment, the writing start X coordinate and the writing size are generated for each region of interest (ROI) determined to be the writing target ROI. Specifically, the start point X coordinate of the writing target ROI is generated as the writing start X coordinate. In this example, the writing start X coordinate of the region of interest ROI2 is generated as the value "100" of the start point X coordinate. Further, the writing size is generated by adding 1 to a difference between the value of the start point X coordinate and the value of the end point X coordinate in the first coordinate data of the writing target ROI. In this example, the writing size of the region of interest ROI2 is "400 pixels (=end point X coordinate (499)−start point X coordinate (100)+1)".

In a case where it is determined that the region of interest ROI0 is the writing target ROI, the writing start X coordinate of the region of interest ROI0 is generated as the value "300" of the start point X coordinate, and the writing size of the region of interest ROI0 is "400 pixels (=end point X coordinate (919)−start point X coordinate (520)+1)". Further, in a case where it is determined that the region of interest ROI1 is the writing target ROI, the writing start X coordinate of the region of interest ROI1 is generated as the value "1040" of the start point X coordinate, and the writing size of the region of interest ROI1 is "400 pixels (=end point X coordinate (1439)−start point X coordinate (1040)+1)".

In this example, in a case where the lines PL1 to PL40 of the payload data are input, only the region of interest ROI2 is the writing target ROI. Therefore, the writing start X coordinate and the writing size of the region of interest ROI2 are generated. Furthermore, in a case where the lines PL41 to PL200 of the payload data are input, the regions of interest ROI2 and ROI1 are the writing target ROIs. Therefore, the writing start X coordinate and the writing size of each of the regions of interest ROI2 and ROI1 are generated. Moreover, in a case where the lines PL201 to PL600 of the payload data are input, the regions of interest ROI2, ROI0, and ROI1 are the writing target ROIs. Therefore, the writing start X coordinate and the writing size of each of the regions of interest ROI2, ROI0, and ROI1 are generated.

Furthermore, after the inputting of the line PL601 of the payload data, the region of interest ROI2 does not correspond to the writing target ROI. Therefore, the writing start X coordinate and the writing size of each of the regions of interest ROI0 and ROI1 are generated. Furthermore, after the inputting of the line PL641 of the payload data, the region of interest ROI1 does not correspond to the writing target ROI. Therefore, only the writing start X coordinate and the writing size of the region of interest ROI0 are generated. As described above, in the present embodiment, the writing size of the image data of the region of interest (ROI) to be written in the frame memory is calculated on the basis of the position information (the X-coordinate order data in this example) in the ROI restoration information.

(Generation of Address in Frame Memory)

In the writing process in the restoration processing of the present embodiment, once the writing information (the writing Y coordinate, the writing start X coordinate, and the writing size) is generated from the ROI restoration information, an address for writing, in the frame memory, the image data of the region of interest (writing target ROI) included in the ROI pixel row data is specified on the basis of the writing information. In the present embodiment, as described above, the address corresponding to the restoration position indicating the relative position of the region of interest in the captured image is generated in the frame memory. Furthermore, for the image data of the writing target ROI, the address is generated in the storage order of the X-coordinate order data (in ascending order of the start point X coordinates).

For example, a position in the Y-axis direction in the frame memory among the restoration positions of the regions of interest (here, the writing target ROIs) is specified on the basis of the writing Y coordinate common in units of ROI pixel rows. Furthermore, the head position in the X-axis direction in the frame memory among the restoration positions of the respective writing target ROIs is specified on the basis of the writing start X coordinate of each writing target ROI. As a result, the writing start position of the image data of the writing target ROI in the frame memory is specified.

In this example, it is assumed that the writing Y coordinate "140" for the ROI pixel row data, the writing start X coordinate "100" of the region of interest ROI2, and the writing start X coordinate "140" of the region of interest ROI1 are generated in a case where the line PL41 (see FIG. 15) of the first row of the payload data is input. In this case, a position corresponding to the pixel coordinates "100,140 (X coordinate, Y coordinate)" in the captured image α (see FIG. 13) is determined as the writing start position of the image data of the region of interest ROI2 included in the ROI pixel row data in PL41 in the frame memory. Further, a position corresponding to the pixel coordinates "520,140 (X coordinate, Y coordinate)" in the captured image α is determined as the writing start position of the image data of the region of interest ROI1 included in the ROI pixel row data in the frame memory.

As described above, the writing start position is determined for each writing target ROI in the ROI pixel row data, whereby the head address in the frame memory that indicates the writing start position is calculated. In the present embodiment, for example, equivalent pixel coordinates to those of the captured image can be applied to a writing region of the image data in the frame memory. In this case, for example, an address indicating the coordinates in the frame memory can be calculated by specifying the coordinates of the writing start position. Note that it is sufficient if specific address calculation method (calculation formula) is appropriately designed according to specifications of the frame memory or the like.

Moreover, consecutive addresses corresponding to the number of pixels indicated by the writing size are calculated using the head address of each region of interest and the writing size generated for each region of interest. For example, the value of the head address is added (incremented) by 1 up to the number of pixels indicated by the writing size. As a result, consecutive addresses corresponding to the number of pixels indicated by the writing size are calculated. The image data of a series of writing target ROIs can be written in the frame memory by writing each pixel of the image data of the writing target ROI to each of the consecutive addresses. In the frame memory, a region corresponding to the writing size from the writing start position corresponds to the restoration position of the writing target ROI in units of pixel rows.

In this example, in a case where the line PL41 (see FIG. 15) of the 41-th row of the payload data is input, addition for calculating addresses corresponding the writing size "400 pixels" is repeated for the head address of the region of interest ROI2. As a result, consecutive addresses corresponding to 400 pixels from the head address of the region of interest ROI2 are generated in the frame memory. Similarly, the consecutive addresses for 400 pixels from the head address of the region of interest ROI1 are generated. As a result, image data for 400 pixels of each of the regions of interest ROI2 and ROI1 is written in the frame memory.

(Division of Image Data)

In the writing process in the present embodiment, the image data (ROI pixel row data) of the region of interest (ROI) in the payload data is divided and transferred for each region of interest on the basis of the ROI restoration information, and is written in the frame memory. Specifically, the ROI pixel row data in each line of the payload data is divided for each region of interest (writing target ROI) on the basis of the writing information (the writing Y coordinate, the writing start X coordinate, and the writing size) generated from the ROI restoration information. In the writing process in the restoration processing of the present embodiment, the ROI pixel row data is divided for each region of interest on the basis of the writing size in the writing information.

For example, the image data of the writing target ROI is divided from the ROI pixel row data in the storage order of the X-coordinate order data (in ascending order of the start point X coordinates). That is, the ROI pixel row data is divided into the image data of each writing target ROI in order from a payload header side. The divided image data in units of writing target ROIs is separated from the ROI pixel row data for each writing target ROI, and writing target image data is generated. The writing target image data is transferred to the frame memory and written to an address generated on the basis of the writing information. Therefore, the ROI pixel row data is written in the frame memory by the number of times of writing corresponding to the number of divisions for each writing target ROI.

In this example, in a case where the line PL41 (see FIG. 15) of the 41-th row of the payload data is input, the ROI pixel row data is divided on the basis of the writing size of each of the regions of interest ROI2 and ROI1 which are the writing target ROIs. The pixel row data of the line PL41 is divided into two pieces of image data including the image data (ROI2(L41)) of the region of interest ROI2 and the image data (ROI1(L1)) of the region of interest ROI1 starting from the head of the ROI pixel row data, that is, the payload header PH side of the line PL41. Therefore, the number of times the ROI pixel row data of the line PL41 is written in the frame memory is 2. Specifically, in the line PL41 of the 41-th row of the payload data, the division size (writing size) of the region of interest ROI2 is 400 pixels, and the division size of the region of interest ROI1 is 400 pixels. Therefore, the image data corresponding to 400 pixels from the head in the ROI pixel row data is divided to generate the writing target image data of the region of interest ROI2. Further, the writing target image data of the region of interest ROI1 is generated from the image data corresponding to the remaining 400 pixels in the ROI pixel row data.

The writing target image data generated for each region of interest (writing target ROI) is transferred to the frame memory in the order of division from the ROI pixel row data (in ascending order of the writing start X coordinates), for example, and is written to an address indicating the restoration position corresponding to each region of interest (ROI). As a result, the writing target image data of the writing target ROI is written to the restoration position corresponding to the writing target ROI in the frame memory. Note that, in a case where there is one writing target ROI (for example, in a case where the line PL1 of the first row of the payload data is input), the pixel row data can be transferred to the frame memory without being divided, but may be divided if appropriate in view of a bus specification and the number of pixels of the pixel row data.

The writing process in the restoration processing of the present embodiment has been described above. As described above, each time each line of the payload data is input, the generation of the address of the writing target ROI and the division of the ROI pixel row data are performed, and the pieces of ROI pixel row data of all lines of the payload data are written in the frame memory. As a result, each of the regions of interest cut from the captured image is written to the restoration position in the frame memory. Therefore, in the video reception device, the image data of the region of interest is restored so as to be displayable on a predetermined display device. In this example, in the frame memory, the regions of interest ROI0 to ROI2 are written to the restoration positions corresponding to the relative positions in the captured image α (see FIG. 13). That is, the regions of interest ROI0 to ROI2 are restored so as to be displayable at display positions corresponding to the relative positions in the captured image α (see FIG. 13) on the screen of the predetermined display device.

As described above, in the present embodiment, the image data of the region of interest is restored so as to be displayable and is written in the frame memory through the information extraction process and the writing process in the restoration processing, whereby the image data can be efficiently displayed on the display device such as the display.

Figure 19:
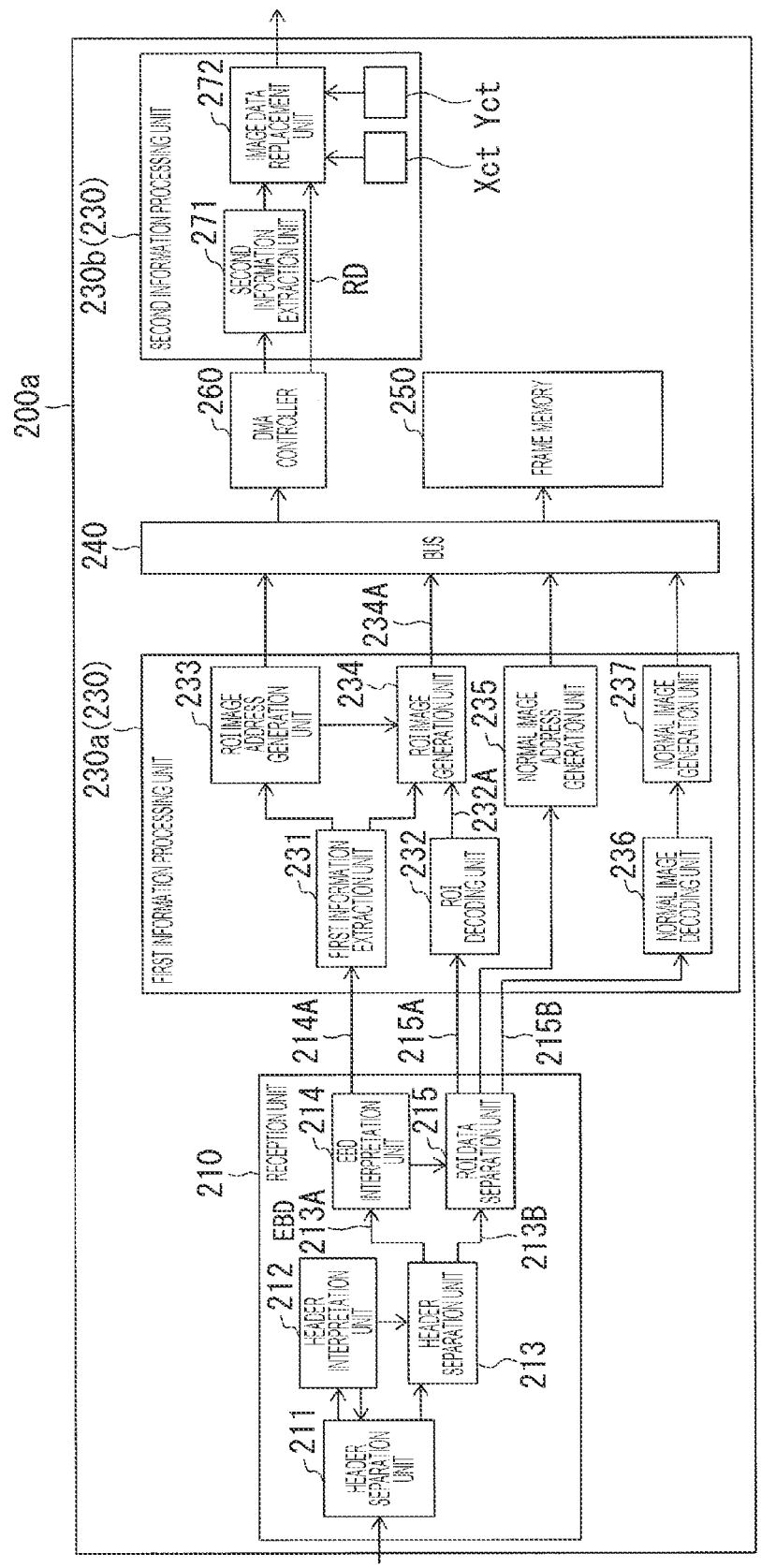
FIG. 19 is a diagram illustrating a schematic configuration example of a video reception device according to an embodiment of the present disclosure.

4. Video Transmission System of Present Disclosure 4-1. Outline of Video Transmission System Next, a video transmission system and a video reception device according to the present embodiment will be described with reference to FIGS. 18 and 19. First, a schematic configuration of the video transmission system according to the present embodiment will be described with reference to FIG. 18. FIG. 18 is a block diagram illustrating a schematic configuration of a video transmission system (an example of a transmission system) 2. Furthermore, FIG. 19 is a block diagram illustrating an example of a configuration of a video reception device 200a according to the present embodiment.

As illustrated in FIG. 18, the video transmission system 2 includes a video transmission device (an example of a transmission device) 100 and the video reception device (an example of a reception device) 200a. Note that components that implement the same operations and functions as those of the video transmission system 1 (see FIG. 1) according to Underlying Technologies 1 and 2 described above are denoted by the same reference signs, and a description thereof is omitted.

In the video transmission system 2, the video transmission device 100 generates transmission data including embedded data and payload data in which image data of a region of interest and data of a normal image are stored. The transmission data generated by the video transmission device 100 is sent to the video reception device 200a via a data lane DL. Once the transmission data is received, the video reception device 200a performs predetermined processing on the transmission data. Once the transmission data including the image data of the region of interest is received, the video reception device 200a according to the present embodiment performs the restoration processing on the image data of the region of interest.

Further, in the present embodiment, the video reception device 200a is connected to a display device 300. The display device 300 is, for example, a display device including a screen capable of displaying an image. The video reception device 200a outputs the image data (the data of the normal image and the image data of the region of interest (ROI)) included in the transmission data to the display device 300. As a result, for example, the image data of the region of interest cut from the captured image and sent as the transmission data in the video transmission device 100 is subjected to the restoration processing in the video reception device 200a and then displayed on the screen of the display device 300.

Next, the video reception device 200a according to the present embodiment will be described. The video reception device 200a is different from the video reception device 200 (see FIG. 8) according to Underlying Technologies 1 and 2 in that the video reception device 200a is configured to be able to perform the restoration processing. Note that, components that implement the same operations and functions in the video reception device 200a as those of the video reception device 200 according to Underlying Technologies 1 and 2 are denoted by the same reference signs, and a description thereof is omitted if appropriate.

As illustrated in FIG. 19, the video reception device 200a includes, for example, a reception unit 210, an information processing unit (an example of a processing unit) 230, and a frame memory 250. As will be described in detail later, in the present embodiment, the information processing unit 230 includes a first information processing unit 230a and a second information processing unit 230b. The information processing unit 230 (the first information processing unit 230a and the second information processing unit 230b) and the frame memory 250 are connected via a bus 240 so as to be able to transfer image data. Furthermore, the second information processing unit 230b and the frame memory 250 are connected so as to be able to transfer image data via the bus 240 under the control of a direct memory access (DMA) controller 20.

The reception unit 210 in the video reception device 200a receives a transmission signal (transmission data 147A in this example) in which image data of a predetermined number of regions of interest (ROIs) cut from a predetermined captured image is included in the payload data, and ROI information corresponding to the predetermined number of regions of interest is included in the embedded data. Similarly to the video transmission device 100 in Underlying Technologies 1 and 2, the video transmission device 100 (see FIG. 18) included in the transmission system 2 according to the present embodiment sends image data of each region of interest (ROI) in a captured image 111 as payload data of a long packet, and sends ROI information 120B regarding the region of interest as embedded data. As a result, the device (video reception device 200) that has received the transmission data 147A transmitted from the video transmission device 100 can easily extract the image data (ROI image 112) of each region of interest ROI from the transmission data 147A. The reception unit 210 is a circuit that generates various pieces of data (214A, 215A, and 215B) by performing predetermined processing on the received transmission data 147A and outputs the various pieces of data to the information processing unit 220. In the present embodiment, once a packet (SOF) indicating that communication of an image data frame with the video transmission device 100 is started is received, the reception unit 210 outputs a predetermined signal indicating the reception of the SOF to the first information processing unit 230a.

Similarly to the video reception device 200 in Underlying Technologies 1 and 2 described above, also in the video reception device 200a, the reception unit 210 includes, for example, a header separation unit 211, a header interpretation unit 212, a payload separation unit 213, an EBD interpretation unit 214, and an ROI data separation unit 215. Among these, the header separation unit 211 and the header interpretation unit 212 have similar configurations to those of the video reception device 200, and a description thereof is thus omitted.

The EBD interpretation unit 214 determines whether the image data included in the payload data of the transmission data 147A is image data of an ROI (the compressed image data 120A of the image data 116 of the region of interest in Underlying Technologies 1 and 2) or data of a normal image (the compressed image data 130A), on the basis of the data type included in embedded data 213A input from the payload separation unit 213. Further, the EBD interpretation unit 214 outputs the data type determination result to the ROI data separation unit 215. Furthermore, the EBD interpretation unit 214 outputs the embedded data including ROI information (indicating that the image data of the region of interest is included in the payload data) to the first information processing unit 230a (specifically, a first information extraction unit 231) as EBD data 214A.

In a case where it is determined that the image data included in the payload data of the transmission data 147A is image data of a region of interest (the compressed image data 120A of the image data 116) on the basis of the data type determination result from the EBD interpretation unit 214, the ROI data separation unit 215 outputs each line of the payload data as payload data 215A to the first information processing unit 230a (specifically, an ROI decoding unit 232) for each line. The payload data 215A includes pixel data (ROI pixel row data) for one line of compressed image data 147B.

In the present embodiment, for example, each line of the payload data is transmitted to the video reception device 200a in units of transactions constituting an image data frame related to the transmission data 147A sent from the video transmission device 100. Once a header of each line of the payload data of the long packet is detected in the header interpretation unit 212 of the reception unit 210, each line of the payload data is separated from a packet region R2 in the payload separation unit 213, and the payload data 215A including a payload header PH, ROI pixel row data, and a payload footer PF of each line is generated in the ROI data separation unit 215.

For example, in a case where an image data frame including the payload data illustrated in FIG. 15 in the packet region is transmitted from the video transmission device 100, the payload data 215A generated by the ROI data separation unit 215 includes pixel data for one line of lines PL1 to PL800 of the payload data. Furthermore, at this time, the ROI data separation unit 215 sequentially outputs, as the payload data 215A to the ROI decoding unit 232, the pieces of payload data of the lines PL1 to PL800 constituting the packet region of the image data frame from the line PL1. Note that, in a case where the ROI information 120B is included in the payload data of the long packet, the ROI information 120B may be included in the payload data 215A.

On the other hand, in a case where the image data included in the payload data is the compressed image data 130A which is data of a normal image, the ROI data separation unit 215 outputs the payload data to the first information processing unit 230a (specifically, a normal image decoding unit 236) as payload data 215B. In addition, the ROI data separation unit 215 outputs the data type determination result (the determination result indicating that the image data is data of a normal image) input from the EBD interpretation unit 214 to the first information processing unit 230a (specifically, a normal image address generation unit 235).

The first information processing unit 230a is a circuit that performs the restoration processing of restoring the image data (payload data 215A) of the region of interest so as to be displayable on the display device 300 on the basis of the ROI information corresponding to the predetermined number of regions of interest (ROIs) extracted from the embedded data. Furthermore, the first information processing unit 230a performs predetermined processing (normal image processing) on the data of the normal image (payload data 215B).

The first information processing unit 230a includes the first information extraction unit 231, the ROI decoding unit 232, an ROI image address generation unit 233, and an ROI image generation unit 234 as components related to the execution of the restoration processing. First, these components for performing the restoration processing will be described.

The first information processing unit 230a extracts the ROI information from the embedded data (EBD data 214A). The first information processing unit 230a performs the above-described information extraction process and writing process in the restoration processing, and performs a series of processing of restoring the image data of the region of interest (ROI) and writing the image data in the frame memory 250.

The first information extraction unit 231 performs the information extraction process in the restoration processing. Specifically, the first information extraction unit 231 extracts position information and size information of each of the predetermined number of regions of interest in the captured image as the ROI information from the ROI information (ROI information 120B) included in the embedded data (EBD data 214A). In this example, the first information extraction unit 231 extracts the start point coordinates of each of three regions of interest ROI0 to ROI2 in the captured image α as the position information, and extracts the lengths of each of the regions of interest ROI0 to ROI2 in the X-axis direction and the Y-axis direction as the size information.

The first information extraction unit 231 generates ROI restoration information (X-coordinate order data and Y-coordinate order data) used to restore the image data of the region of interest on the basis of the extracted ROI information. Specifically, the position information in the ROI information includes an X coordinate and a Y coordinate that indicate the upper-left end portion of the region of interest (ROI). The first information extraction unit 231 generates the X-coordinate order data in which the position information and the size information of the predetermined number of regions of interest cut from the captured image are rearranged in ascending order of the values of the start point X coordinates. In this example, the first information extraction unit 231 generates the first coordinate data (see FIG. 16) corresponding to each of the regions of interest ROI0 to ROI2, and generates the X-coordinate order data (see the left side of FIG. 17) in which the pieces of generated first coordinate data are rearranged in ascending order of the values of the start point X coordinates (in the order of the regions of interest ROI2, ROI0, and ROI1).

Furthermore, the first information extraction unit 231 generates the Y-coordinate order data in which the position information and the size information of the predetermined number of regions of interest cut from the captured image are rearranged in ascending order of the values of the start point Y coordinates. In this example, the first information extraction unit 231 generates the second coordinate data (see FIG. 16) corresponding to each of the regions of interest ROI0 to ROI2, and generates the Y-coordinate order data (see the right side of FIG. 17) in which the pieces of generated second coordinate data are rearranged in ascending order of the values of the start point Y coordinates (in the order of the regions of interest ROI2, ROI1, and ROI0). Once the X-coordinate order data and the Y-coordinate order data are generated, the first information extraction unit 231 stores, for example, the generated X-coordinate order data and Y-coordinate order data in the register as the ROI restoration information.

The first information extraction unit 231 may generate final line determination information when generating the ROI restoration information. The final line determination information is generated on the basis of, for example, the Y-coordinate order data. For example, the first information extraction unit 231 may compare the end point Y coordinates in the second coordinate data in the Y-coordinate order data, and store a Y coordinate having the largest value in the register as final line Y coordinate. As a result, the first information extraction unit 231 can determine whether or not writing of the pieces of image data of the regions of interest for all lines in the payload data has been completed by using the final line determination information.

Furthermore, once generation of the restoration information in the information extraction process is performed, the first information extraction unit 231 then analyzes the ROI restoration information and generates the writing information (the writing Y coordinate, the writing start X coordinate, and the writing size) in the writing process. The first information extraction unit 231 generates the writing information for the input payload data 215A every time the payload data 215A is input to the first information processing unit 230a (specifically, the ROI decoding unit 232). That is, the first information extraction unit 231 generates the writing information in units of payload data. Once the payload data 215A is input from the ROI data separation unit 215 on the basis of detection of the header of each line of the payload data in the header interpretation unit 212, the ROI decoding unit 232 outputs a predetermined signal indicating the input to the first information extraction unit 231. As a result, the first information extraction unit 231 can detect that each line of the payload data has been input.

In this example, the first information extraction unit 231 generates the writing information for the payload data 215A corresponding to each line every time the payload data 215A for each of the lines PL1 to PL800 of the payload data illustrated in FIG. 15 is input to the ROI decoding unit 232.

The first information extraction unit 231 generates the writing Y coordinate corresponding to the payload data 215A from the Y-coordinate order data in the ROI restoration information as the writing information. The method of generating the writing Y coordinate is as described above. For example, in a case where the inputting of the payload data 215A corresponding to the line PL1 (see FIG. 15) of the payload data is detected, the first information extraction unit 231 extracts the second coordinate data related to the first region of interest ROI2 of the Y-coordinate order data (see the right side of FIG. 17), and determines the value "100" of the start point Y coordinate of the region of interest ROI2 as the writing Y coordinate. Thereafter, the first information extraction unit 231 updates (increments) the value of the writing Y coordinate every time the payload data 215A is input. In a case where the line PL601 of the 601-th row of the payload data is input, the first information extraction unit 231 extracts the second coordinate data related to the second region of interest ROI1 from the Y-coordinate order data, and uses the updated value "700" of the writing Y coordinate as the writing Y coordinate.

Furthermore, the first information extraction unit 231 generates the writing start X coordinate and the writing size corresponding to the image data of each region of interest (writing target ROI) included in the payload data 215A from the X-coordinate order data in the ROI restoration information as the writing information. The method of generating the writing start X coordinate and the writing size is as described above.

For example, it is assumed that the inputting of the payload data 215A corresponding to the line PL1 of the payload data is detected, and the first information extraction unit 231 generates the writing Y coordinate (Y=100). In this case, the writing Y coordinate is included within a range from the value "100" of the start point Y coordinate to the value "699" of the end point Y coordinate in the first coordinate data of the first region of interest ROI2 of the X-coordinate order data. Therefore, the first information extraction unit 231 determines that the region of interest ROI2 is the writing target ROI, and sets the start point X coordinate (X=100) of the region of interest ROI2 as the writing start X coordinate of the image data of the region of interest ROI2. In addition, the first information extraction unit 231 calculates "400 pixels (=end point X coordinate (499)−start point X coordinate (100)+1)" as the writing size of the region of interest ROI2.

Once the writing target ROI in the payload data 215A is determined on the basis of the X-coordinate order data, the first information extraction unit 231 generates the writing information (the writing Y coordinate, the writing start X coordinate, and the writing size) for each writing target ROI, and outputs the generated writing information to the ROI image address generation unit 233 and the ROI image generation unit 234.

The writing information for each writing target ROI is input from the first information extraction unit 23 to the ROI image address generation unit 233 and the ROI image generation unit 234 in the storage order (in ascending order of the start point X coordinates) in the X-coordinate order data. For example, in a case where the inputting of the payload data 215A corresponding to the line PL41 (see FIG. 15) of the payload data is detected, the first information extraction unit 231 outputs the writing information for the writing target ROI to the ROI image address generation unit 233 and the ROI image generation unit 234 in the order of the regions of interest ROI2 and ROI1. As a result, the ROI image address generation unit 233 and the ROI image generation unit 234 can perform the processing (the address generation and the division of the ROI image row data) related to the writing process of the restoration processing in the order of the regions of interest ROI2 and ROI1, that is, in the storage order in the X-coordinate order data (in ascending order of the start point X coordinates (writing start X coordinates)).

The ROI image address generation unit 233 performs address generation processing in the writing process of the restoration processing. The ROI image address generation unit 233 generates an address indicating a write destination of the image data of the region of interest (ROI) in the frame memory 250 on the basis of the ROI restoration information. The ROI image address generation unit 233 generates an address for writing the image data of the region of interest (writing target ROI) included in the ROI pixel row data in the payload data 215A in the frame memory 250 on the basis of the inputting of the writing information generated from the ROI restoration information from the first information extraction unit 231.

In the present embodiment, the address generated by the ROI image address generation unit 233 is an address corresponding to a restoration position indicating the relative position of the region of interest in the captured image in the frame memory 250. The ROI image address generation unit 233 calculates an address corresponding to a restoration position of the writing target ROI on the basis of the writing information for the writing target ROI input from the first information extraction unit 231. As described above, the ROI image address generation unit 233 specifies coordinates indicating a writing start position of the writing target ROI on the basis of the writing Y coordinate and the writing start X coordinate, and calculates a head address from the writing start position.

In addition, as described above, the ROI image address generation unit 233 calculates consecutive addresses corresponding to the number of pixels of the image data of the writing target ROI on the basis of the head address and the writing size. As described above, the ROI image address generation unit 233 specifies the restoration position of the image data of the writing target ROI in units of pixel rows in the frame memory 250 by using the coordinates of the writing start position and the writing size, and generates the address corresponding to the restoration position. Note that a specific address value calculation method is designed according to allocation of an address region of the frame memory 250 as appropriate.

As described above, the writing information for each writing target ROI is input from the first information extraction unit 231 to the ROI image address generation unit 233 in ascending order of the start point X coordinates (writing start X coordinates). Therefore, the ROI image address generation unit 233 generates an address for each writing target ROI in ascending order of the writing start X coordinates.

The ROI image address generation unit 233 issues an address command including the generated address. The issued address command is transferred to the frame memory 250 via the bus. In addition, at the time of issuing the address command, the ROI image address generation unit 233 outputs the writing size of the writing target ROI, that is, the number of pixels (the number of transfers) of the image data of the writing target ROI to be written in the frame memory 250 to the ROI image generation unit 234.

The ROI image generation unit 234 writes the image data of the region of interest in the frame memory 250 in units of payload data on the basis of the ROI restoration information. More specifically, the ROI image generation unit 234 divides and writes the ROI pixel row data in the writing process of the restoration processing. The ROI image generation unit 234 divides the ROI pixel row data in the payload data 215A for each region of interest (writing target ROI) on the basis of the ROI restoration information, and writes the divided ROI pixel row data in the frame memory 250. Once the writing information generated from the ROI restoration information is input from the first information extraction unit 231, the ROI image generation unit 234 divides the ROI pixel row data in the payload data on the basis of the writing information. The ROI image generation unit 234 generates writing target image data 234A which is image data of the writing target ROI divided from the ROI pixel row data, and writes the writing target image data 234A in the frame memory 250.

ROI decoded image data 232A obtained by decoding the ROI pixel row data in the payload data 215A is input from the ROI decoding unit 232 to the ROI image generation unit 234. The ROI decoding unit 232 decodes the ROI pixel row data (compressed image data 147B) in the payload data 215A input from the ROI data separation unit 215 to generate the ROI decoded image data 232A. Note that, in the present embodiment, the ROI decoded image data 232A includes a payload header PH and a payload footer PF (see FIG. 15).

The ROI image generation unit 234 divides the ROI decoded image data 232A in units of writing target ROIs on the basis of the writing information for the writing target ROI input from the first information extraction unit 231. The ROI image generation unit 234 divides the ROI decoded image data 232A for each writing target ROI on the basis of the writing size in the writing information. As described above, the writing information for each writing target ROI is input from the first information extraction unit 231 to the ROI image generation unit 234 in ascending order of the start point X coordinates (writing start X coordinates). Therefore, the ROI image generation unit 234 divides the image data for each writing target ROI in ascending order of the writing start X coordinates, that is, in order from the payload header side of the ROI decoded image data 232A. For example, the ROI image generation unit 234 separates the image data in units of the writing target ROIs from the ROI decoded image data 232A, and generates the writing target image data for each writing target ROI.

For example, in a case where the line PL41 (see FIG. 15) of the 41-th row of the payload data is input, the ROI image generation unit 234 divides the ROI decoded image data 232A for 400 pixels on the basis of the writing size (400 pixels) of each of the regions of interest ROI2 and ROI1 which are the writing target ROIs. Specifically, the ROI image generation unit 234 divides the ROI decoded image data 232A for 400 pixels from the head (payload header PH side) of the ROI decoded image data 232A as the image data of the region of interest ROI2, and divides the ROI decoded image data 232A for the remaining 400 pixels as the image data of the region of interest ROI1. The ROI image generation unit 234 separates the divided image data of the region of interest ROI2 from the ROI decoded image data 232A to generate the writing target image data 234A of the region of interest ROI2, and similarly generates the writing target image data 234A of the region of interest ROI1.

Once the writing target image data 234A is generated, the ROI image generation unit 234 issues a data command including the writing target image data 234A. The issued data command is transferred to the frame memory 250 via the bus 240. As a result, the writing target image data 234A of the writing target ROI is written in the frame memory 250. The ROI image generation unit 234 may compress the writing target image data 234A and generate a data command including the compressed writing target image data 234A. In this case, the writing target image data 234A is written in the frame memory 250 in a compressed state.

In the present embodiment, as described above, the number of transfers is input to the ROI image generation unit 234 when the ROI image address generation unit 233 issues the address command. In addition, the ROI image address generation unit 233 generates the address in ascending order of the writing start X coordinates of the writing target ROI. Therefore, in the present embodiment, the address command and the data command related to the same writing target ROI are transferred to the frame memory 250 at substantially the same timing. That is, in the video reception device 200a, issuance of the address command and issuance of the data command are synchronized with each other. Therefore, the ROI image generation unit 234 can write the writing target image data 234A of one writing target ROI to the address indicating the write destination of the one writing target ROI by issuing the data command in response to the inputting of the number of transfers from the ROI image address generation unit 233. That is, each pixel of the writing target image data 234A of the writing target ROI included in the data command is written in the frame memory 250 for each address of the writing target ROI indicated by the address command.

Furthermore, once all pieces of the image data of the writing target ROI are separated from the ROI decoded image data 232A and the generation of the writing target image data 234A in units of payload data of the writing target image data 234A is completed, the ROI image generation unit 234 generates a writing termination signal and outputs the writing termination signal to the first information extraction unit 231. For example, the ROI image generation unit 234 separates all pieces of image data of the writing target ROI from the ROI decoded image data 232A, and outputs, once the payload footer PF (see FIG. 15) indicating the end of the image data is detected, the writing termination signal to the first information extraction unit 231. As the writing termination signal is input, the first information extraction unit 231 can recognize that the writing of the pieces of image data of all the regions of interest in each line (payload data 215A) of the payload data has been completed.

As described above, the first information processing unit 230a in the video reception device 200a according to the present embodiment writes the image data of the region of interest in the frame memory 250 on the basis of the generated ROI restoration information. In addition, the first information processing unit 230a (specifically, the ROI image address generation unit 233) specifies the restoration position corresponding to the relative position of the region of interest in the captured image in the frame memory 250 on the basis of the ROI restoration information. Moreover, the first information processing unit 230a (specifically, the ROI image generation unit 234) writes the image data of the region of interest (writing target image data 234A) to the restoration position in the frame memory 250. As described above, the video reception device 200a can restore the image data of the region of interest so as to be displayable on a predetermined display device by performing the restoration processing.

In the present embodiment, the first information processing unit 230a of the video reception device 200a performs the information extraction process and the writing process in the restoration processing, restores the image data of the region of interest so as to be displayable, and writes the image data in the frame memory 250, as a result of which it is possible to efficiently display the image data on the display device 300 (see FIG. 18). Furthermore, in the present embodiment, the first information processing unit 230a is configured as hardware (for example, a restoration processing circuit) capable of performing the information extraction process and the writing process in the restoration processing. As a result, the video reception device 200a can speed up the processing related to the restoration of the image data of the region of interest, and can increase the number of image data frames processed per unit time in the transmission system 2. That is, it is possible to implement the processing performed at a high frame rate. Furthermore, the entire video reception device 200a according to the present embodiment may be configured as hardware (for example, a video reception circuit). In this case, the reception unit 210 that receives the transmission data 147A including the embedded data and the payload data is also configured as hardware (for example, a reception circuit). As a result, the entire processing performed by the video reception device 200a can be speeded up, and the number of image data frames processed per unit time in the transmission system 2 can be further increased. That is, it is possible to implement the processing performed at a higher frame rate.

Here, the frame memory 250 in which the image data of the writing target ROI is written will be described. The frame memory 250 can store, for example, image data (one byte) of one pixel in a region indicated by one address. Note that, for example, in a case of full-color image data, data of one pixel has a memory size of one byte for each of RGB elements, that is, a total of three bytes. Therefore, the frame memory 250 may be provided for each of the RGB elements, and may be configured to write one pixel (three bytes) of full-color image data byte by byte. At this time, for example, the frame memory 250 for each of R, G, and B may have a common address, and image data for one pixel may be writable at an equivalent position of each frame memory by designating one common address.

Furthermore, for example, the content of the transmission data 147A transmitted from the video transmission device 100 in one frame can be written in a region different from that for the image data in the frame memory 250. In the present embodiment, the content of the embedded data (EBD data 214A) set in a frame header region of the transmission data 147A is also written in the frame memory 250. For example, the first information extraction unit 231 outputs the EBD data 214A to the ROI image generation unit 234 in response to the completion of writing of the pieces of image data of all the regions of interest (ROIs) in the payload data 215A (inputting of the writing termination signal). The ROI image generation unit 234 transfers the input EBD data 214A to the frame memory 250. The EBD data 214A is stored as additional image information in the frame memory. As a result, the image data of the region of interest and the embedded data transmitted in one image data frame are stored in the frame memory 250.

When outputting the image data of the region of interest to the display device 300, the video reception device 200a according to the present embodiment performs processing using the embedded data stored in the frame memory 250 together with the image data. As a result, display data including the image data of the region of interest written in the frame memory 250 can be displayed on the display device 300 in a more easily recognizable state.

Furthermore, as will be described in detail later, the image data of the region of interest written in the frame memory 250 is read in units of frame memories, output from the video reception device 200a to the display device 300 (see FIG. 18), and displayed in the screen of the display device 300. Therefore, the image data of the region of interest restored by the first information processing unit 230a and written in the frame memory 250 can be displayed in the screen of the predetermined display device while maintaining the relative position in the captured image. As a result, the image data of the region of interest can be efficiently displayed on the display device 300. Note that processing related to display of the image data of the eye region ROI read from the frame memory 250 will be described later.

Figure 20:
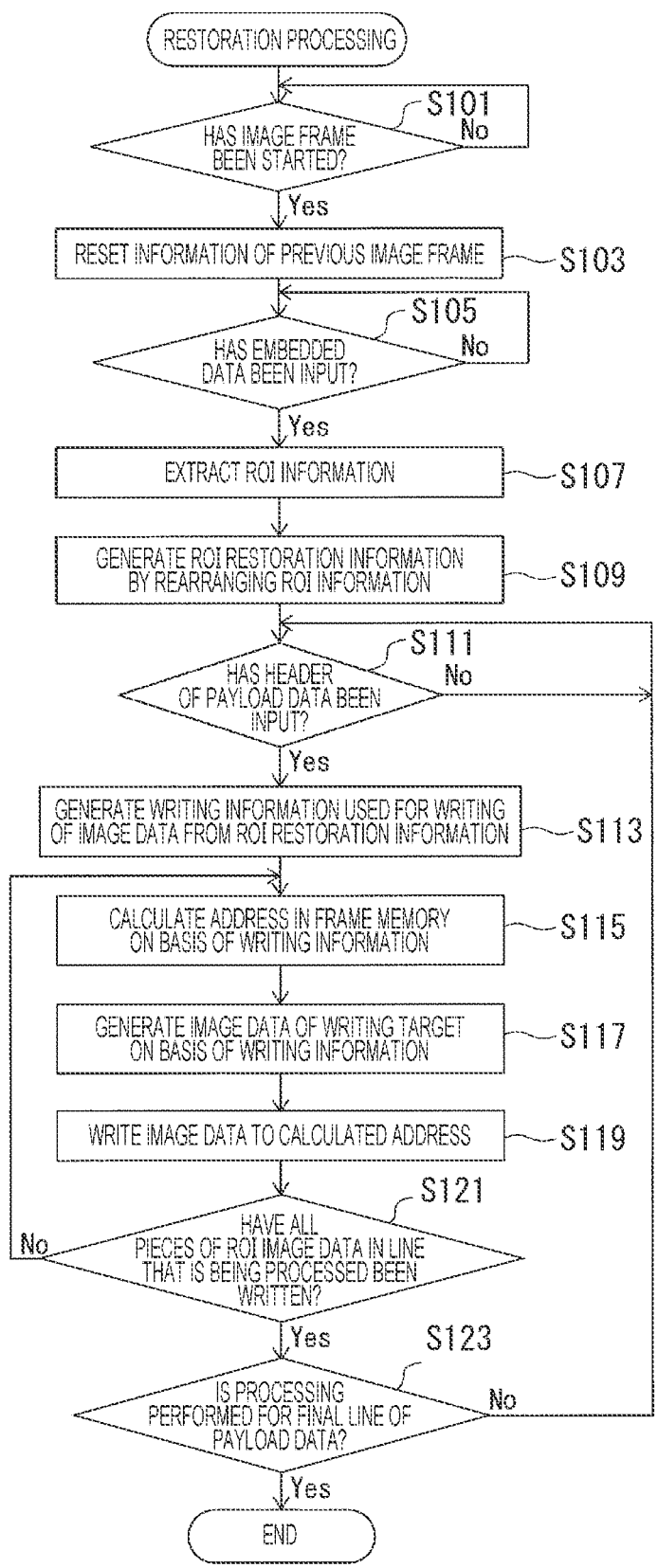
FIG. 20 is a flowchart illustrating an example of a flow of restoration processing in the video reception device according to the present embodiment of the present disclosure.

Next, a flow of the restoration processing in the video reception device 200a according to the present embodiment will be described with reference to FIG. 20. FIG. 20 is a flowchart illustrating an example of a flow of the restoration processing in the video reception device 200a according to the present embodiment.

(Step S101)

Once a predetermined packet is received from the video transmission device 100, the reception unit 210 included in the video reception device 200a determines whether or not the packet is a packet (SOF) indicating a start of a frame (an image data frame in this example). In a case where it is determined that the SOF has been received, the reception unit 210 outputs a control signal indicating that the SOF has been received to the first information processing unit 230a. The first information processing unit 230a performs the processing of Step S103 on the basis of the control signal. On the other hand, in a case where it is determined that the received packet is not the SOF, the reception unit 210 repeats the processing of Step S101 at predetermined intervals and waits for the reception of the SOF.

(Step S103)

The first information processing unit 230a resets information (ROI restoration information or the like) used for the restoration processing in the previous image data frame, and proceeds to Step S105. The first information processing unit 230a erases the ROI restoration information (the X-coordinate order data and the Z-coordinate order data) stored in the register or sets a predetermined value in the register, thereby resetting the ROI restoration information and the like in the previous image data frame.

(Step S105)

The first information processing unit 230a determines whether or not embedded data has been input. Specifically, the first information extraction unit 231 included in the first information processing unit 230a determines whether or not the embedded data (EBD data 214A) including ROI information has been input from the EBD interpretation unit 214 included in the reception unit 210. In a case where it is determined that the EBD data 214A has been input, the first information extraction unit 231 proceeds to Step S107. On the other hand, in a case where it is determined that the EBD data 214A has not been input, the first information extraction unit 231 repeats the processing of Step S105 at predetermined intervals, and waits for the execution of the processing of Step S107 and subsequent steps until the EBD data 214A is input.

(Step S107)

The first information extraction unit 231 extracts the ROI information (position information and size information) from the embedded data (EBD data 214A), and proceeds to Step S109. For example, the first information extraction unit 231 extracts, from the EBD data 214A, start point coordinates as the position information corresponding to the regions of interest ROI0 to ROI2 cut from the captured image α, and extracts the lengths in the X-axis direction and the Y-axis direction as the size information.

(Step S109)

The first information extraction unit 231 rearranges the extracted ROI information to generate ROI restoration information (X-coordinate order data and Y-coordinate order data), and proceeds to Step S111. Specifically, the first information extraction unit 231 generates the ROI restoration information (the X-coordinate order data and the Y-coordinate order data) by rearranging the first coordinate data and the second coordinate data (see FIG. 16) generated on the basis of the extracted ROI information as described above. In addition, the first information extraction unit 231 generates final line determination information together with the ROI restoration information. For example, the first information extraction unit 231 generates the X-coordinate order data (see the left side of FIG. 17) by rearranging the pieces of first coordinate data of the regions of interest ROI0 to ROI2 in ascending order of the start point X coordinates, and generates the Y-coordinate order data (see the right side of FIG. 17) by rearranging the pieces of second coordinate data of the regions of interest ROI0 to ROI2 in ascending order of the start point Y coordinates. In addition, the first information extraction unit 231 generates the end point Y coordinate (899) of the region of interest ROI0 having the largest value in the Y-coordinate order data as the final line determination information.

(Step S111)

The first information extraction unit 231 determines whether or not a header of the payload data has been input. In the present embodiment, in a case where a signal indicating that the payload data 215A has been input is detected in the ROI decoding unit 232, the first information extraction unit 231 determines that the header of the payload data has been input, and proceeds to Step S113. On the other hand, in a case where the signal indicating that the payload data 215A has been input is not detected, the first information extraction unit 231 repeats the processing of Step S111 at predetermined intervals until the input of the signal is detected, that is, until the header of the payload data is input.

(Step S113)

The first information extraction unit 231 generates writing information (writing Y coordinate, writing start X coordinate, and writing size) to be used for writing the image data of the region of interest (writing target ROI) from the ROI restoration information, and proceeds to Step S115. The first information extraction unit 231 generates the writing Y coordinate from the Y-coordinate order data, and generates the writing start X coordinate and the writing size from the X-coordinate order data by using the generated writing Y coordinate. The first information extraction unit 231 outputs the writing information generated for each writing target ROI to the ROI image address generation unit 233 and the ROI image generation unit 234 in ascending order of the writing start X coordinates. On the basis of the input writing information, the ROI image address generation unit 233 performs the processing of Step S115, and the ROI image generation unit 234 performs the processing of Steps S117 and S119.

(Step S115)

The ROI image address generation unit 233 calculates an address corresponding to a restoration position of the writing target ROI in the frame memory 250 on the basis of the input writing information. The calculated address is issued as an address command and transferred to the frame memory 250. In addition, the ROI image address generation unit 233 outputs the number of transfers indicating the number of pixels of the writing target ROI to the ROI image generation unit 234 in response to the light emission of the address command.

(Step S117)

The ROI image generation unit 234 generates the writing target image data 234A on the basis of the writing information input from the first information extraction unit 231, and proceeds to Step S119. The ROI image generation unit 234 divides the ROI decoded image data 232A input from the ROI decoding unit 232 in units of writing target ROIs on the basis of the input writing information, and generates the writing target image data 234A.

(Step S119)

The ROI image generation unit 234 issues a data command including the writing target image data 234A, and writes the writing target image data 234A in the frame memory 250 via the bus 240. The ROI image generation unit 234 issues the data command at a timing when the number of transfers is input from the ROI image address generation unit 233. Further, the ROI image generation unit 234 outputs a predetermined signal indicating that the data command has been issued to the first information extraction unit 231. Once the signal is input, the first information extraction unit 231 performs the processing of Step S121. In a case where the payload footer PF of the ROI decoded image data 232A is detected, the ROI image generation unit 234 outputs a writing termination signal to the first information extraction unit 231.

(Step S121)

The first information extraction unit 231 determines whether or not all pieces of image data (ROI pixel row data in the ROI decoded image data 232A) of the writing target ROI in the input payload data (payload data 215A) for one line have been written in the frame memory 250. Once the predetermined signal indicating that the data command has been issued is input from the ROI image generation unit 234, the first information extraction unit 231 performs the determination. In a case where the writing termination signal is input from the ROI image generation unit 234, the first information extraction unit 231 determines that the writing of the image data of the writing target ROI in the payload data for one line has been terminated, and proceeds to Step S123. On the other hand, in a case where the writing termination signal is not input, the first information extraction unit 231 determines that image data of the writing target ROI that has not been written in the frame memory 250 remains, and returns to Step S115.

In this way, in the restoration processing in the present embodiment, the processing from Step S115 to Step S119 is repeated by the number of writing target ROIs in each line of the payload data. As a result, the pieces of image data of all the writing target ROIs in each line of the payload data can be written in the frame memory 250 in ascending order of the writing start X coordinates. For example, all pieces of image data of the regions of interest ROI2, ROI0, and ROI1 which are the writing target ROIs of the line PL600 (see FIG. 15) of the payload data can be written in the frame memory 250 in this order.

(Step S123)

The first information extraction unit 231 determines whether or not the processing is performed for the final line of the payload data. The first information extraction unit 231 compares the value of the writing Y coordinate in the current writing information with the value of the final line determination information on the basis of the inputting of the writing termination signal, and determines that the processing is performed for the final line of the payload data in a case where the value of the writing Y coordinate is equal to the value of the final line determination information. On the other hand, in a case where the value of the writing Y coordinate is not equal to the value of the final line determination information, the first information extraction unit 231 determines that the processing is not performed for the final line of the payload data and returns to Step S111. As a result, the restoration processing can be performed on the pieces of image data of the regions of interest of the payload data of all lines stored in the packet region R2 in the transmission data 147A.

For example, in a case where the restoration processing for the lines PL1 to PL800 of the payload data illustrated in FIG. 15 is performed, the first information extraction unit 231 determines that the processing is performed for the final line of the payload data in a case where the value of the writing Y coordinate is equal to the value "899" of the final line determination information. As a result, in the video reception device 200a, the restoration processing for the image data of the region of interest is performed for all 800 lines, the lines PL1 to PL800, and the pieces of image data of the regions of interest ROI0 to ROI2 are written in the frame memory 250.

As described above, the video reception device 200a and the video transmission system 2 according to the present embodiment can perform the restoration processing for the image data of the region of interest.

Next, a configuration related to normal image processing in the first information processing unit 230a will be described. The first information processing unit 230a includes the normal image address generation unit 235, a normal image decoding unit 236, and a normal image generation unit 237 as components for performing the normal image processing.

The normal image decoding unit 236 decodes the payload data 215B input from the ROI data separation unit 215, and generates a normal image 224A. The normal image decoding unit 236 decodes the compressed image data 147B included in the payload data 215A and outputs the decoded data to the normal image generation unit 237. In addition, the normal image address generation unit 235 generates a normal image address for writing data of a normal image in the frame memory 250 in units of pixel rows on the basis of the inputting of the determination result indicating that the image data included in the payload data is the normal image data (the payload data 215B including the data of the normal image has been output to the normal image decoding unit 236) from the ROI data separation unit 215.

In the present embodiment, the frame memory 250 is configured to be able to store image data of the entire region of a captured image (for example, the captured image α). Therefore, it is sufficient if the normal image address generation unit 235 generates the address of the captured image in units of pixel rows (from the left end to the right end in the X-axis direction) every time the above-described determination result is input from the ROI data separation unit 215. In this example, in a case of generating an address of the data of the normal image corresponding to the top pixel row of the captured image α, the normal image address generation unit 235 first calculates an address of the frame memory 250 corresponding to the coordinates "0,0 (X,Y)" indicating the origin α_o of the captured image α as a head address. Moreover, once the head address is calculated, the normal image address generation unit 235 generates consecutive addresses for storing the pixels of the top pixel row of the captured image α on the basis of the writing size (1760 pixels) of the captured image α in units of pixel rows in the X-axis direction, similarly to the address generation in the ROI image address generation unit 233. Thereafter, it is sufficient if the address of the data of the normal image is generated and the address command is issued, similarly to the address of the top pixel row while incrementing the Y coordinates by 1.

Note that the data of the normal image may be divided and transferred to the frame memory 250 according to the specification of the bus 240 or the like. In this case, the normal image address generation unit 235 may generate and issue the address command by performing division for each predetermined number of pixels of the captured image in units of pixel rows. In this case, it is sufficient if the normal image address generation unit 235 outputs the number of pixels (the number of transfers) at the time of transfer of the data of the normal image based on the number of divisions of the addresses to the normal image generation unit 237.

The normal image generation unit 237 generates and issues the data command for writing the data in the frame memory 250 on the basis of the data of the decoded normal image input from the normal image decoding unit 236. In addition, the normal image generation unit 237 may divide the data of the normal image on the basis of the number of transfers input from the normal image address generation unit 235, and generate and issue the data command including the divided data of the normal image. Furthermore, the normal image generation unit 237 may compress the data of the normal image and generate the data command including the compressed data of the normal image. In this case, the data of the compressed normal image is written in the frame memory 250.

In addition, the normal image address generation unit 235 issues a predetermined command and transfers the result of determining the data type of the image data input from the ROI data separation unit 215 to the frame memory 250. The determination result is stored as the additional image information in the frame memory. As a result, the data of the normal image and the determination result indicating the data type corresponding to the data of the normal image transmitted in one image data frame are stored in the frame memory 250.

5. Processing Related to Display of Image Data in Video Reception Device

Next, processing related to display of image data stored in the frame memory 250 will be described. Returning to FIG. 19, the video reception device 200a according to the present embodiment includes the second information processing unit 230b as a component for performing the processing related to display of image data stored in the frame memory 250. The second information processing unit 230b performs image data replacement processing, for example, as processing related to display of image data of a region of interest.

5-1. Configuration Related to Image Data Replacement Processing

As will be described in detail later, the image data replacement processing is processing of, in a case where image data of a region of interest is displayed on the display device 300, replacing non-ROI image data which does not correspond to the image data of the region of interest among pieces of image data in units of screens of the display device 300 stored in the frame memory 250 with fixed value image data. Hereinafter, the image data replacement processing in the second information processing unit 230b will be described.

In the present embodiment, for example, in a case where image data (image data of a region of interest (ROI) and data of a normal image) transmitted in units of image data frames from the video transmission device 100 (see FIG. 18) is written in the frame memory 250, data (additional information and image data) in the frame memory 250 is sequentially read by the DMA controller 260 written on the basis of the image data frame. The read data is output to the second information processing unit 230*b*.

The DMA controller 260 according to the present embodiment controls transfer of data between the frame memory 250 and the second information processing unit 230*b*. Note that the DMA controller 260 in the present disclosure is not limited thereto, and may be configured to control transfer of data between the frame memory 250 and the first information processing unit 230*a*.

The DMA controller 260 is a controller for transferring data between the frame memory 250 and the second information processing unit 230*b* via the bus 240 by direct memory access (DMA). The DMA controller 260 outputs the additional information read from the frame memory 250 to the second information extraction unit 271. Further, the DMA controller 260 outputs display target image data RD, which is display target image data read from the frame memory 250, to the image data replacement unit 272. For example, once each pixel of image data in the frame memory 250 is read for each address, the DMA controller 260 outputs the image data to the image data replacement unit 272 as the display target image data RD in units of pixel rows in the frame memory 250.

For example, in a case where the frame memory 250 can store image data of 1760 pixels (X coordinate=0 to 1759) per pixel row, the display target image data RD includes image data corresponding to 1760 pixels. Note that the display target image data RD output from the DMA controller 260 to the image data replacement unit 272 is not limited to being output in units of pixel rows, and may be output in units of pixels (for each pixel), for example. Further, the DMA controller 260 may divide the image data in units of pixel rows into a plurality of pieces of display target image data RD and output the plurality of pieces of display target image data RD to the image data replacement unit 272.

The second information extraction unit 271 in the second information processing unit 230*b* analyzes the additional information input from the DMA controller 260. Specifically, the second information extraction unit 271 determines whether or not the input additional information is the embedded data (EBD data 214A), and generates the ROI restoration information on the basis of the ROI information (ROI information 120B) included in the embedded data in a case where the additional information is the embedded data.

Similarly to the first information extraction unit 231 in the first information processing unit 230*a*, the second information extraction unit 271 extracts the position information (start point coordinates) and the size information (lengths in the X-axis direction and the Y-axis direction) of the region of interest from the ROI information (ROI information 120B) included in the embedded data (EBD data 214A), and generates the ROI restoration information (X-coordinate order data and Y-coordinate order data). The second information extraction unit 271 stores the generated ROI restoration information in a predetermined register. In addition, the second information extraction unit 271 may output a signal indicating that the ROI restoration information has been generated to the image data replacement unit 272. In the present embodiment, the generation of the ROI restoration information by the second information extraction unit 271 corresponds to an information extraction process in the image data replacement processing.

In a case where image data of a region of interest is displayed on the display device 300 (see FIG. 18), the image data replacement unit 272 in the second information processing unit 230*b* replaces non-ROI image data which does not correspond to the image data of the region of interest among the pieces of image data in units of screens of the display device 300 stored in the frame memory 250 with the fixed value image data. In the present embodiment, the replacement of the non-ROI image data in the image data replacement unit 272 corresponds to a replacement process in the image data replacement processing.

Here, the fixed value image data is, for example, image data having a fixed mode. In the present embodiment, the fixed value image data is, for example, image data of a fixed color (for example, white). Therefore, once the image data replacement processing in the present embodiment is performed, non-ROI image data is replaced with white image data. Generally, image data transmitted in an image data frame is sequentially overwritten in each address region of a frame memory. Furthermore, in a case where image data is written in units of image data frames, initialization of a frame memory is usually not performed. Therefore, in a case where image data of a region of interest is newly overwritten in a frame memory, image data transmitted in the previous image data frame remains in an address other than the address to which the image data is overwritten.

In a case where image data of a region of interest is displayed, the video reception device 200*a* according to the present embodiment performs the image data replacement processing to replace non-ROI image data, that is, image data remaining in an address other than the address to which the image data is overwritten with the fixed value image data. As a result, the video reception device 200*a* can improve the visibility of image data of a region of interest to be displayed on the display device 300. Note that, in a case where the image data of the region of interest is written to the restoration position (a position corresponding to the relative position in the captured image) in the frame memory 250, the fixed value image data is displayed on the display device 300 as an image indicating the non-region of interest OE in the captured image.

Once the signal indicating that the ROI restoration information has been generated is input from the second information extraction unit 271, the image data replacement unit 272 determines that the image data of the region of interest is the display target and the image data of the region of interest is included in the display target image data RD input from the DMA controller 260. As a result, the image data replacement unit 272 performs replacement (replacement process) of the non-ROI image data for the display target image data RD on the basis of the ROI restoration information generated by the second information extraction unit 271.

The image data replacement unit 272 specifies the non-ROI image data on the basis of the ROI restoration information generated by the second information extraction unit 271 in the replacement process of the image data replacement processing. The image data replacement unit 272 specifies the non-ROI image data among the pieces of image data in units of screens stored in the frame memory 250 on the basis of the X-coordinate order data and the Y-coordinate order data. In addition, the image data replacement unit 272 determines whether each pixel of the image data in units of screens in the frame memory 250 is included in the image data of the region of interest or in the non-ROI image data on the basis of the ROI restoration information.

Specifically, the image data replacement unit 272 acquires a coordinate position of each pixel of the image data in units of screens (image data in the frame memory 250), and determines whether or not the coordinate position is included in the region of interest. For example, once the display target image data RD in units of pixel rows read from the frame memory 250 is input, the image data replacement unit 272 acquires the coordinate position of each pixel of the display target image data RD. For example, the image data replacement unit 272 acquires the coordinate position of each pixel in order from the head (X coordinate=0) of the display target image data RD (for example, X coordinate=0 to 1759).

In the present embodiment, the image data replacement unit 272 acquires the coordinate position of the image data (display target image data RD) read using a counter. In the present embodiment, the second information processing unit 230b includes a counter unit used for various types of measurement processing. In the present embodiment, the second information processing unit 230b includes a horizontal counter Xct and a vertical counter Yct as the counter units. The horizontal counter Xct is a counter that measures a position (horizontal position) of the display target image data RD in the X-axis direction in the captured image read from the frame memory 250. A counter value of the horizontal counter Xct corresponds to an X coordinate in a captured image (for example, the captured image α). Furthermore, the vertical counter Yct is a counter that measures a position (vertical position) of the display target image data RD in the Y-axis direction in the captured image. A value of the vertical counter Yct corresponds to a Y coordinate in a captured image, and indicates the position of a pixel row in the captured image. For example, in a case where the values of the horizontal counter Xct and the vertical counter Yct are "0", the origin α_o (0,0) in the captured image is indicated.

Once the display target image data RD is input, the image data replacement unit 272 sequentially acquires the coordinates of each pixel of the display target image data RD from the head by referring to the value of the horizontal counter Xct. In the present embodiment, the video reception device 200a performs each processing in the device in synchronization with a predetermined clock signal. Therefore, the counter value of the horizontal counter Xct is updated (incremented) by 1 in synchronization with the clock signal. Furthermore, in the present embodiment, once the counter value of the horizontal counter Xct reaches the end of the X coordinates of the captured image, that is, a value indicating the right end of the captured image, the value of the vertical counter Yct is updated (incremented by 1). For example, the X coordinate of the right end portion of the captured image α is "1759". Therefore, once the counter value of the horizontal counter Xct reaches "1759", the counter value of the horizontal counter Xct is reset to "0". At this time, the value of the vertical counter Yct is updated (incremented by 1).

Once the coordinate position of each pixel of the display target image data RD is acquired, the image data replacement unit 272 determines whether or not the coordinate position acquired on the basis of the ROI restoration information (the X-coordinate order data and the Y-coordinate order data) is included in the region of interest. The image data replacement unit 272 outputs image data of a pixel included in the region of interest among the pixels of the display target image data RD to the display device 300. On the other hand, the image data replacement unit 272 determines data of a pixel that is not included in the region of interest among the pixels of the display target image data RD as the non-ROI image data, replaces the image data of the pixel with the fixed value image data, and outputs the fixed value image data to the display device 300.

For example, in order to specify the non-ROI image data, the image data replacement unit 272 determines whether or not the Y coordinate (pixel Y coordinate) and the X coordinate (pixel X coordinate) of each pixel of the display target image data RD in the captured image are included in the region of interest. For example, the image data replacement unit 272 first determines the pixel Y coordinate by using the Y-coordinate order data of the ROI restoration information.

Here, an example of determination of the pixel Y coordinate in the replacement process of the image data replacement processing will be described. The image data replacement unit 272 determines the pixel Y coordinate by using, for example, the counter value of the vertical counter Yct indicating the pixel Y coordinate and the Y-coordinate order data. The image data replacement unit 272 extracts the second coordinate data in order from the head of the Y-coordinate order data (in ascending order of the start point Y coordinates), and determines whether or not the counter value of the vertical counter Yct is included in a range (vertical ROI range) from the start point Y coordinate to the end point Y coordinate in the extracted second coordinate data (first determination condition).

Furthermore, in a case where it is determined that the counter value of the vertical counter Yct is included in the vertical ROI range (the first determination condition is satisfied), the image data replacement unit 272 extracts the first coordinate data of the region of interest (ROI) associated with the second coordinate data from the X-coordinate order data, and determines the pixel X-coordinate. On the other hand, in a case where it is determined that the counter value of the vertical counter Yct is not included in the vertical ROI range in any second coordinate data of the Y-coordinate order data (the first determination condition is not satisfied), the image data replacement unit 272 determines that a pixel that is being processed in the display target image data RD is not included in the image data of the region of interest and is included in the non-ROI image data.

Next, an example of determination of the pixel X coordinate in the replacement process of the image data replacement processing will be described. The image data replacement unit 272 extracts, from the X-coordinate order data, the first coordinate data associated with the second coordinate data in a case where the first determination condition is satisfied, and determines whether or not the counter value of the horizontal counter Xct is included in a range (horizontal ROI range) from the start point X coordinate to the end point X coordinate in the extracted first coordinate data (second determination condition). In this manner, the image data replacement unit 272 determines the pixel X coordinates by using, for example, the counter value of the horizontal counter Xct indicating the pixel X coordinates and the X-coordinate order data.

In a case where it is determined that the counter value of the horizontal counter Xct is included in the horizontal ROI range (the second determination condition is satisfied), the image data replacement unit 272 determines that a pixel that is being processed in the display target image data RD is included in the region of interest and is included in the image data of the region of interest. That is, in a case where both the first determination condition and the second determination condition described above are satisfied and it is determined that the coordinate position of the processing target pixel (a target of determination as to whether or not the pixel is within the region of interest) in the display target image data RD is included in the region of interest, the image data replacement unit 272 determines that the pixel that is being processed is included in the image data of the region of interest.

On the other hand, in a case where it is determined that the counter value of the horizontal counter Xct is not included in the horizontal ROI range (the second determination condition is not satisfied), the image data replacement unit 272 determines that the pixel that is being processed in the display target image data RD is not included in the image data of the region of interest and is included in the non-ROI image data. As described above, in a case where any one of the first determination condition and the second determination condition is not satisfied and it is determined that the coordinate position of the pixel that is being processed is not included in the region of interest, the image data replacement unit 272 determines that the pixel is included in the non-ROI image data.

In a case where it is determined that the coordinate position of the pixel that is being processed in the display target image data RD is included in the region of interest in the replacement process of the image data replacement processing, the image data replacement unit 272 outputs (sends) the pixel as the display target image data to the display device 300. On the other hand, in a case where it is determined that the coordinate position of the pixel that is being processed in the display target image data RD is included not in the region of interest but in the non-ROI image data in the replacement process of the image data replacement processing, the image data replacement unit 272 replaces the data of the pixel (display target image data) with the fixed value image data and outputs (sends) the fixed value image data to the display device 300.

5-2. Image Data Replacement Processing Method

Figure 21:
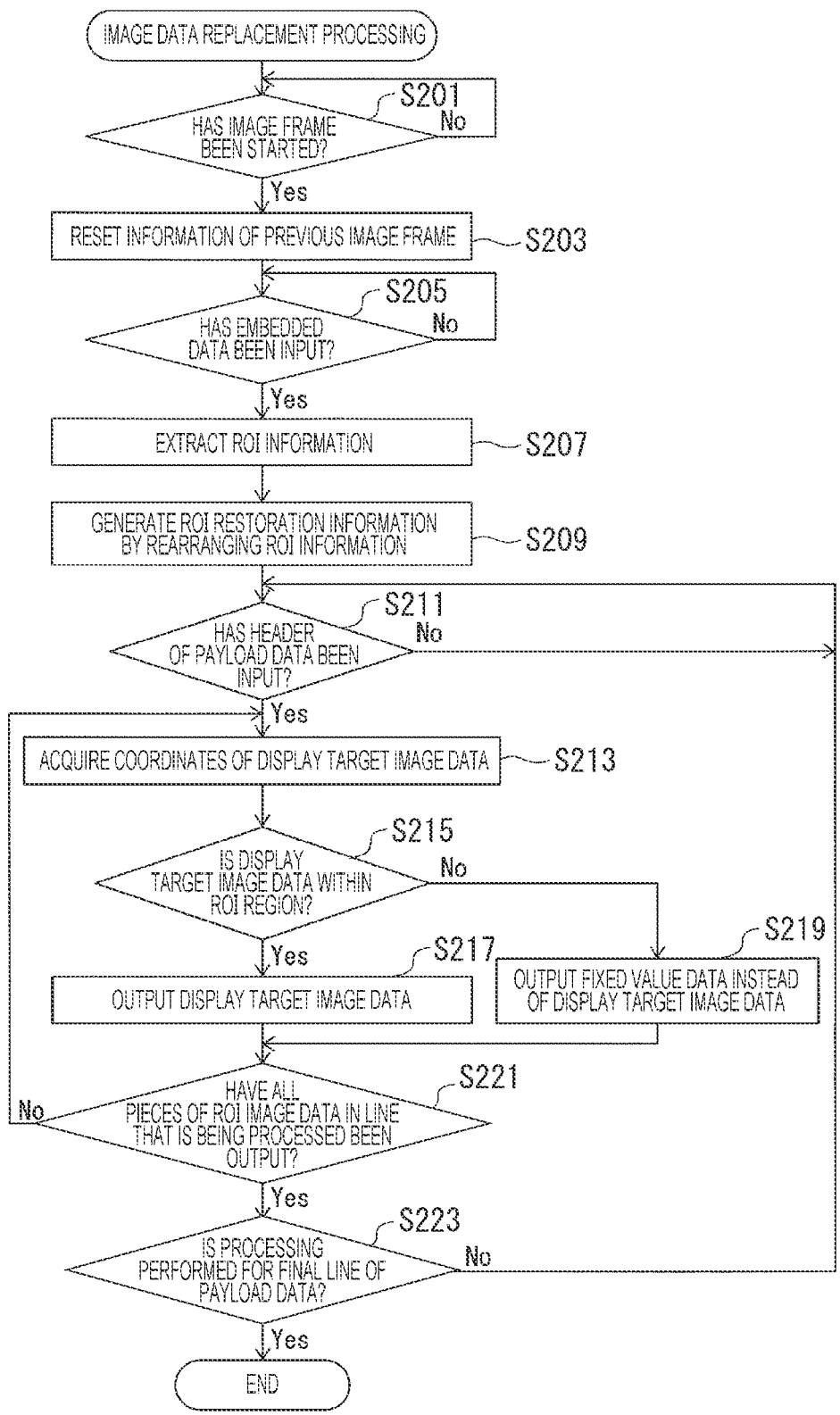
FIG. 21 is a flowchart illustrating an example of a flow of image data replacement processing in the video reception device 200a according to an embodiment of the present disclosure.

Next, a flow of the image data replacement processing (image data replacement processing method) in the video reception device 200a according to the present embodiment will be described with reference to FIG. 22. FIG. 21 is a flowchart illustrating an example of the flow of the image data replacement processing in the video reception device 200a according to the present embodiment.

(Step S201)

In the second information processing unit 230b included in the video reception device 200a, the second information extraction unit 271 determines whether or not an image data frame has been started. In the present embodiment, the image data frame in the image data replacement processing indicates a series of data read from the frame memory 250 by the DMA controller 26. That is, a series of read data including the additional information and the image data sequentially read from the frame memory 250 corresponds to the image data frame in the image data replacement processing.

In Step S201, the second information extraction unit 271 determines whether or not the DMA controller 260 has started reading the data from the frame memory 250. In a case where it is determined that reading of the data from the frame memory 250 has been started (the image data frame has been started) in response to an input of a predetermined signal or command from the DMA controller 260, for example, the second information extraction unit 271 proceeds to Step S203. On the other hand, in a case where it is determined that reading of the data from the frame memory 250 has not been started (the image data frame has not been started), the second information extraction unit 271 repeats the processing of Step S201 at predetermined intervals until the reading is started.

(Step S203)

The second information extraction unit 271 resets various pieces of information generated at the time of reading the previous image data frame in the image data replacement processing, and proceeds to Step S205. The second information extraction unit 271 erases the ROI restoration information (the X-coordinate order data and the Z-coordinate order data) stored in the register or sets a predetermined value in the register, thereby resetting the ROI restoration information and the like in the previous image data frame.

(Step S205)

The second information extraction unit 271 determines whether or not embedded data has been input. Specifically, the second information extraction unit 271 determines whether or not the embedded data (EBD data 214A) including the ROI information as the additional information has been input from the DMA controller 260. In a case where it is determined that the EBD data 214A read from the frame memory 250 has been input, the first information extraction unit 231 proceeds to Step S207. On the other hand, in a case where it is determined that the EBD data 214A has not been input, the second information extraction unit 271 repeats the processing of Step S205 at predetermined intervals, and waits for the execution of the processing of Step S207 and subsequent steps until the EBD data 214A is input.

Note that, in a case where a determination result indicating the data type corresponding to a normal image has been input as the additional information from the DMA controller 260 to the second information extraction unit 271, it is sufficient if the second information processing unit 230b performs the processing related to display of data of a normal image. The processing will be described later.

(Step S207)

The second information extraction unit 271 extracts the ROI information (the position information and the size information) from the embedded data (EBD data 214A) in a similar manner to the processing performed by the first information extraction unit 231 in Step S107 (see FIG. 20) in the restoration processing, and proceeds to Step S209.

(Step S209)

The second information extraction unit 271 rearranges the extracted ROI information to generate the ROI restoration information (the X-coordinate order data and the Y-coordinate order data) similarly to the processing performed by the first information extraction unit 231 in Step S109 (see FIG. 20) in the restoration processing, and proceeds to Step S211. Further, at this time, the second information extraction unit 271 stores the ROI restoration information in the register, and outputs a signal indicating that the ROI restoration information has been generated to the image data replacement unit 272. Note that, for example, the register in which the ROI restoration information generated by the second information extraction unit 271 in the image data replacement processing is stored is different from the register in which the ROI restoration information generated by the first information extraction unit 231 in the restoration processing is stored.

(Step S211)

In the second information processing unit 230b included in the video reception device 200a, the image data replacement unit 272 determines whether or not payload data has been input. The payload data in the image data replacement processing indicates the display target image data RD in units of pixel rows read from the frame memory 250 for each address by the DMA controller 260. In a case where the display target image data RD has been input from the DMA controller 260, the second information extraction unit 271 determines that the payload data has been input, and proceeds to Step S213. On the other hand, in a case where display target image data RD has not been input from the DMA controller 260, the second information extraction unit 271 determines that the payload data has not been input, and repeats the processing in Step S211 at predetermined intervals (for example, a cycle synchronized with the clock signal) until the display target image data RD is input.

Hereinafter, the processing of Step S213 and Step S215 and the processing of Step S217 or Step S219 are processing performed for all the pixels in the payload data (display target image data RD), that is, processing performed so as to cover each pixel. Therefore, the image data replacement unit 272 repeats the processing in Steps S213 and S215 until the processing in the replacement process of the image data replacement processing ends for all the pixels in the display target image data RD (YES in Step S221), and performs the processing in Step S217 or S219 according to the result of Step S215.

(Step S213)

The image data replacement unit 272 acquires the display target image data, that is, the coordinates of the display target pixel in the display target image data RD read from the frame memory 250, and proceeds to Step S215. The image data replacement unit 272 acquires the counter value of the vertical counter Yct as the pixel Y coordinate. Furthermore, the image data replacement unit 272 acquires the counter value of the horizontal counter Xct as the pixel X coordinate. As a result, the coordinates of each pixel are acquired. In the image data replacement processing, the image data replacement unit 272 sequentially acquires the coordinates from the head (X coordinate=0) for each pixel in the display target image data RD, for example, every time Step S213 is performed at a cycle synchronized with the clock signal.

The image data replacement unit 272 determines whether or not the coordinate position of the display target pixel acquired in Step S213 is included in the region of interest (ROI). As described above, the image data replacement unit 272 determines the value (pixel Y coordinate) of the vertical counter Yct on the basis of the Y-coordinate order data, and determines the value (pixel X coordinate) of the horizontal counter Xct on the basis of the X-coordinate order data. In a case where it is determined that the pixel Y coordinate is included in the vertical ROI range (the first determination condition is satisfied) and the pixel X coordinate is included in the horizontal ROI range (the second determination condition is satisfied), the image data replacement unit 272 determines that the display target pixel is included in the region of interest (ROI), and proceeds to Step S217. On the other hand, in a case where it is determined that any one of the first determination condition and the second determination condition is not satisfied, the image data replacement unit 272 determines that the display target pixel is included not in the region of interest but in the non-ROI image data, and proceeds to Step S219.

(Step S217)

The image data replacement unit 272 outputs the pixel to the display device 300 (see FIG. 18) on the basis of the determination that the display target pixel is included in the region of interest, and proceeds to Step S221.

(Step S219)

The image data replacement unit 272 replaces the display target pixel with the fixed value image data on the basis of the determination that the display target pixel is included in the non-ROI image data. Specifically, the image data replacement unit 272 outputs the fixed value image data to the display device 300 instead of the display target pixel, and proceeds to Step S221.

(Step S221)

The image data replacement unit 272 determines whether or not all pieces of image data in a line that is being processed in the payload data, that is, all pixels in the display target image data RD in units of pixel rows, have been output. In a case where the counter value (pixel X coordinate) of the horizontal counter Xct has reached the value of an end X coordinate (an end coordinate in the X-axis direction) corresponding to the right end portion in the captured image, the image data replacement unit 272 determines that all the pixels in the display target image data RD have been output, and proceeds to Step S223. At this time, the image data replacement unit 272 resets the counter value of the horizontal counter Xct (sets the counter value to "0"). For example, it is assumed that the X coordinate of the right end portion of the captured image α is "1759", and the frame memory 250 can store image data of 1760 pixels (X coordinate=0 to 1759) per pixel row. In this case, in a case where the counter value of the horizontal counter Xct is "1759", the image data replacement unit 272 determines that all the pixels in the display target image data RD have been output. As described above, once the horizontal counter Xct is reset, the counter value of the vertical counter Yct is updated (incremented by 1). As a result, the value of the pixel Y coordinate common in the display target image data RD in units of pixel rows is updated.

On the other hand, in a case where it is determined that the counter value of the horizontal counter Xct is less than the value of the end X coordinate in the frame memory 250, the image data replacement unit 272 returns to Step S213. As a result, the replacement process in the image data replacement processing is performed for all the pixels in the display target image data RD in units of pixel rows.

(Step S223)

The image data replacement unit 272 determines whether or not processing for the last line of the payload data, that is, processing (processing in the replacement process of the image data replacement processing) for all pieces of image data in the frame memory has ended. The image data replacement unit 272 updates (increments by 1) the value (counter value) of the vertical counter Yct. For example, in a case where the value (pixel Y coordinate) of the vertical counter Yct has reached the value of the Y coordinate corresponding to the lower end portion of the captured image, the image data replacement unit 272 determines that the processing for all pieces of display target image data RD read from the frame memory 250 has ended, and ends the image data replacement processing. At this time, the image data replacement unit 272 resets the horizontal counter Xct and the vertical counter Yct in this order (sets the counter values to "0"). As a result, both the counter values of the horizontal counter Xct and the vertical counter Yct become "0".

For example, it is assumed that the Y coordinate of the lower end portion of the captured image α is "989", and the frame memory 250 can store image data of 989 pixel rows. In this case, in a case where the value of the vertical counter Yct is "989", the image data replacement unit 272 determines that the processing for all pieces of image data read from the frame memory 250 has ended, and ends the image data replacement processing. On the other hand, in a case where it is determined that the counter value of the vertical counter Yct is less than the value of the Y coordinate of the lower end portion of the captured image α, the image data replacement unit 272 returns to Step S211. As a result, the replacement process in the image data replacement processing is performed for all the pixels in the display target image data RD corresponding to all the pixel rows in the frame memory 250, that is, all pieces of image data in the frame memory 250.

As described above, the video reception device 200*a* (see FIG. 19) according to the present embodiment includes: the reception unit 210 that receives a transmission signal in which image data of a predetermined number of regions of interest (ROI) cut from a predetermined captured image is included in payload data, and ROI information is included in embedded data; and the information processing unit 230 (specifically, the first information processing unit 230*a*) capable of performing restoration processing of restoring the image data of the region of interest so as to be displayable on the display device 300 (see FIG. 18) on the basis of the ROI information corresponding to the predetermined number of regions of interest extracted from the embedded data. As a result, the image data of the region of interest can be efficiently displayed on the display device 300.

In addition, in a case where the image data of the region of interest is displayed on the display device 300, the information processing unit 230 (specifically, the second information processing unit 230*b*) in the video reception device 200*a* according to the present embodiment replaces non-ROI image data which does not correspond to the image data of the region of interest, among the pieces of image data in units of screens of the display device 300 stored in the frame memory 250 with fixed value image data. As a result, it is possible to improve the visibility of image data of a region of interest to be displayed on the display device 300.

Furthermore, in the video reception device 200*a* according to the present embodiment, the reception unit 210 and the information processing unit 230 (the first information processing unit 230*a* and the second information processing unit 230*b*) are configured as hardware. As a result, the video reception device 200*a* can speed up the processing related to the restoration of the image data of the region of interest in the first information processing unit 230*a* and the processing of replacing the image data in the second information processing unit 230*b*, and can increase the number of image data frames processed per unit time.

5-3. Processing Related to Display of Data of Normal Image

Next, an outline of processing related to display of data of a normal image in the second information processing unit 230*b* (normal image display processing) will be described. The second information processing unit 230*b* performs the normal image display processing in a case where a determination result indicating the data type corresponding to a normal image has been input as the additional information from the DMA controller 260 to the second information extraction unit 271.

Specifically, in a case where the input additional information is a determination result indicating the data type corresponding to the data of the normal image, the second information extraction unit 271 outputs the determination result to the image data replacement unit 272. Once the determination result is input, the image data replacement unit 272 determines that the display target image data RD input from the DMA controller 260 is data of a normal image. In this case, the image data replacement unit 272 outputs the display target image data RD including the data of the normal image to the display device 300 without performing the image data replacement processing. For example, the image data replacement unit 272 may divide the display target image data RD including the data of the normal image in units of pixels (for each pixel) and output the divided display target image data RD to the display device 300, or may output the display target image data RD in units of pixel rows. As described above, the image data replacement unit 272 functions as an output unit that outputs image data to the display device 300.

6. Modified Example of Restoration Processing 6-1. Modified Example 1

Although the ROI image generation unit 234 performing the writing process in the restoration processing of the present embodiment divides the ROI pixel row data for each region of interest (ROI) and writes the divided ROI pixel row data in the frame memory 250, the present disclosure is not limited thereto. Various methods are assumed for writing the ROI pixel row data in the payload data 215A in the frame memory.

For example, the ROI image generation unit 234 in the first information processing unit 230*a* may transfer the image data (ROI pixel row data) of the region of interest in the payload data 215A to the frame memory 250 by burst transfer on the basis of the ROI restoration information and write the image data. For example, in a case where a predetermined condition is satisfied in the writing process, the ROI image generation unit 234 inserts dummy image data between pieces of image data of two or more regions of interest in the payload data, and generates inserted dummy image data 234B obtained by connecting the pieces of image data of the two or more regions of interest. Then, for example, the ROI image generation unit 234 may continuously write the generated inserted dummy image data 234B in the frame memory by one instruction (for example, a data command is issued once).

That is, the ROI image generation unit 234 may transfer the generated inserted dummy image data 234B to the frame memory 250 by the burst transfer, and continuously write the inserted dummy image data 234B in the frame memory 250. Here, dummy image data included in the inserted dummy image data 234B may be, for example, predetermined image data (for example, image data similar to the fixed value image data in the image data replacement processing or the like) that fills a gap between the two or more regions of interest.

In the present modified example, for example, in a case where pieces of image data of two writing target ROIs are included in one piece of ROI pixel row data in the payload data 215A, the first information extraction unit 231 may determine whether or not the above-described burst transfer can be performed according to a distance between the pieces of image data of the writing target ROIs, that is, the length of the gap. For example, the first information extraction unit 231 may determine that the burst transfer can be performed in a case where the gap between the pieces of image data of the writing target regions of interest (writing target ROIs) is narrow and a memory size (the number of bytes) of the dummy image data inserted into the gap is equal to or smaller than a predetermined size (an example of a predetermined condition). In this case, the first information extraction unit 231 generates a dummy image size in addition to a writing size of each piece of image data of the writing target ROIs as the writing information based on the ROI restoration information.

For example, in a case where the memory size of the dummy image data is equal to or smaller than 128 bytes, the first information extraction unit 231 may determine that the burst transfer can be performed and generate the dummy image size as the writing information. Note that the memory size of the dummy image data used to determine whether or not the burst transfer can be performed and the size of the image data that can be subjected to the burst transfer are appropriately selected according to, for example, the specification of bus 240 used to transfer the image data in the video reception device 200a. Note that in a case where the memory size of the dummy image data exceeds 128 bytes and the burst transfer cannot be performed, it is sufficient if the first information extraction unit 231 determines to write the image data for each writing target ROI as in the above-described embodiment.

Once the writing information including the dummy image size is input from the first information extraction unit 231, the ROI image generation unit 234 generates dummy image data having the dummy image size, and for example, generates the inserted dummy image data 234B by inserting the dummy image data between the pieces of image data of the two writing target ROIs. At this time, it is sufficient if the ROI image generation unit 234 determines an insertion position of the dummy image data on the basis of the writing size (division size) of each region of interest ROI. Once the inserted dummy image data 234B is generated, the ROI image generation unit 234 issues a data command including the generated inserted dummy image data 234B, and writes pieces of image data of a plurality of (for example, two) writing target ROIs in the frame memory 250 by the burst transfer.

In a case where the ROI image generation unit 234 performs the burst transfer on pieces of image data of two or more writing target ROIs, the size of the image data (burst transfer size) transferred to the frame memory 250 by one data command, that is, the image size of the inserted dummy image data 234B, is a size obtained by adding the size of the dummy image data (dummy image size) to the sum of the writing sizes of the pieces of image data of the writing target ROIs to be subjected to the burst transfer.

Furthermore, in a case where the first information extraction unit 231 determines to perform the burst transfer for pieces of image data of a plurality of (for example, two) writing target ROIs, the ROI image address generation unit 233 generates an address of the frame memory 250 in units of burst transfers on the basis of the writing information including the dummy image size. In a case where the burst transfer of the inserted dummy image data 234B is performed, the ROI image address generation unit 233 generates an address indicating a write destination of the inserted dummy image data 234B in the frame memory 250 on the basis of the ROI restoration information. Specifically, the ROI image address generation unit 233 generates an address indicating the write destination of the inserted dummy image data 234B on the basis of the writing information including the dummy image size generated by the first information extraction unit 231.

In this case, the ROI image address generation unit 233 generates a head address of the inserted dummy image data 234B on the basis of the writing start X coordinate and the writing Y coordinate included in the writing information. Moreover, the ROI image address generation unit 233 performs addition on the head address according to the writing size of the inserted dummy image data 234B (a size obtained by adding the dummy image size to the sum of the writing sizes of the pieces of image data of the writing target ROIs). As a result, consecutive addresses serving as write destinations in units of inserted dummy image data are generated.

In addition, the ROI image address generation unit 233 outputs the image size (the number of pixels) of the inserted dummy image data 234B written by the burst transfer to the ROI image generation unit 234 as the number of burst transfers. Once the number of burst transfers is input, the ROI image generation unit 234 issues a data command including the writing inserted dummy image data 234B having a size corresponding to the number of burst transfers. In this way, the inserted dummy image data 234B is transmitted to the frame memory 250 and written by the burst transfer.

Furthermore, in a case where three or more writing target ROIs are included in the payload data 215A and the number of gaps between the regions of interest is two or more, it is sufficient if the first information extraction unit 231 determines the memory size of the dummy image data for each of the gaps. In a case where the first information extraction unit 231 determines that the inserted dummy image data 234B including the pieces of image data of all the writing target ROIs in the payload data 215A can be transferred to the frame memory 250 (in a case where the dummy image sizes related to all the gaps are equal to or smaller than a predetermined number), the inserted dummy image data 234B including the pieces of image data of all the writing target ROIs is written in the frame memory 250 by issuing a data command once. That is, the number of times the inserted dummy image data 234B is written in the frame memory 250 is 1.

Meanwhile, for example, it is assumed that a wide gap for which the dummy image size exceeds a predetermined number (for example, 128 bytes) is included in a plurality of gaps between pieces of image data of writing target ROIs (for example, three gaps between pieces of image data of four writing target ROIs). In this case, the first information extraction unit 231 may determine to perform the burst transfer by dividing the ROI pixel row data in the payload data 215A into data in front of the wide gap and data behind the wide gap. For example, inserted dummy image data 234B-1 including pieces of image data of two writing target ROIs from the head among four writing target ROIs and inserted dummy image data 234B-2 including pieces of image data of the remaining writing target ROIs (third and fourth writing target ROIs from the head) may be generated. In this case, the number of times the inserted dummy image data 234B is written in the frame memory 250 is 2.

In addition, for pieces of image data of a plurality of writing target ROIs in the payload data 215A, the first information extraction unit 231 may determine to perform the burst transfer on a predetermined number (two or more) of writing target ROIs and write pieces of image data of the remaining writing target ROIs in units of regions of interest as usual.

As described above, by performing the burst transfer in units of ROI pixel row data, the number of times of writing can be reduced and the writing process can be speeded up as compared with a case where the image data is written in the frame memory in units of regions of interest (ROIs).

6-2. Modified Example 2

In the present embodiment, an address generated by the ROI image address generation unit 233 is an address corresponding to a restoration position indicating a relative position of a region of interest in a captured image in the frame memory 250, but the present disclosure is not limited thereto. For example, the ROI image address generation unit 233 may be configured to generate addresses indicating arbitrary positions (an example of a predetermined position) at which pieces of image data of a predetermined number of regions of interest can be displayed without overlapping each other in the screen of the display device 300. That is, the ROI image generation unit 234 may be configured to write the image data of the region of interest so that the image data of a predetermined number of regions of interest can be displayed without overlapping in the screen of the display device 300.

For example, the ROI image address generation unit 233 may generate addresses indicating arbitrary positions (arbitrary Y-axis positions) at which the pieces of image data of the predetermined number of regions of interest can be displayed in order in the Y-axis direction of the display device 300 so as not to overlap each other. Furthermore, the ROI image generation unit 234 may be configured to write the image data of the region of interest at an arbitrary Y-axis position in the screen of the display device 300. In this case, the first information extraction unit 231 generates the writing information that enables the address generation according to the arbitrary Y-axis position by using the Y-coordinate order data and the Y-coordinate order data of the ROI restoration information. For example, the first information extraction unit 231 uses the X-axis coordinate order data and the Y-axis coordinate order data (see FIG. 17) to generate the writing information used for the address generation for displaying each of the regions of interest ROI0 to ROI2 (see FIG. 13) at the arbitrary Y-axis position in the display device 300.

For example, the first information extraction unit 231 determines the display order of the regions of interest ROI0 to ROI2 on the display device 300 on the basis of the Y-axis coordinate order data. For example, the first information extraction unit 231 determines the storage order of the Y-axis coordinate order data, that is, the ascending order of the start point Y coordinates as the display order of the regions of interest ROI0 to ROI2. In this example, the order of the regions of interest ROI2, ROI1, and ROI0 is the display order in the Y-axis direction in the screen of the display device 300.

Once the display order is determined, the first information extraction unit 231 determines, for example, a display start Y coordinate which is a head Y coordinate when the image data of each region of interest (ROI) is displayed on the display device 300. As described above, the image data in units of screens of the display device 300 is written in the frame memory 250. Therefore, the display position (coordinates) in the screen of the display device 300 corresponds to the writing position in the frame memory 350.

For example, the image data of the region of interest ROI2 that is displayed at the head position is displayed from the top pixel row of the display device 300. Therefore, the first information extraction unit 231 sets the writing start Y coordinate of the image data of the region of interest ROI2 to "0". Furthermore, the image data of the region of interest ROI1 is displayed below the image data of the region of interest ROI2 so as not to overlap the image data of the region of interest ROI2. Therefore, the first information extraction unit 231 sets the display start Y coordinate of the image data of the region of interest ROI1 to "600 (=0+600 (length in Y-axis direction of region of interest ROI2)". Note that the length in the Y-axis direction is calculated by "end point Y coordinate−start point Y coordinate" in the Y-coordinate order data. Similarly, the first information extraction unit 231 sets the display start Y coordinate of the image data of the region of interest ROI0 displayed below the image data of the region of interest ROI1 to "1200 (=600 (display start Y coordinate of image data of region of interest ROI1)+600 (length of region of interest ROI1 in Y-axis direction)".

Once the display start Y coordinate of the image data of each region of interest is determined, the first information extraction unit 231 then adds 1 to the value of the display start Y coordinate corresponding to each region of interest and updates the value every time the image data of each region of interest is input as the payload data. As a result, the display start Y coordinate corresponding to the arbitrary Y-axis position can be generated.

Further, a display start X coordinate which is a head X coordinate when the image data of the region of interest is displayed on the display device 300 at the arbitrary Y-axis position in the screen of the display device 300 is determined. In the present modified example, the writing start X coordinates of the pieces of image data of the respective regions of interest have a uniform value. For example, it is assumed that the pieces of image data of the respective regions of interest are displayed in a left-aligned manner on the screen of the display device 300 in a case where the pieces of image data of the respective regions of interest are displayed at the arbitrary Y-axis positions. In this case, the first information extraction unit 231 generates a common value "0" for each region of interest as the display start X coordinate. That is, in a case where the pieces of image data of the regions of interest are displayed at the arbitrary Y-axis positions, the pieces of image data of the respective regions of interest are displayed while being arranged in the Y-axis direction in order from the upper end of the screen in a left-aligned manner starting from the upper-left end (origin position) of the screen of the display device 300. In addition, the first information extraction unit 231 generates the writing size in a manner similar to that in the above-described embodiment.

Once the writing information corresponding to display of the image data of the region of interest at the arbitrary Y-axis position is input from the first information extraction unit 231, the ROI image address generation unit 233 generates an address for writing the image data of the region of interest in the frame memory 250 on the basis of the writing information. The ROI image address generation unit 233 can generate an address corresponding to the arbitrary Y-axis position in the frame memory 250 by generating an address on the basis of the input writing information similarly to the above-described embodiment. Further, similarly to the above-described embodiment, the ROI image generation unit 234 generates the writing target image data 234A, and issues a data command at a timing synchronized with the address issuance of the ROI image address generation unit 233. As a result, the ROI image generation unit 234 can write the pieces of image data of the regions of interest (ROIs) to the arbitrary Y-axis positions at which the pieces of image data of the predetermined number of regions of interest can be sequentially displayed in the Y-axis direction without overlapping each other in the screen of the display device 300.

Note that the present modified example is not limited thereto, and for example, the ROI image address generation unit 233 may generate addresses indicating arbitrary positions (arbitrary X-axis positions) at which the pieces of image data of the predetermined number of regions of interest can be sequentially displayed in the X-axis direction of the display device 300 so as not to overlap each other.

Furthermore, the ROI image generation unit 234 may be configured to write the image data of the region of interest at an arbitrary X-axis position in the screen of the display device 300. In this case, the first information extraction unit 231 generates the writing information that enables the address generation according to the arbitrary X-axis position by using the X-coordinate order data and the Y-coordinate order data of the ROI restoration information. At this time, the first information extraction unit 231 determines the display order of each region of interest as the storage order of the X-coordinate order data, that is, the ascending order of the start point X coordinates (in the order of the regions of interest RI2, ROI0, and ROI1).

In a case where the pieces of image data of the regions of interest are displayed at the arbitrary X-axis positions, the pieces of image data of the respective regions of interest are displayed in the X-axis direction in order from the left end of the screen starting from the upper-left end of the screen of the display device 300.

Once the display order is determined, the first information extraction unit 231 determines the display start X coordinate. For example, the region of interest ROI2 that is displayed at the head position is displayed from the upper-left end position in the display device 300. Therefore, the first information extraction unit 231 sets the display start X coordinate of the region of interest ROI2 to "0". In addition, the region of interest ROI0 is displayed on the right side of the region of interest ROI2 so as not to overlap the region of interest ROI2. Therefore, the first information extraction unit 231 sets the writing start X coordinate of the region of interest ROI0 to "400 (=0+400 (length in X-axis direction of region of interest ROI2)". Note that the length in the X-axis direction is calculated by "end point X coordinate−start point X coordinate" in the X-coordinate order data. Similarly, the first information extraction unit 231 sets the display start X coordinate of the region of interest ROI1 displayed on the right side of the region of interest ROI0 to "800 (=400 (display start X coordinate of image data of region of interest ROI0)+400 (length of region of interest ROI0 in X-axis direction)".

In addition, in a case where the pieces of image data of the regions of interest are displayed at the arbitrary X-axis positions on the screen of the display device 300, the display start Y coordinates of the pieces of image data of the respective regions of interest have a uniform value. For example, it is assumed that the pieces of image data of the respective regions of interest are displayed in a top-aligned manner on the screen of the display device 300 in a case where the pieces of image data of the regions of interest are displayed at the arbitrary X-axis positions. In this case, the first information extraction unit 231 generates a common value "0" for each region of interest as the display start Y coordinate. Furthermore, the first information extraction unit 231 adds 1 to the value of the display start Y coordinate corresponding to each region of interest and updates the value every time the image data of each region of interest is input as the payload data. As a result, the display start Y coordinate corresponding to the arbitrary X-axis position can be generated. In addition, the first information extraction unit 231 generates the writing size in a manner similar to that in the above-described embodiment.

Once the writing information corresponding to the display of the image data of the region of interest at the arbitrary X-axis position is input from the first information extraction unit 231, the ROI image address generation unit 233 generates an address on the basis of the input writing information, similarly to the above-described embodiment. As a result, an address corresponding to the arbitrary X-axis position in the frame memory 250 can be generated. Furthermore, the ROI image generation unit 234 can write the pieces of image data of the regions of interest to the arbitrary X-axis positions at which the pieces of image data of the predetermined number of regions of interest can be sequentially displayed in the X-axis direction without overlapping each other in the screen of the display device 300.

As described above, the video reception device 200*a* can restore the image data of the region of interest (ROI) so as to be displayable at an arbitrary position (for example, the X-axis arbitrary position or Y-axis arbitrary position) in the display device 300 by performing the restoration processing in the present modified example. As a result, the image data of the region of interest can be efficiently displayed on the display device 300 (see FIG. 18). In addition, the pieces of image data of the predetermined number of regions of interest are displayed while being arranged so as not to overlap each other in one direction (the X-axis direction or Y-axis direction), as a result of which, for example, recognition processing and comparison processing for the image data of each region of interest can be efficiently performed.

6-3. Other Modified Examples

Further, in the above-described embodiment, the first information extraction unit 231 of the first information processing unit 230*a* of the video reception device 200*a* performs the information extraction process in the restoration processing (generation of the ROI restoration information from the extracted ROI information), but the present disclosure is not limited thereto. For example, in the video reception device 200*a* according to the present disclosure, the EBD interpretation unit 214 of the reception unit 210 may extract the ROI information (the position information and the size information) from the embedded data in the information extraction process. In this case, it is sufficient if the EBD interpretation unit 214 outputs the extracted ROI information to the first information extraction unit 231. In addition, it is sufficient if the first information extraction unit 231 generates the ROI restoration information on the basis of the input ROI information.

Furthermore, in the above-described embodiment, as an example, the region of interest in the captured image has a rectangular shape, but the present disclosure is not limited thereto. Even in a case where the region of interest ROI is not rectangular, the video reception device 200*a* can perform the restoration processing and the image data replacement processing in the above-described embodiment.

Although the present disclosure has been described above with reference to the underlying technologies, the embodiment, and the modified examples thereof, the present disclosure is not limited to the above-described embodiment and the like, and various modifications can be made. Note that the effects described in the present specification are merely examples. The effects of the present disclosure are not limited to the effects described herein. The present disclosure may have effects other than those described herein.

Furthermore, for example, the present disclosure can have the following configuration.

(1)

A reception device including:

a reception unit that receives a transmission signal in which image data of a predetermined number of regions of interest (ROIs) cut from a predetermined captured image is included in payload data and ROI information corresponding to a predetermined number of the ROIs is included in embedded data; and a processing unit that is configured to perform restoration processing of restoring the image data of the ROI so as to be displayable on a predetermined display device on the basis of the ROI information extracted from the embedded data.

(2)
The reception device according to (1), in which
the processing unit extracts position information and size information of each of a predetermined number of the ROIs in the captured image as the ROI information.

(3)
The reception device according to (2), in which
the processing unit rearranges the extracted position information and size information to generate ROI restoration information used for restoration of the image data of the ROI.

(4)
The reception device according to (3), in which
the position information includes an X coordinate and a Y coordinate indicating an upper-left end portion of the ROI in the captured image, and
the processing unit generates, as the ROI restoration information, X-coordinate order data obtained by rearranging the position information and the size information in ascending order of values of the X coordinates and Y-coordinate order data obtained by rearranging the position information and the size information in ascending order of values of the Y coordinates.

(5)
The reception device according to any one of (1) to (4), further including
a frame memory that is configured to store the image data of the ROI, in which
the processing unit writes the image data of the ROI in the frame memory on the basis of the ROI restoration information generated from the ROI information.

(6)
The reception device according to (5), in which
the processing unit writes the image data of the ROI in the frame memory in units of the payload data on the basis of the ROI restoration information.

(7)
The reception device according to (6), in which
the processing unit divides the image data of the ROI in the payload data for each ROI on the basis of the ROI restoration information and writes the divided image data in the frame memory.

(8)
The reception device according to (6), in which
in a case where a predetermined condition is satisfied, the processing unit inserts dummy image data between pieces of image data of two or more of the ROIs in the payload data to generate inserted dummy image data in which the pieces of image data of the two or more of the ROIs are connected, and writes the generated inserted dummy image data in the frame memory continuously by one instruction.

(9)
The reception device according to any one of (5) to (8), in which
the processing unit specifies a restoration position corresponding to a relative position of the ROI in the captured image in the frame memory on the basis of the ROI restoration information, and writes the image data of the ROI to the restoration position.

(10)
The reception device according to any one of (5) to (8), in which
the processing unit writes pieces of image data of a predetermined number of the ROIs in the frame memory so as to be displayable without overlapping each other in a screen of the display device on the basis of the ROI restoration information.

(11)
The reception device according to any one of (5) to (10), in which
the processing unit generates an address indicating a write destination of the image data of the ROI in the frame memory on the basis of the ROI restoration information.

(12)
The reception device according to (8), in which
the processing unit generates an address indicating a write destination of the inserted dummy image data in the frame memory on the basis of the ROI restoration information.

(13)
The reception device according to any one of (5) to (12), in which
in a case where the image data of the ROI is displayed on the display device, the processing unit replaces non-ROI image data which does not correspond to the image data of the ROI among pieces of image data in units of screens of the display device stored in the frame memory with fixed value image data.

(14)
The reception device according to (13), in which
the processing unit specifies the non-ROI image data on the basis of the ROI restoration information.

(15)
The reception device according to (14), in which
the processing unit
determines whether each pixel of the image data in the units of screens is included in the image data of the ROI or in the non-ROI image data on the basis of the ROI restoration information.

(16)
A transmission system including:
a transmission device that sends image data of a region of interest (ROI) as payload data and sends ROI information as embedded data; and
a reception device that includes a reception unit that receives a transmission signal in which the image data of a predetermined number of the ROIs cut from a predetermined captured image is included in the payload data and the ROI information corresponding to a predetermined number of the ROIs is included in the embedded data, and a processing unit that is configured to perform restoration processing of restoring the image data of a predetermined number of the ROIs so as to be displayable on a predetermined display device on the basis of the ROI information extracted from the embedded data.

(17)
The transmission system according to (16), in which
the reception device
rearranges, by the processing unit, position information and size information of each of a predetermined number of the ROIs in the captured image extracted as the ROI information to generates ROI restoration information used for restoration of the image data of the ROI.

(18)

The transmission system according to (17), in which the reception device further includes a frame memory that is configured to store the image data of the ROI, and writes, by the processing unit, the image data of the ROI in the frame memory on the basis of the ROI restoration information.

(19)

The transmission system according to (18), in which in a case where the image data of the ROI is displayed on the display device, the reception device replaces, by the processing unit, non-ROI image data which does not correspond to the image data of the ROI among pieces of image data in units of screens of the display device stored in the frame memory with fixed value image data.

REFERENCE SIGNS LIST 1, 2 Video transmission system
31, 110 Imaging unit
32, 41 Control unit
42 Image processing unit
100 Video transmission device
100A CSI transmitter
100B CCI slave
111 Captured image
112, 112a1, 112a2, 112a3, 112a4, 112b1, 112b4, 123a4, 223A ROI image
112b Compressed image data
113, 114 Position information
115 Priority
116, 116a1, 116a2 Transmission image
118 Image
120, 130 Image processing unit
120A, 120A1, 120A2, 130A, 147B Compressed image data
120B ROI information
120C Frame information
121 ROI cutting unit
122 ROI analysis unit
123 Detection unit
124 Priority setting unit
125, 131 Encoding unit
126 Image processing control unit
140 Transmission unit
141 LINK control unit
142 ECC generation unit
143 PH generation unit
144 EBD buffer
145 ROI data buffer
146 Normal image data buffer
147 Combining unit
147A Transmission data
200, 200a Video reception device
200A CSI receiver
200B CCI master
210 Reception unit
211 Header separation unit
212 Header interpretation unit
213 Payload separation unit
214 EBD interpretation unit
214A EBD data
215 ROI data separation unit
215A, 215B Payload data
220 Information processing unit
221 Information extraction unit
221A Extracted information
222, 232 ROI decoding unit
222A Image data
223 ROI image generation unit
224 Normal image decoding unit
224A Normal image
230 Information processing unit
230a First information processing unit
230b Second information processing unit
231 First information extraction unit
232A ROI decoded image data
233 ROI image address generation unit
234 ROI image generation unit
234A Writing target image data
235 Normal image address generation unit
236 Normal image decoding unit
237 Normal image generation unit
240 Bus
250 Frame memory
260 DMA controller
271 Second information extraction unit
272 Image data replacement unit
300 Display device
Cb Chrominance component
CCI Camera control interface
CL Clock lane
RD Display target image data

The invention claimed is:

1. A reception device comprising:
a reception circuitry configured to receive a transmission signal from a transmission device,
wherein the transmission signal includes payload data and embedded data,
wherein the payload data includes image data of a predetermined number of regions of interest (ROIs) cut from a predetermined captured image,
wherein one or more of the predetermined number of the ROIs have a non-rectangular shape and do not overlap with any other of the predetermined number of the ROIs,
wherein the non-rectangular shape has a plurality of sides,
wherein two of the plurality of sides intersect with each other at approximately a ninety-degree angle, and
wherein the embedded data includes ROI information corresponding to the predetermined number of the ROIs; and
a processing circuitry configured to
extract the image data of the predetermined number of the ROIs from the payload data and the ROI information from the embedded data, and
restore the image data of the predetermined number of the ROIs so as to be displayable on a predetermined display device on a basis of the ROI information extracted from the embedded data,
wherein the image data that is restored is less than all of the predetermined captured image, and
wherein the image data that is restored includes one or more ROI images that each have a shape other than a rectangular shape that corresponds to the one or more of the predetermined number of the ROIs that each have the non-rectangular shape.

2. The reception device according to claim 1, wherein the processing circuitry is further configured to extract position information and size information of each of a predetermined number of the ROIs in the predetermined captured image as the ROI information.

3. The reception device according to claim 1, further comprising
a frame memory that is configured to store the image data of the ROI, wherein
the processing circuitry is further configured to write the image data of the ROI in the frame memory on a basis of ROI restoration information generated from the ROI information.

4. The reception device according to claim 1, wherein
the predetermined number of the ROIs includes four or more ROIs,
a first ROI of the four or more ROIs has a rectangular shape that does not overlap with any other ROIs,
a second ROI of the four or more ROIs has a first non-rectangular shape that does not overlap with the any other ROIs, wherein the first non-rectangular shape has a first plurality of sides, and wherein two of the first plurality of sides intersect with each other at approximately a ninety-degree angle,
a third ROI of the four or more ROIs has a second non-rectangular shape, wherein the second non-rectangular shape has a second plurality of sides, and wherein two of the second plurality of sides intersect with each other at approximately a ninety-degree angle, and
a fourth ROI of the four or more ROIs has a third non-rectangular shape, the fourth ROI being directly adjacent to the third ROI, wherein the second non-rectangular shape has a second plurality of sides, and wherein two of the second plurality of sides intersect with each other at approximately a ninety-degree angle.

5. The reception device according to claim 2, wherein
the processing circuitry is further configured to rearrange the extracted position information and size information to generate ROI restoration information used for restoration of the image data of the ROI.

6. The reception device according to claim 3, wherein
the processing circuitry is further configured to write the image data of the ROI in the frame memory in units of the payload data on a basis of the ROI restoration information.

7. The reception device according to claim 3, wherein
the processing circuitry is further configured to specify a restoration position corresponding to a relative position of the ROI in the predetermined captured image in the frame memory on a basis of the ROI restoration information, and writes the image data of the ROI to the restoration position.

8. The reception device according to claim 3, wherein
the processing circuitry is further configured to write pieces of image data of a predetermined number of the ROIs in the frame memory so as to be displayable without overlapping each other in a screen of the predetermined display device on a basis of the ROI restoration information.

9. The reception device according to claim 3, wherein
the processing circuitry is further configured to generate an address indicating a write destination of the image data of the ROI in the frame memory on a basis of the ROI restoration information.

10. The reception device according to claim 3, wherein
in a case where the image data of the ROI is displayed on the predetermined display device, the processing circuitry is further configured to replace non-ROI image data which does not correspond to the image data of the ROI among pieces of image data in units of screens of the predetermined display device stored in the frame memory with fixed value image data.

11. The reception device according to claim 5, wherein
the position information includes an X coordinate and a Y coordinate indicating an upper-left end portion of the ROI in the predetermined captured image, and
the processing circuitry is further configured to generate, as the ROI restoration information, X-coordinate order data obtained by rearranging the position information and the size information in ascending order of values of the X coordinates and Y-coordinate order data obtained by rearranging the position information and the size information in ascending order of values of the Y coordinates.

12. The reception device according to claim 6, wherein
the processing circuitry is further configured to divide the image data of the ROI in the payload data for each ROI on a basis of the ROI restoration information and writes the divided image data in the frame memory.

13. The reception device according to claim 6, wherein
in a case where a predetermined condition is satisfied, the processing circuitry is further configured to insert dummy image data between pieces of image data of two or more of the ROIs in the payload data to generate inserted dummy image data in which the pieces of image data of the two or more of the ROIs are connected, and writes the generated inserted dummy image data in the frame memory continuously by one instruction.

14. The reception device according to claim 10, wherein
the processing circuitry is further configured to specify the non-ROI image data on a basis of the ROI restoration information.

15. The reception device according to claim 13, wherein
the processing circuitry is further configured to generate an address indicating a write destination of the inserted dummy image data in the frame memory on a basis of the ROI restoration information.

16. The reception device according to claim 14, wherein
the processing circuitry is further configured to determine whether each pixel of the image data in the units of screens is included in the image data of the ROI or in the non-ROI image data on a basis of the ROI restoration information.

17. A transmission system comprising:
a transmission device including a transmission circuitry configured to send a transmission signal including payload data and embedded data, wherein the payload data includes image data of a predetermined number of regions of interest (ROIs) that are cut from a predetermined captured image, wherein one or more of the predetermined number of the ROIs have a non-rectangular shape and do not overlap with any other of the predetermined number of the ROIs, wherein the non-rectangular shape has a plurality of sides, wherein two of the plurality of sides intersect with each other at approximately a ninety-degree angle, and wherein the embedded data includes ROI information; and
a reception device including
a reception circuitry configured to receive the transmission signal, and
a processing circuitry configured to
extract the image data of the predetermined number of the ROIs from the payload data and the ROI information from the embedded data, and
restore the image data of the predetermined number of the ROIs so as to be displayable on a predetermined display device on a basis of the ROI information extracted from the embedded data, wherein the image data that is restored is less than all of the predetermined captured image, and wherein the image data that is restored includes one or more ROI images that each have a shape other than a rectangular shape that corresponds to the one or more of the predetermined number of the ROIs that each have the non-rectangular shape wherein one or more of the predetermined number of ROIs have a non rectangular shape.

18. The transmission system according to claim 17, wherein wherein the processing circuitry is further configured to rearrange position information and size information of each of a predetermined number of the ROIs in the predetermined captured image extracted as the ROI information to generate ROI restoration information used for restoration of the image data of the ROI.

19. The transmission system according to claim 18, wherein the reception device further includes a frame memory that is configured to store the image data of the ROI, and wherein the processing circuitry is further configured to write the image data of the ROI in the frame memory on a basis of the ROI restoration information.

20. The transmission system according to claim 19, wherein in a case where the image data of the ROI is displayed on the predetermined display device, the processing circuitry is further configured to replace non-ROI image data which does not correspond to the image data of the ROI among pieces of image data in units of screens of the predetermined display device stored in the frame memory with fixed value image data.

* * * * *